United States Patent
Nakagawa et al.

[11] Patent Number: 5,600,813
[45] Date of Patent: Feb. 4, 1997

[54] METHOD OF AND CIRCUIT FOR GENERATING ZIGZAG ADDRESSES

[75] Inventors: Shinichi Nakagawa; Kazuya Ishihara; Satoshi Kumaki, all of Itami, Japan

[73] Assignee: Mitsubishi Denki Kabushiki Kaisha, Tokyo, Japan

[21] Appl. No.: 15,374

[22] Filed: Feb. 9, 1993

[30]  Foreign Application Priority Data

Apr. 3, 1992 [JP] Japan .................................. 4-081909

[51] Int. Cl.[6] .................................................. G06F 12/00
[52] U.S. Cl. .................. 395/421.07; 395/421.1; 395/421.11
[58] Field of Search .................................. 395/400, 425, 395/421.07, 421.1, 421.11, 166; 364/200 MS File, 900 MS File, DIG. 1, DIG. 2

[56]  References Cited

U.S. PATENT DOCUMENTS 5,162,908  11/1992  Kim ........................................ 348/403

FOREIGN PATENT DOCUMENTS 3-63883  3/1991  Japan .

OTHER PUBLICATIONS

Nick Birch, et al., "Datenkompression Löst übertragungs–und Speicherprobleme" (Data Compression Solves Transmission and Storage Problems), Elektronik 19, Sep. 15, 1989 pp. 44–49.

*Primary Examiner*—Jack A. Lane
*Attorney, Agent, or Firm*—Oblon, Spivak, McClelland, Maier & Neustadt, P.C.

[57]  ABSTRACT

In order to generate zigzag addresses for Discrete Cosine Transformation DCT data arranged in the form of a square matrix, row differentials ($\Delta y$) and column differentials ($\Delta x$) being differentials of row addresses (y) and column addresses (x) are previously stored to be successively read out (steps S12 and S13). The row differentials ($\Delta y$) and the column differentials ($\Delta x$) are added to the row addresses (y) and the column addresses (x) respectively, to newly obtain zigzag addresses (steps S14 and S15). Thus, the amount data to be stored can be reduced. Further, it is possible to further reduce the amount of data to be stored by compressing data through regularity of the row differentials ($\Delta y$) and the column differentials ($\Delta x$).

29 Claims, 62 Drawing Sheets

FIG. 22

| | RESET | ... |  |  |  |  |  |  |  |  |  |  |  |  | ... |
|---|---|---|---|---|---|---|---|---|---|---|---|---|---|---|---|---|
| | COUNT CLOCK | ... | | | | | | | | | | | | | | ... |
| | OUTPUT OF COUNTER 7 | ... | 26 | 27 | 28 | 29 | 30 | 31 | 32 | 33 | 34 | 35 | 36 | 37 | | ... |
| | STATE SIGNAL | ... | 11 | 00 | 01 | 01 | 01 | 01 | 01 | 01 | 01 | 00 | 11 | 11 | | ... |
| | ROW DIFFERENTIAL $\Delta y$ | ... | 11 | 00 | 01 | 01 | 01 | 01 | 01 | 01 | 01 | 00 | 11 | 11 | | ... |
| | OUTPUT OF INCREMENTER/ DECREMENTER 8b | ... | 0 | 0 | 1 | 2 | 3 | 4 | 5 | 6 | 7 | 7 | 6 | 5 | | ... |
| | ROW ADDRESS y | ... | 1 | 0 | 0 | 1 | 2 | 3 | 4 | 5 | 6 | 7 | 7 | 6 | | ... |
| | COLUMN DIFFERENTIAL $\Delta x$ | ... | 01 | 01 | 11 | 11 | 11 | 11 | 11 | 11 | 11 | 01 | 01 | 01 | | ... |
| | OUTPUT OF INCREMENTER/ DECREMENTER 8a | ... | 6 | 7 | 6 | 5 | 4 | 3 | 2 | 1 | 0 | 1 | 2 | 3 | | ... |
| | COLUMN ADDRESS x | ... | 5 | 6 | 7 | 6 | 5 | 4 | 3 | 2 | 1 | 0 | 1 | 2 | | ... |

FIG.23

| Signal | | | | | | | | | | | | | | |
|---|---|---|---|---|---|---|---|---|---|---|---|---|---|---|
| RESET | | | | | | | | | | | | | | |
| COUNT CLOCK | ⊓⊔⊓⊔⊓⊔⊓⊔⊓⊔⊓⊔⊓⊔⊓⊔⊓⊔⊓⊔⊓⊔⊓⊔⊓⊔ |
| OUTPUT OF COUNTER 7 | 38 | 39 | 40 | 41 | 42 | 43 | 44 | 45 | 46 | 47 | 48 | 49 | 50 |
| STATE SIGNAL | 11 | 11 | 11 | 11 | 10 | 01 | 01 | 01 | 01 | 01 | 00 | 11 | 11 |
| ROW DIFFERENTIAL Δy | 4 | 3 | 2 | 1 | 1 | 2 | 3 | 4 | 5 | 6 | 7 | 7 | 6 |
| OUTPUT OF INCREMENTER/DECREMENTER 8b | 5 | 4 | 3 | 2 | 2 | 3 | 4 | 5 | 6 | 7 | 7 | 6 | 5 |
| ROW ADDRESS y | | | | | | | | | | | | | |
| COLUMN DIFFERENTIAL Δx | 01 | 01 | 01 | 01 | 00 | 11 | 11 | 11 | 11 | 11 | 01 | 01 | 01 |
| OUTPUT OF INCREMENTER/DECREMENTER 8a | 4 | 5 | 6 | 7 | 7 | 6 | 5 | 4 | 3 | 2 | 3 | 4 | 5 |
| COLUMN ADDRESS x | 3 | 4 | 5 | 6 | 7 | 7 | 6 | 5 | 4 | 3 | 2 | 3 | 4 |

| 00 | 01 | 05 | 06 | 14 | 15 | 27 | 28 |
|----|----|----|----|----|----|----|----|
| 02 | 04 | 07 | 13 | 16 | 26 | 29 | 42 |
| 03 | 08 | 12 | 17 | 25 | 30 | 41 | 43 |
| 09 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

| 00 | 01 | 02 | 03 | 04 | 05 | 06 | 07 |
|----|----|----|----|----|----|----|----|
| 08 | 09 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

METHOD OF AND CIRCUIT FOR GENERATING ZIGZAG ADDRESSES

BACKGROUND OF THE INVENTION

1. Field of the Invention

The present invention relates to techniques as to generation of zigzag addresses for DCT (discrete cosine transformation) which is employed for band compression of image data.

2. Description of the Background Art

FIG. 59 is a block diagram showing a conventional zigzag address generation circuit. An output of a counter 7 which receives clock and reset signals is inputted to a storage element 6. The storage element 6 is formed by a ROM, for example, to store zigzag addresses in a prescribed order. The output of the counter 7 is first zeroed by the reset signal, and thereafter successively incremented as 1, 2, 3 in synchronization with the clock signal. On the other hand, the storage element 6 successively outputs its storage contents with addresses of the outputs of the counter 7. When the zigzag addresses are stored in the prescribed order as described later, therefore, the storage element 6 successively generates the zigzag addresses.

FIG. 60 shows another zigzag address generation circuit, which is disclosed in Japanese Patent Laying-Open Gazette No. 3-63883 (1991). A control part 5 monitors an underflow signal and a match detection signal to control updown counters 1 and 2 for generating X and Y address outputs respectively. These address outputs form the zigzag addresses.

Namely, the updown counters 1 and 2 are reset in initial states so that both X and Y addresses are zeroed. One of the counters 1 and 2 is driven as an up counter while the other one is driven as a down counter. When one of the counters generates an underflow signal, the counting operations are temporarily stopped and the counters are again driven as up counters. This also applies to such case that a match detection signal is outputted from either one of comparators 3 and 4. Such operations are controlled by the control part 5.

Since the conventional zigzag address generation circuits are formed in the aforementioned manners, the storage element 6 must have sufficiently large storage capacity with respect to the addresses to be generated in the circuit shown in FIG. 59, while operations for controlling the counters 1 and 2 and the comparators 3 and 4 are complicated in the circuit shown in FIG. 60.

SUMMARY OF THE INVENTION

A method of generating zigzag addresses according to the present invention is adapted to scan memory addresses which are arranged in the form of a matrix of n rows and n columns, assuming that n represents a natural number of at least 2, to be continuous between last columns of relatively small-numbered rows and first columns of relatively large-numbered rows of adjacent pairs of rows as well as between respective rows in a zigzag manner along the first column of the first row, the second column of the first row, the first column of the second row, the third column of the first row, the second column of the second row, the first column of the third row, . . . , the n-th column of the n-th row thereby generating addresses to be obtained. This method comprises the steps of: (a) zeroing all of row addresses and column addresses specifying rows and columns provided with the addresses and prescribing initial values of the memory addresses for setting initial states; (b) successively reading differential data from storage means storing a plurality of differential data having information as to row and column differentials; (c) obtaining the row and column differentials from the differential data; (d) adding the row and column differentials to one row address and one column address in one stage respectively for obtaining row and column addresses in a next stage following the one stage; and (e) successively obtaining memory addresses in the next stage from the row and column addresses in the next stage.

Preferably, the information as to the row and column differential is formed by pairs of the row and column differentials, and the step (c) includes the step of (c-1) obtaining the row and column differentials from the pairs.

Preferably, the step (b) includes the steps of (b-1) updating addresses supplied to the differential data in one order in reading up to a prescribed number of times, and (b-2) updating the addresses supplied to the differential data in order reverse to the one order in reading after the prescribed number of times.

Preferably, each of the row and column differentials can take one state among a prescribed number of states and the differential data define pairs showing a prescribed number of states, while the step (c) includes the step of (c-1) obtaining the row and column differentials from the pairs defined by the differential data.

Preferably, the step (b) includes the steps of (b-1) performing reading in one order up to a prescribed number of times, and (b-2) performing reading in an order reverse to the one order after the prescribed number of times.

Preferably, the differential data represents whether or not the pairs being formed by the row and column differentials are changed between one stage and a next stage, and the step (c) includes the steps of (c-1) defining pairs from the definition on the basis of a prescribed rule, and (c-2) obtaining the row and column differentials from the pairs.

A method of generating zigzag addresses according to another aspect of the present invention is adapted to scan memory addresses which are arranged in the form of a matrix of (m×n) rows and (m×n) columns, assuming that m represents a natural number and n represents a natural number of at least 2, to be continuous between last columns of relatively small-numbered rows and first columns of relatively large-numbered rows in adjacent pairs of rows as well as between respective rows in a zigzag manner in respective ones of m×m blocks formed by n rows and n columns thereby generating zigzag addresses to be obtained.

This method comprises the steps of: (a) supplying row and column addresses with initial values respectively for obtaining initial memory address from the row and column addresses for setting initial states; (b) successively reading differential data from storage means storing a plurality of differential data having information as to the row and column addresses; (c) obtaining the row and column differentials from the differential data; (d) adding the row and column differentials to the respective ones of one row address and one column address in one stage for obtaining row and column addresses in a next stage following the one stage; and (e) successively obtaining memory addresses in the next stage from the row and column addresses in the next stage.

A circuit for generating zigzag addresses according to the present invention is adapted to scan memory addresses which are arranged in the form of a matrix of n rows and n columns, assuming that n represents a natural number of at least 2, to be continuous between last columns of relatively small-numbered rows and first columns of relatively large-numbered rows in adjacent pairs of rows as well as between respective rows in a zigzag manner along the first column of the first row, the second column of the first row, the first column of the second row, the third column of the first row, the second column of the second row, the first column of the third row, . . . , the n-th column of the n-th row thereby generating addresses to be generated. This circuit comprises storage means storing a plurality of differential data having information as to row and column differentials, readout means for successively reading the differential data along prescribed order in synchronization with clocks, first arithmetic means for obtaining row and column differential signals expressing the row and column differentials respectively from the differential data, an address latch for temporarily storing one row address and one column address in one stage in synchronization with clocks, and second arithmetic means for adding the row and column differentials to respective ones of one row address and one column address being stored in the address latch for supplying row and column addresses in a next stage following the one stage to the address latch.

Preferably, the information as to the row and column differentials is formed by pairs of the row and column differentials, and the first arithmetic means regards the differential data directly as the row and column differentials.

Preferably, the circuit further comprises compare control means which reads the row and column addresses for inverting the prescribed order of the readout means when the row and column addresses exceed prescribed values.

Preferably, the differential data are signals defining pairs formed by the row and column differentials, and the first arithmetic means has third arithmetic means for obtaining row and column differential signals from the differential data.

Preferably, the circuit further comprises compare control means which reads row and column addresses, for inverting the prescribed order of the readout means when memory addresses being supplied by the row and column addresses exceed prescribed values.

Preferably, the readout means comprises third arithmetic means for obtaining state signals showing pairs of the row and column differentials on the basis of the differential data and supplying the state signals to the first arithmetic means, and the first arithmetic means comprises fourth arithmetic means for obtaining row and column differential signals from the state signals.

The inventive method of generating zigzag addresses is adapted to compress information required for generating the zigzag addresses, store the same as differential data and restore the differential data for generating zigzag addresses, whereby the amount of data to be stored can be reduced.

Further, the inventive circuit for generating zigzag addresses restores zigzag addresses from differential data in a simple structure.

According to the inventive method of generating zigzag addresses, as hereinabove described, only differential data forming the basis for generating memory addresses to be generated in a zigzag manner may be stored so that the zigzag addresses can be generated in a simple algorithm and the necessary storage capacity can be reduced.

Hence, an object of the present invention is to provide a method of generating zigzag addresses which is expressed in a simple algorithm, and a circuit for generating the zigzag addresses.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing an incrementer/decrementer 8a;

FIG. 22 is a timing chart for illustrating the third embodiment of the present invention;

FIG. 23 is a timing chart for illustrating the third embodiment of the present invention;

DESCRIPTION OF THE PREFERRED EMBODIMENTS

A. Zigzag Addresses

Figure 61:
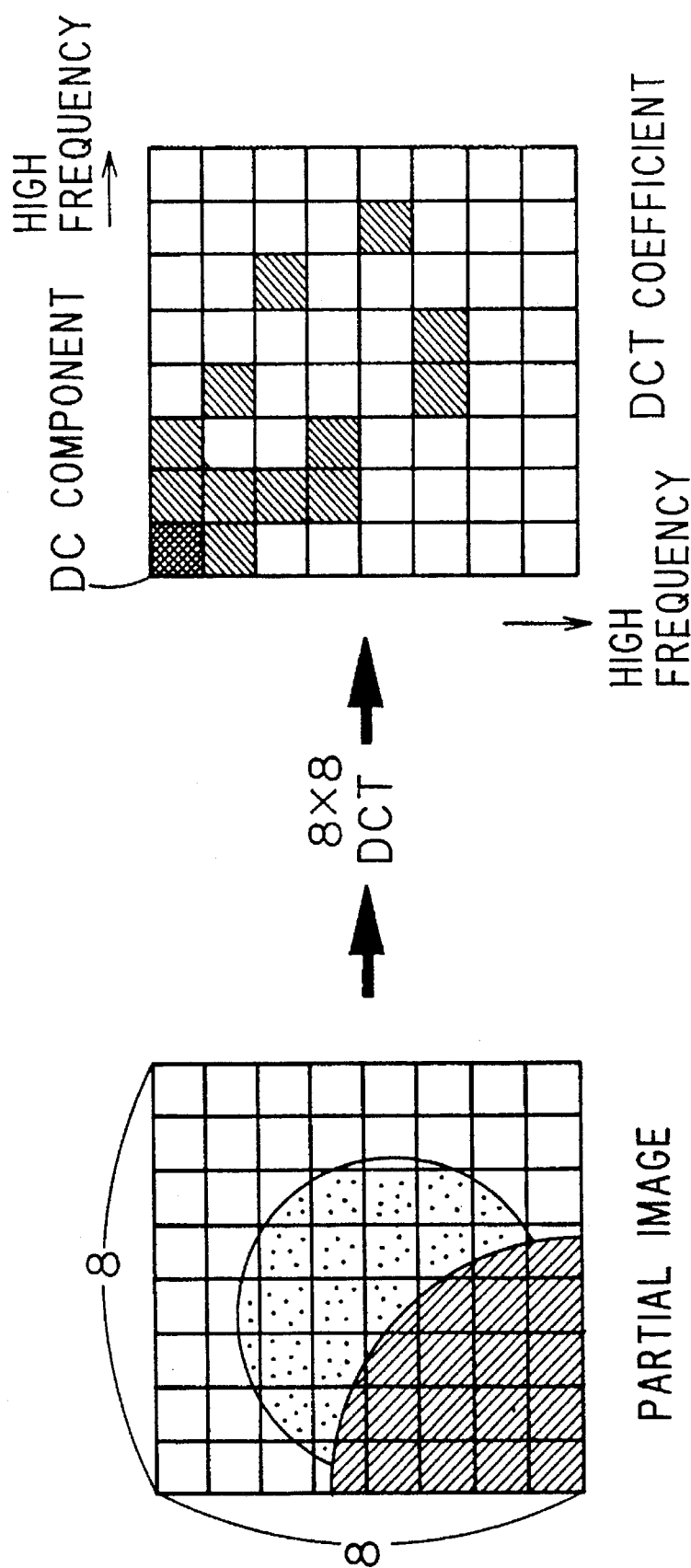
FIG. 61 is an explanatory diagram of a DCT.

Before describing embodiments of the present invention, zigzag addresses are now briefly explained. One of methods of compressing image data utilizes two-dimensional DCT (discrete cosine transformation). First, an untransformed image is cut into n pixels by n pixels. FIG. 61 illustrates this, on the assumption that n=8. The untransformed image shown on the left side is a partial image which is cut into 8 images by 8 images. One-dimensional DCT operation is performed on this twice to make two-dimensional DCT operation. Results after transformation, which are called DCT coefficients, are in two-dimensional data arrangement, as shown in the right side of FIG. 61. DCT coefficients located on hatched portions are nonzero, and other components are zero. A coefficient located on the left upper corner of the two-dimensional arrangement of the DOT coefficients is the DC component, and frequencies of the components are increased downwardly to the right. When image data are DC-transformed, high-frequency components of the DCT coefficients are reduced as compared with the DC component thereof.

Figures 62, 63, 64:
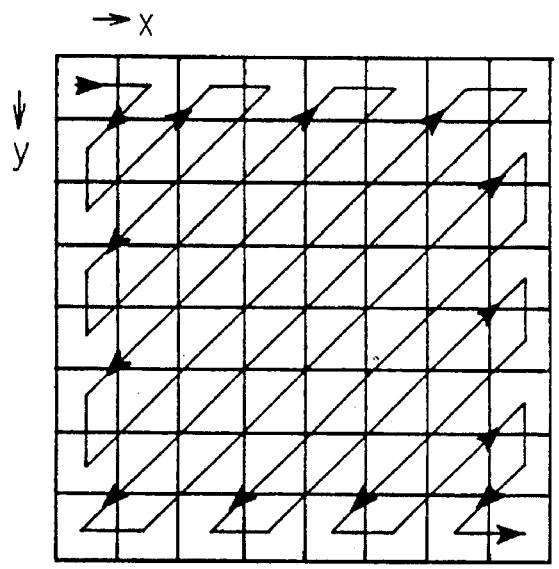
FIG. 62 is an explanatory diagram of zigzag addresses.
FIG. 63 is an explanatory diagram of zigzag addresses.
FIG. 64 is an explanatory diagram of zigzag addresses.

In order to compress DCT coefficients having a great deal of zeroed portions, the DCT coefficients are successively sequenced from the DC component thereof toward the highest frequency component, and zeroed components are converted to zero run length codes. The order of such sequencing from the DC component toward the highest frequency component is obtained by scanning the two-dimensional arrangement of the DCT coefficients in a zigzag manner, as shown in FIG. 62. Namely, the sequencing order is expressed in the series shown in FIG. 63. On the other hand, the two-dimensional arrangement of the DCT coefficients is supplied with zigzag addresses which are continuous in certain rows (direction x) as well as between last columns of upper rows and first columns of lower rows in adjacent pairs of rows, as shown in FIG. 64. In order to perform the aforementioned data compression, therefore, it is necessary to generate the zigzag addresses shown in FIG. 64 in the order shown in FIG. 63. Table 1 shows this.

TABLE 1

| GENERATION ORDER | 0  | 1  | 2  | 3  | 4  | 5  | 6  | 7  |
|---|---|---|---|---|---|---|---|---|
| ZIGZAG ADDRESS   | 0  | 1  | 8  | 16 | 9  | 2  | 3  | 10 |
| GENERATION ORDER | 8  | 9  | 10 | 11 | 12 | 13 | 14 | 15 |
| ZIGZAG ADDRESS   | 17 | 24 | 32 | 25 | 18 | 11 | 4  | 5  |
| GENERATION ORDER | 16 | 17 | 18 | 19 | 20 | 21 | 22 | 23 |
| ZIGZAG ADDRESS   | 12 | 19 | 26 | 33 | 40 | 48 | 41 | 34 |
| GENERATION ORDER | 24 | 25 | 26 | 27 | 28 | 29 | 30 | 31 |
| ZIGZAG ADDRESS   | 27 | 20 | 13 | 6  | 7  | 14 | 21 | 28 |
| GENERATION ORDER | 32 | 33 | 34 | 35 | 36 | 37 | 38 | 39 |
| ZIGZAG ADDRESS   | 35 | 42 | 49 | 56 | 67 | 50 | 43 | 36 |
| GENERATION ORDER | 40 | 41 | 42 | 43 | 44 | 45 | 46 | 47 |
| ZIGZAG ADDRESS   | 29 | 22 | 15 | 23 | 30 | 37 | 44 | 51 |
| GENERATION ORDER | 48 | 49 | 50 | 51 | 52 | 53 | 54 | 55 |
| ZIGZAG ADDRESS   | 58 | 59 | 52 | 45 | 38 | 31 | 39 | 46 |
| GENERATION ORDER | 56 | 57 | 58 | 59 | 60 | 61 | 62 | 63 |
| ZIGZAG ADDRESS   | 53 | 60 | 61 | 54 | 47 | 55 | 62 | 63 |

The zigzag addresses shown in Table 1 are called zigzag addresses due to the mode of the generation order. The conventional zigzag address generation circuit shown in FIG. 59 stores the contents of Table 1 in the storage element 6 along the order of generation. Thus, the amount of data to be stored is so increased that it is difficult to reduce the circuit scale, as described above.

Figure 60:
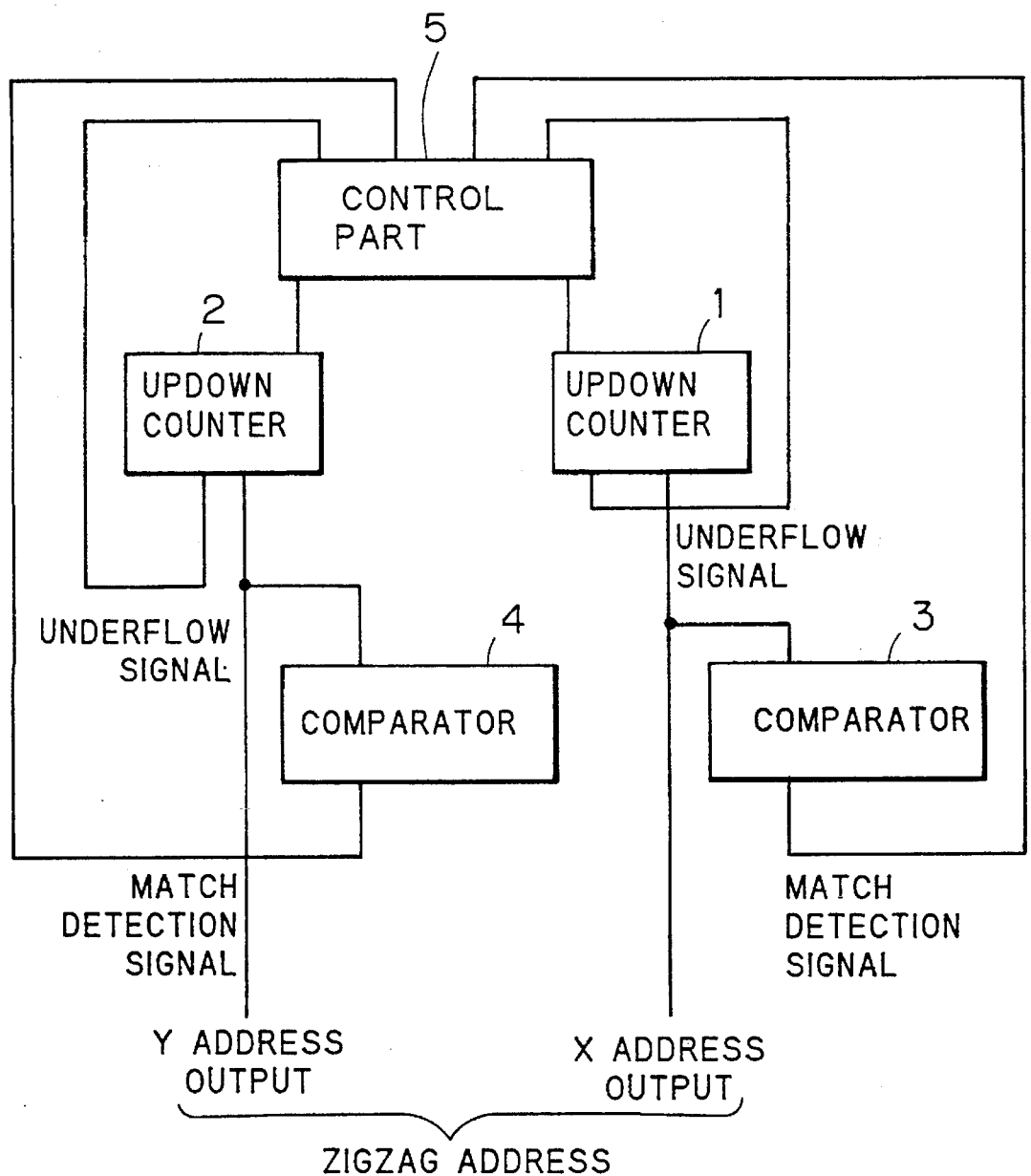
FIG. 60 is a block diagram showing another conventional zigzag address generation circuit.

On the other hand, the conventional zigzag address generation circuit shown in FIG. 60 outputs column and row addresses deciding positions along directions x and y shown in FIGS. 62 to 64, thereby obtaining zigzag addresses.

The present invention is adapted to store differential data for generating the column and row addresses as data to be stored as hereinafter described, to obtain row and column addresses by performing prescribed processing on the differential data.

B. Embodiments

The present invention is now described with reference to the embodiments. In order to simplify the illustration, it is assumed that each partial image is divided into 8 images by 8 images. In this case, DC-transformed data are also in two-dimensional arrangement of 8 by 8 data, as described with reference to "A. Zigzag Addresses". Description is made in such case that zigzag addresses as to this arrangement are supplied as shown in FIG. 64. As described later in "C. Modifications", the present invention is also applicable to such case that a zigzag address as to the left upper corner, i.e., the DC component is not necessarily zero, while it is assumed that zigzag addresses to be generated are integers of zero to 63 in the following description of the embodiments, for the purpose of simplification. In this case, it is possible to specify the zigzag addresses by 3-bit information x showing the direction x and 3-bit information y showing the direction y. Namely, the information y and the information x define the positions of the rows and columns of the zigzag addresses to be specified respectively, similarly to the prior art shown in FIG. 60. When a zigzag address to be specified is "37" and this is expressed in a 6-bit signal, for example, the high-order 3 bits "100" and the low-order 3 bits "101" thereof correspond to the information y and the information x respectively. Therefore, the information x and the information y are hereinafter referred to as "low-order 3 bits" or "column addresses" and "high-order 3 bits" or "row addresses" respectively.

(B-1) First Embodiment

A first embodiment of the present invention is now described. When high-order 3 bits y and low-order 3 bits x are prescribed, zigzag addresses to be specified are obtained. In order to generate zigzag addresses, therefore, the high-order 3 bits y and the low-order 3 bits x may be generated. Referring to Table 2, the left two columns show the same contents as those in Table 1, while high-order 3 bits y and low-order 3 bits x are shown in the third and fourth columns from the left respectively.

TABLE 2

| GENERATION ORDER | ZIGZAG ADDRESS Ad | HIGH-ORDER 3-BITS y | LOW-ORDER 3-BITS x | ROW DIFFERENTIAL Δy | COLUMN DIFFERENTIAL Δx |
|---|---|---|---|---|---|
| 0 | 0 | 0 | 0 | | |
| 1 | 1 | 0 | 1 | 0 | 1 |
| 2 | 8 | 1 | 0 | 1 | −1 |
| 3 | 16 | 2 | 0 | 1 | 0 |
| 4 | 9 | 1 | 1 | −1 | 1 |
| 5 | 2 | 0 | 2 | −1 | 1 |
| 6 | 3 | 0 | 3 | 0 | 1 |
| 7 | 10 | 1 | 2 | 1 | −1 |
| 8 | 17 | 2 | 1 | 1 | −1 |
| 9 | 24 | 3 | 0 | 1 | −1 |
| 10 | 32 | 4 | 0 | 1 | 0 |
| 11 | 25 | 3 | 1 | −1 | 1 |
| 12 | 18 | 2 | 2 | −1 | 1 |
| 13 | 11 | 1 | 3 | −1 | 1 |
| 14 | 4 | 0 | 4 | −1 | 1 |
| 15 | 5 | 0 | 5 | 0 | 1 |
| 16 | 12 | 1 | 4 | 1 | −1 |
| 17 | 19 | 2 | 3 | 1 | −1 |
| 18 | 26 | 3 | 2 | 1 | −1 |
| 19 | 33 | 4 | 1 | 1 | −1 |
| 20 | 40 | 5 | 0 | 1 | −1 |
| 21 | 48 | 6 | 0 | 1 | 0 |
| 22 | 41 | 5 | 1 | −1 | 1 |
| 23 | 34 | 4 | 2 | −1 | 1 |
| 24 | 27 | 3 | 3 | −1 | 1 |
| 25 | 20 | 2 | 4 | −1 | 1 |
| 26 | 13 | 1 | 5 | −1 | 1 |
| 27 | 6 | 0 | 6 | −1 | 1 |
| 28 | 7 | 0 | 7 | 0 | 1 |
| 29 | 14 | 1 | 6 | 1 | −1 |
| 30 | 21 | 2 | 5 | 1 | −1 |
| 31 | 28 | 3 | 4 | 1 | −1 |
| 32 | 35 | 4 | 3 | 1 | −1 |
| 33 | 42 | 5 | 2 | 1 | −1 |
| 34 | 49 | 6 | 1 | 1 | −1 |
| 35 | 56 | 7 | 0 | 1 | −1 |
| 36 | 67 | 7 | 1 | 0 | 1 |
| 37 | 50 | 6 | 2 | −1 | 1 |
| 38 | 43 | 5 | 3 | −1 | 1 |
| 39 | 36 | 4 | 4 | −1 | 1 |
| 40 | 29 | 3 | 5 | −1 | 1 |
| 41 | 22 | 2 | 6 | −1 | 1 |
| 42 | 15 | 1 | 7 | −1 | 1 |
| 43 | 23 | 2 | 7 | 1 | 0 |
| 44 | 30 | 3 | 6 | 1 | −1 |
| 45 | 37 | 4 | 5 | 1 | −1 |
| 46 | 44 | 5 | 4 | 1 | −1 |
| 47 | 51 | 6 | 3 | 1 | −1 |
| 48 | 58 | 7 | 2 | 1 | −1 |
| 49 | 59 | 7 | 3 | 0 | 1 |
| 50 | 52 | 6 | 4 | −1 | 1 |
| 51 | 45 | 5 | 5 | −1 | 1 |
| 52 | 38 | 4 | 6 | −1 | 1 |
| 53 | 31 | 3 | 7 | −1 | 1 |
| 54 | 39 | 4 | 7 | 1 | 0 |
| 55 | 46 | 5 | 6 | 1 | −1 |
| 56 | 53 | 6 | 5 | 1 | −1 |
| 57 | 60 | 7 | 4 | 1 | −1 |
| 58 | 61 | 7 | 5 | 0 | 1 |
| 59 | 54 | 6 | 6 | −1 | 1 |
| 60 | 47 | 5 | 7 | −1 | 1 |
| 61 | 55 | 6 | 7 | 1 | 0 |
| 62 | 62 | 7 | 6 | 1 | −1 |
| 63 | 63 | 7 | 7 | 0 | 1 |

As to the aforementioned example, the zigzag address "37" shown as "4" and "5" (i.e., "100" and "101" in bits) in respective ones of the high-order 3 bits y and the low-order 3 bits x, to be generated as the 45-th one.

Figure 59:
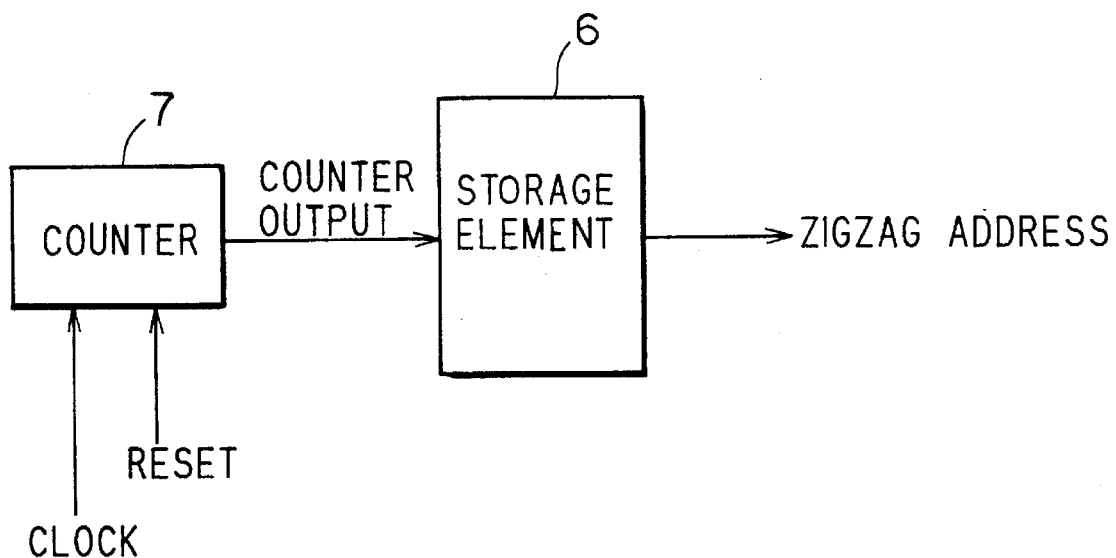
FIG. 59 is a block diagram showing a conventional zigzag address generation circuit.

In the conventional zigzag address generation circuit shown in FIG. 59, for example, each zigzag address has 6-bit information and it is necessary to store this as to all of 64 zigzag addresses, and hence the amount of data to be stored is as follows:

$$6 \text{ (bits)} \times 64 = 384 \text{ (bits)} \qquad (1)$$

However, since the zigzag addresses are successively generated in a zigzag manner, each of successively changed high-order 3 bits y and low-order 3 bits x can take only three modes of "incremented by 1", "decremented by 1" and "neither incremented nor decremented". When only information defining which one of these three modes is caused is stored, therefore, it is possible to successively generate new zigzag addresses. Namely, row differentials Δy and column differentials Δx may be stored as to information defining three change modes of the row addresses y and information defining three change modes of the column addresses x respectively. Thus, the zigzag addresses to be generated are obtained from the row and column addresses y and x, while the row and column addresses y and x are obtained from the row and column differentials Δy and Δx. The data forming the basis for obtaining the zigzag addresses are called "differential data" throughout the specification.

In this case, each of the row and column differentials Δy and Δx may indicate three modes, whereby the amount of necessary information may be sufficiently formed by two bits per change of one zigzag address. On the other hand, the row and column differentials Δy and Δx are adapted to bridge from certain zigzag addresses to next zigzag addresses, the number of the differentials may be smaller by one than the total number of the zigzag addresses to be generated. Thus, the amount of data to be stored may be as follows:

$$2\times[2 \text{ (bits)}\times(64-1)]=252 \text{ (bits)} \qquad (2)$$

The row and column differentials Δy and Δx are shown in the fifth and sixth columns from the left in Table 2 respectively. In order to obtain a zigzag address to be generated as a 46-th one following the zigzag address "37" to be generated as a 45-th one as described above, for example, the row and column differentials Δy and Δx in the stage described as "46" in the column of "generation order". It is understood from Table 2 that the row differential Δy is "1" and the column differential Δx is "−1". Thus, $$y=4+\Delta y=5, \; x=5+\Delta x=4 \qquad (3)$$

whereby the row and column addresses y and x are obtained respectively, while $$(\text{address to be generated})=8\times y+x=44 \qquad (4)$$

whereby the zigzag address "44" is obtained.

Figure 1:
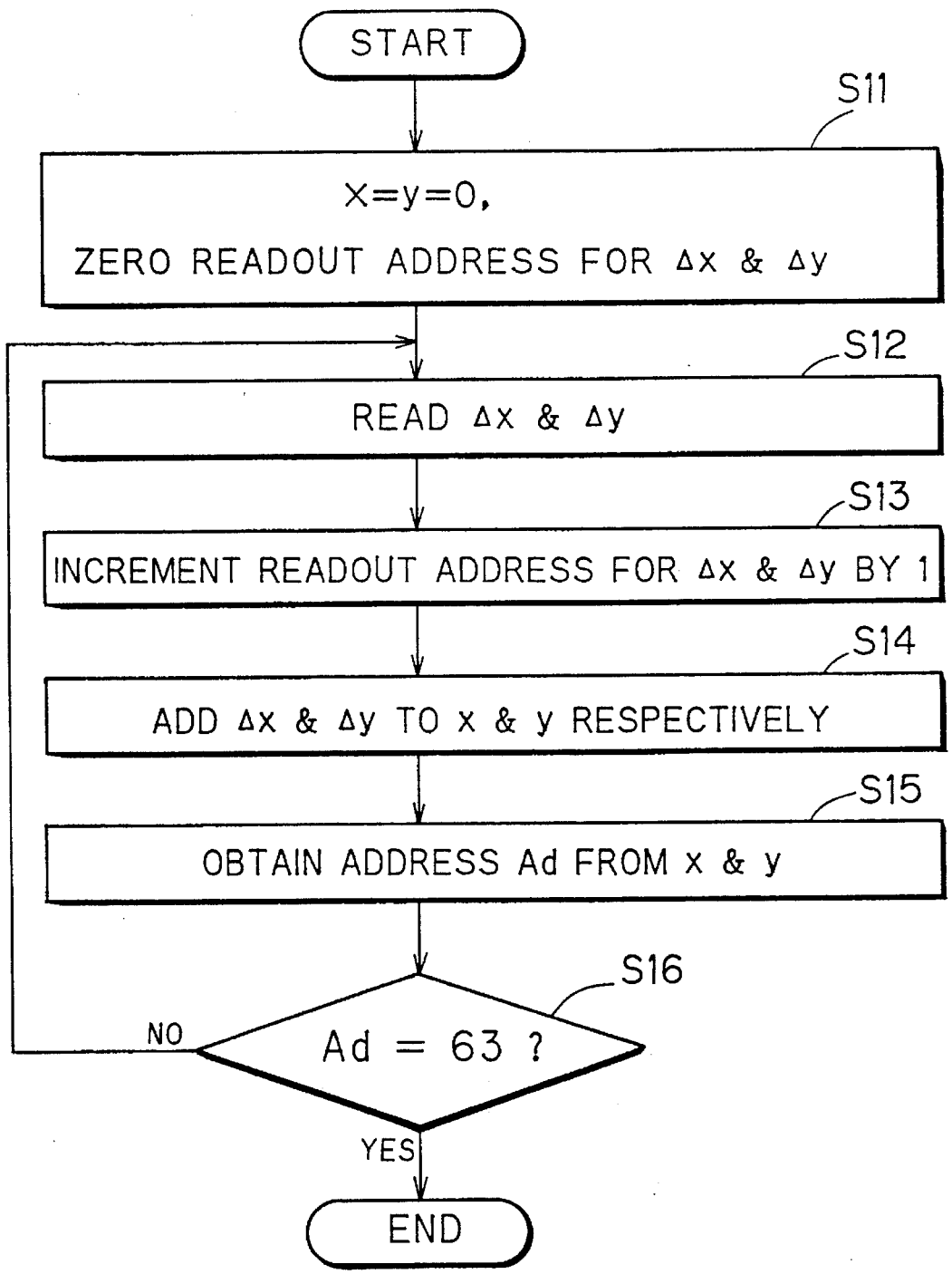
FIG. 1 is a flow chart showing the procedure of a first embodiment of the present invention.

FIG. 1 shows a general algorithm in the form of a flow chart. At a step S11, all of the row and column addresses y and x are zeroed to initialize zigzag addresses Ad. The zigzag addresses Ad are zeroed, as a matter of course. Further, readout addresses for reading the row and column differentials Δy and Δx from a storage element (described later) storing the same are also initialized. Table 3 shows data to be stored. It is assumed here that storage of the row and column differentials Δy and Δx are started from a readout address "0".

The aforementioned three modes "incremented by 1", "decremented by 1" and "neither incremented nor decremented" of zigzag address changes are expressed in two-bit signals "01", "11" and "00" respectively, and such expression by two-bit signals is common in the row and column differentials Δy and Δx.

TABLE 3

| READOUT ADDRESS | ROW DIFFERENTIAL Δy | COLUMN DIFFERENTIAL Δx |
|---|---|---|
| 0 | 00 | 01 |
| 1 | 01 | 11 |
| 2 | 01 | 00 |
| 3 | 11 | 01 |

TABLE 3-continued

| READOUT ADDRESS | ROW DIFFERENTIAL Δy | COLUMN DIFFERENTIAL Δx |
|---|---|---|
| 4 | 11 | 01 |
| 5 | 00 | 01 |
| 6 | 01 | 11 |
| 7 | 01 | 11 |
| 8 | 01 | 11 |
| 9 | 01 | 00 |
| 10 | 11 | 01 |
| 11 | 11 | 01 |
| 12 | 11 | 01 |
| 13 | 11 | 01 |
| 14 | 00 | 01 |
| 15 | 01 | 11 |
| 16 | 01 | 11 |
| 17 | 01 | 11 |
| 18 | 01 | 11 |
| 19 | 01 | 11 |
| 20 | 01 | 00 |
| 21 | 11 | 01 |
| 22 | 11 | 01 |
| 23 | 11 | 01 |
| 24 | 11 | 01 |
| 25 | 11 | 01 |
| 26 | 11 | 01 |
| 27 | 00 | 01 |
| 28 | 01 | 11 |
| 29 | 01 | 11 |
| 30 | 01 | 11 |
| 31 | 01 | 11 |
| 32 | 01 | 11 |
| 33 | 01 | 11 |
| 34 | 01 | 11 |
| 35 | 00 | 01 |
| 36 | 11 | 01 |
| 37 | 11 | 01 |
| 38 | 11 | 01 |
| 39 | 11 | 01 |
| 40 | 11 | 01 |
| 41 | 11 | 01 |
| 42 | 01 | 00 |
| 43 | 01 | 11 |
| 44 | 01 | 11 |
| 45 | 01 | 11 |
| 46 | 01 | 11 |
| 47 | 01 | 11 |
| 48 | 00 | 01 |
| 49 | 11 | 01 |
| 50 | 11 | 01 |
| 51 | 11 | 01 |
| 52 | 11 | 01 |
| 53 | 01 | 00 |
| 54 | 01 | 11 |
| 55 | 01 | 11 |
| 56 | 01 | 11 |
| 57 | 00 | 01 |
| 58 | 11 | 01 |
| 59 | 11 | 01 |
| 60 | 01 | 00 |
| 61 | 01 | 11 |
| 62 | 00 | 01 |
| 63 | — | — |

Then, the row and column differentials Δy and Δx are read at a step S12. Preparation for obtaining a next zigzag address Ad is made at a step S13. Namely, the readout address is incremented by 1.

At a step S14, the row and column differentials Δy and Δx are added to the row and column addresses y and x respectively. Thereafter the zigzag address Ad is obtained from the row and column addresses y and x (step S15).

When the zigzag address Ad reaches "63", all zigzag addresses are completely generated and the procedure is terminated through a step S16 in this case. In other case, the process is returned to the step S12 to repeat the procedure.

Figure 2:
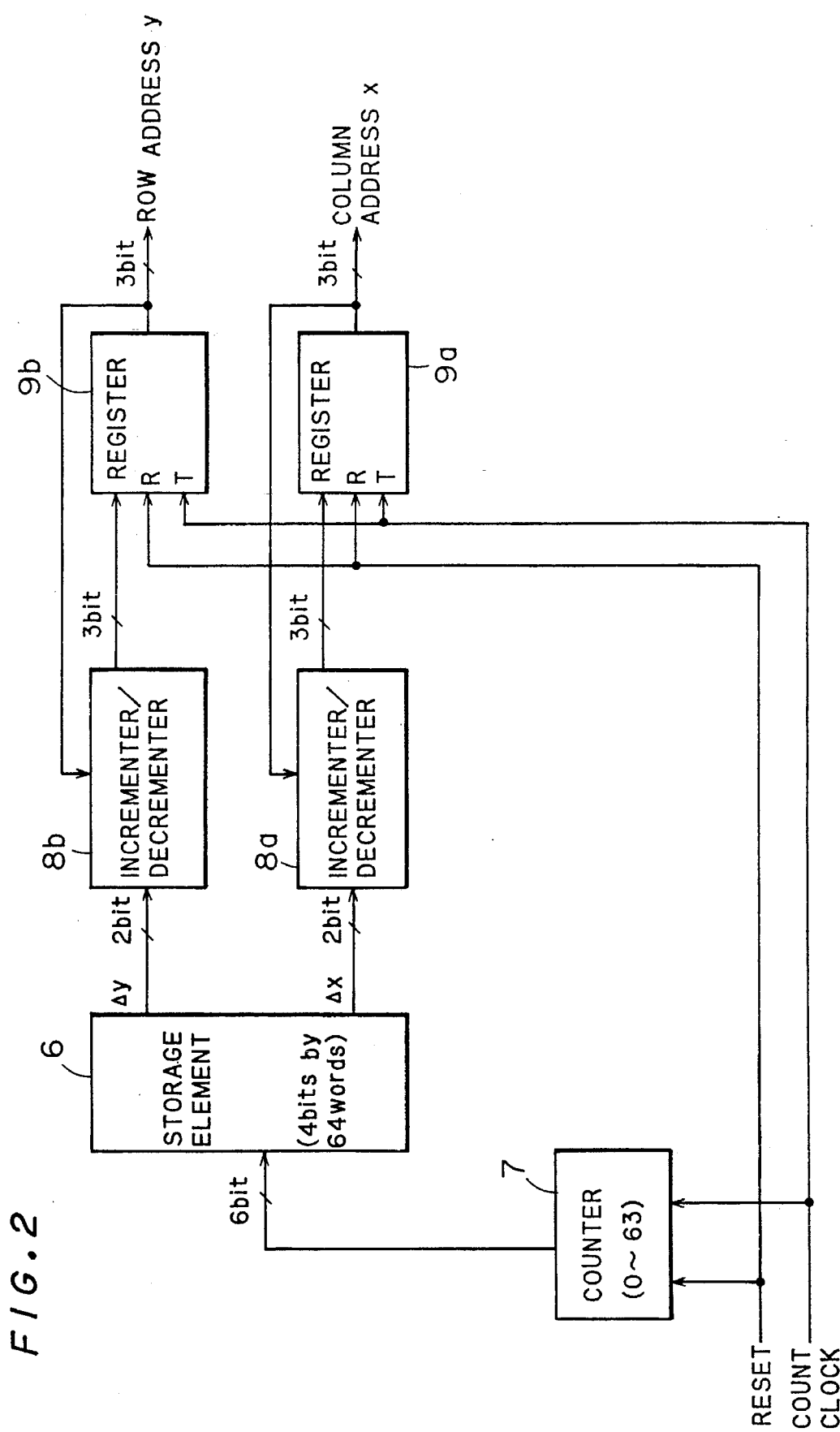
FIG. 2 is a block diagram for illustrating the first embodiment of the present invention.
Figure 3:
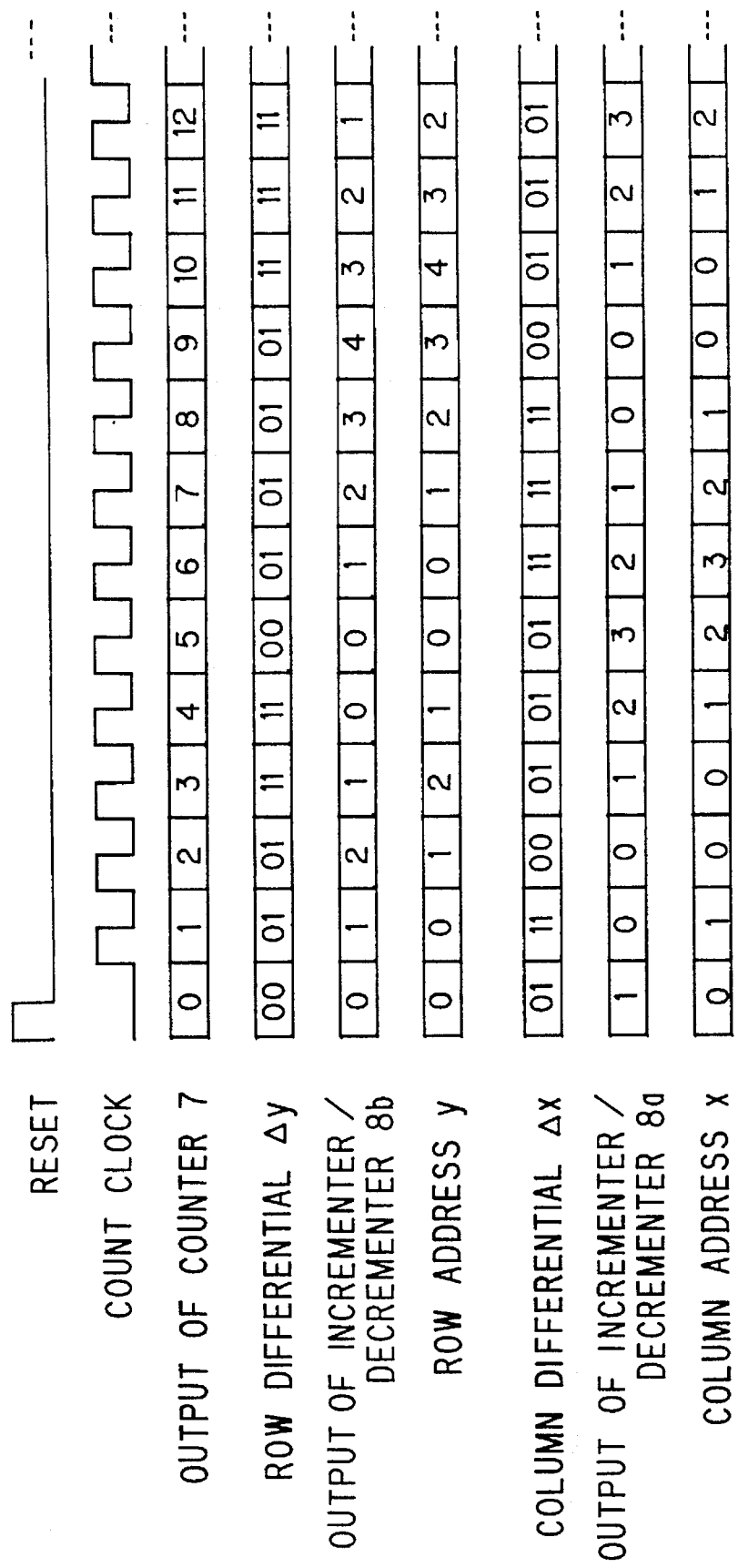
FIG. 3 is a timing chart for illustrating the first embodiment of the present invention.
Figure 4:
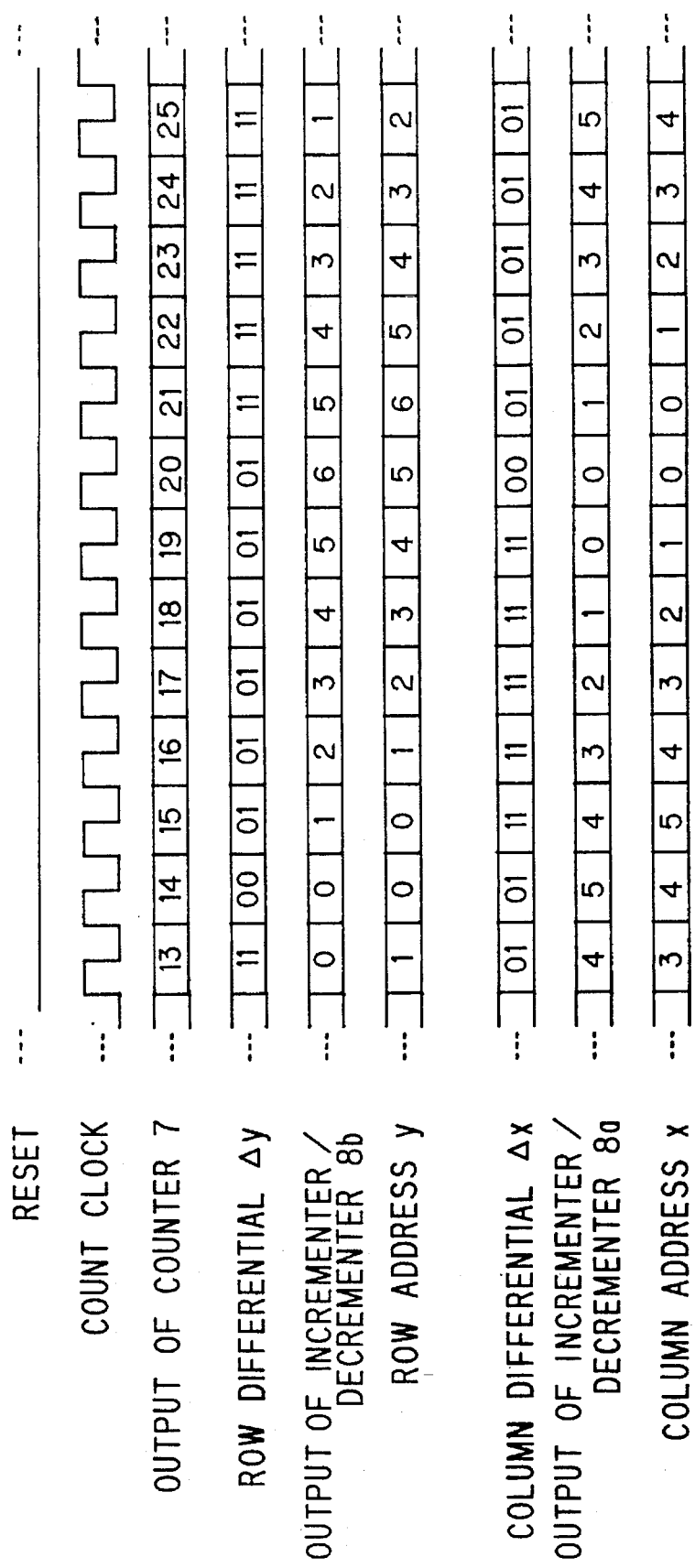
FIG. 4 is a timing chart for illustrating the first embodiment of the present invention.
Figure 5:
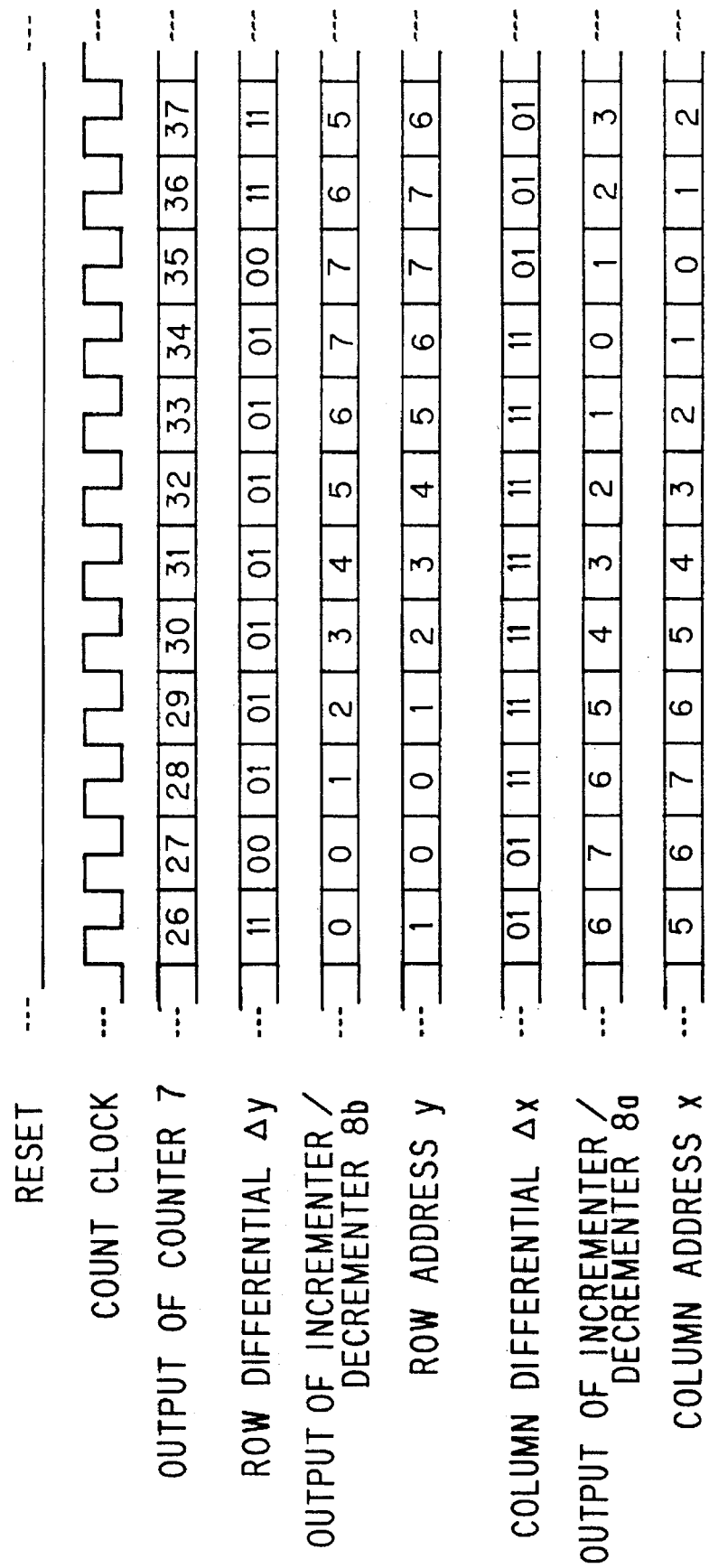
FIG. 5 is a timing chart for illustrating the first embodiment of the present invention.
Figure 6:
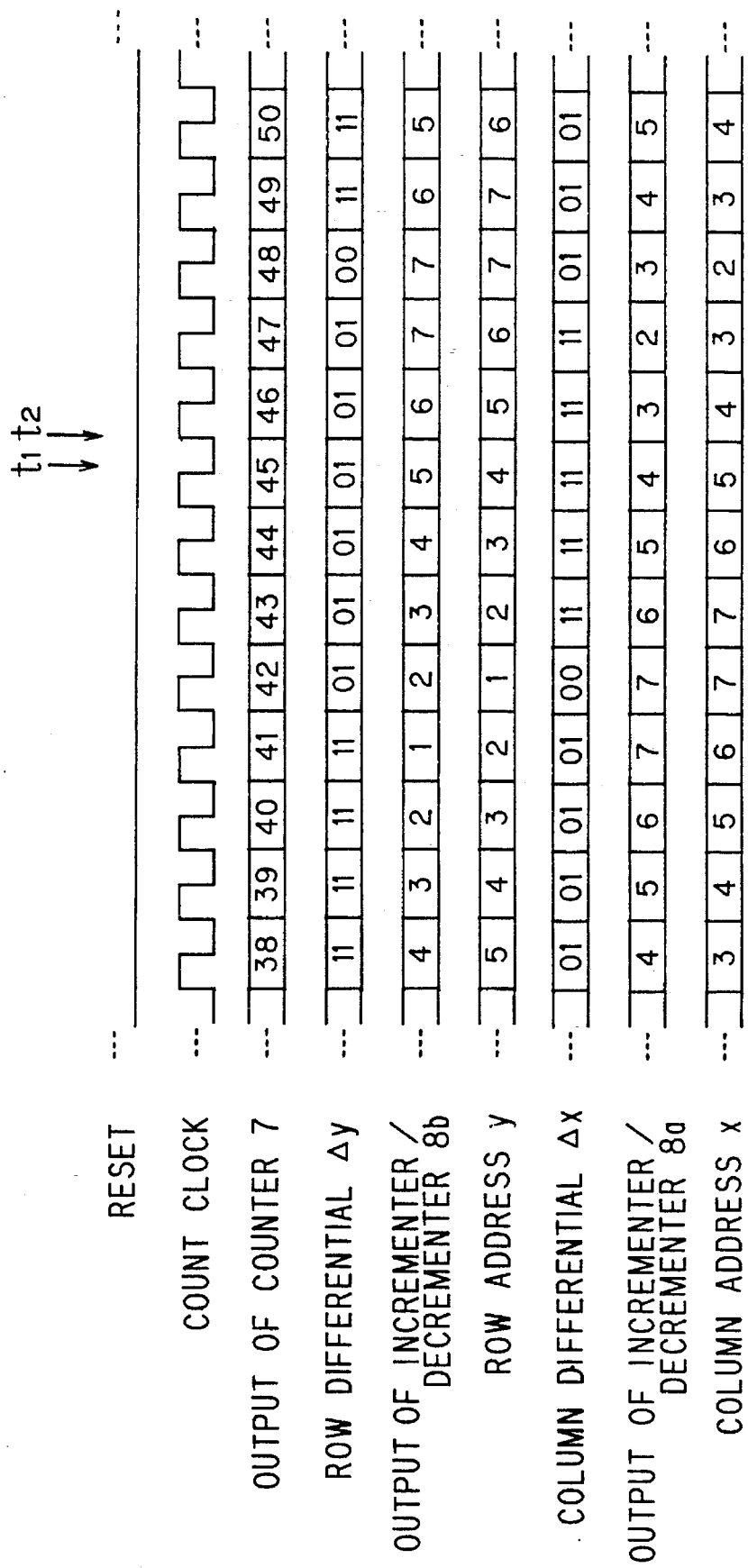
FIG. 6 is a timing chart for illustrating the first embodiment of the present invention.
Figure 7:
FIG. 7 is a timing chart for illustrating the first embodiment of the present invention.

FIG. 2 shows a zigzag address generation circuit for implementing the aforementioned algorithm in practice. A storage element 6 stores row and column differentials $\Delta y$ and $\Delta x$ as differential data for generating row and column addresses y and x. The "readout addresses" at the steps S11 and S13 shown in FIG. 1 indicate zigzag addresses of the storage element 6. Since the row and column differentials $\Delta y$ and $\Delta x$ may be sufficiently formed by two-bit data and 63 differentials are prepared as hereinabove described, a memory of 4 bits by 64 words is illustrated in the figure.

The storage element 6 is supplied with outputs of a counter 7, which successively outputs "0" to "63". Thus, the step S13 shown in FIG. 1 is implemented. The counter 7 receives a reset signal and a clock signal (counter clock). The counter 7 is reset by the reset signal, to implement initialization of readout addresses shown at the step S11 in FIG. 1.

On the other hand, incrementer/decrementers 8b and 8a receive the row and column differentials $\Delta y$ and $\Delta x$ from the storage element 6, to update the row and column addresses y and x respectively. As to the row addresses y, for example, the row addresses y and the row differentials $\Delta y$ are inputted in the incrementer/decrementer 8b and added up with each other to generate new row addresses y. The new row addresses y are temporarily stored in a register 9b, to wait for calculation of next row addresses y. The register 9b is also supplied with the reset and clock signals supplied to the counter 7. Therefore, the row addresses y are initialized at the step S11, while the row addresses y are calculated and outputted at the step S14 in synchronization with the reading of the row differentials $\Delta y$ at the step S12. This is also applied to the column addresses x, such that new column addresses x are obtained in the incrementer/decrementer 8a in synchronization with the clock signal supplied to a register 9a, to be outputted through the register 9a.

FIGS. 3 to 7 show states of generation of the row and column addresses y and x in relation to the clock signal (counter clock. FIGS. 3, 4, 5, 6 and 7 show generation order "0" to "12", generation order "13" to "25", generation order "26" to "37", generation order "38" to "50" and generation order "51" to "63" respectively.

As to the aforementioned example, when a counter clock (clock signal) rises at a time t2 upon lapse of a time from a time (time t1 shown in FIG. 6) when the zigzag address "37" (x=5, y=4) is already generated in the generation order "45", a row differential $\Delta y$ "01" and a column differential $\Delta x$ "11" are read. Thus, the row address y is incremented by one and the column address x is decremented by 1 (x=4, Y=5), and thereafter the zigzag address is calculated.

Figure 8:
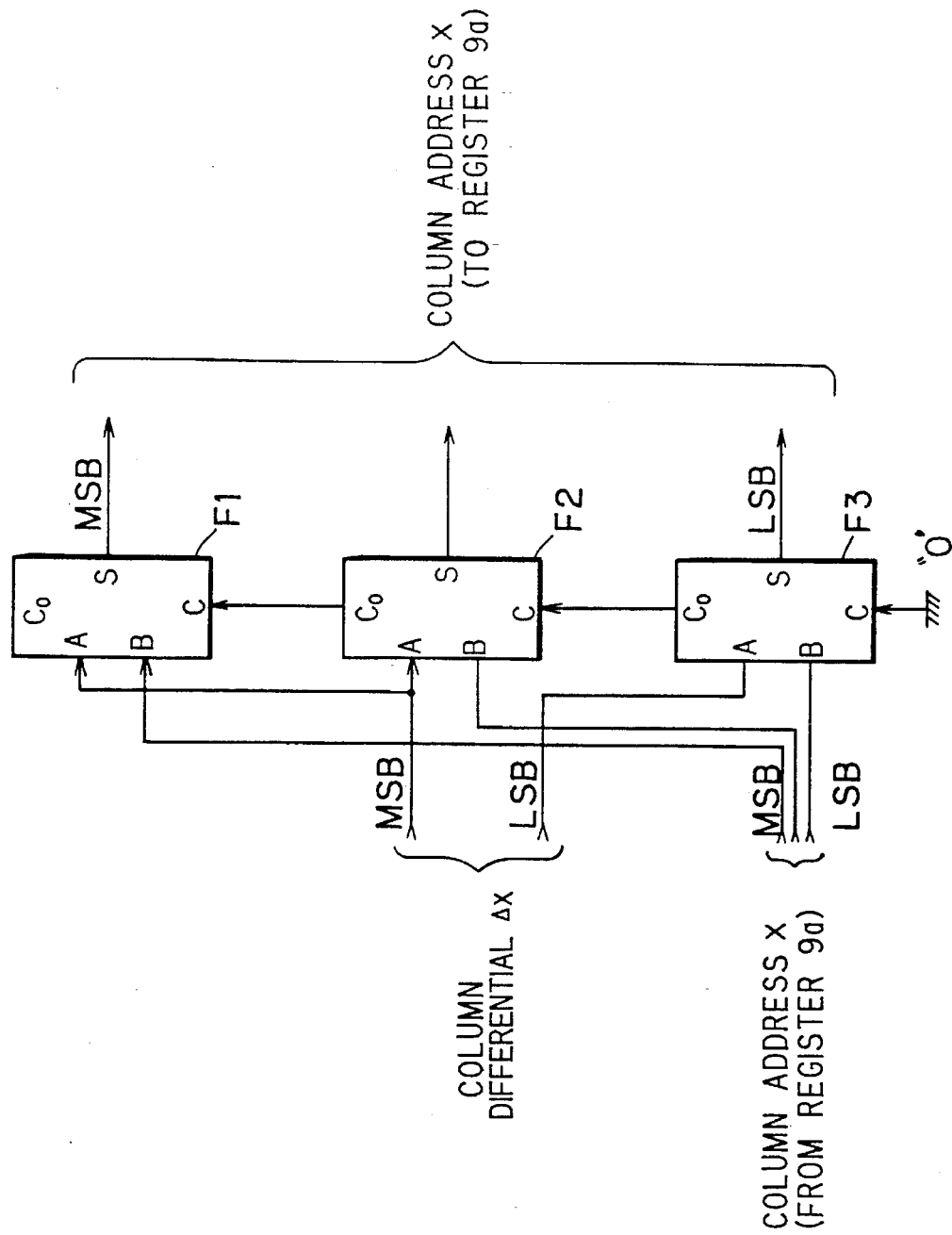

In order to increment and decrement the column addresses x by two-bit signals having values of "01", "11" and "00", the incrementer/decrementer 8a is easily formed by three full adders F1, F2 and F3 as shown in FIG. 8, for example. Referring to FIG. 8, symbols MSB and LSB denote most significant and least significant bits respectively. This also applies to the following description.

(B-2) Second Embodiment

As described with reference to (B-1), the high-order 3 bits y and the low-order 3 bits x are generated from the row and column differentials $\Delta y$ and $\Delta x$ respectively. On the other hand, both row and column differentials $\Delta y$ and $\Delta x$ are symmetrical with respect to the generation order, as understood from Table 2. In 31 stages of the generation order "33" to the generation order "63", these are arranged in order reverse to that in 31 stages of the generation order "1" to the generation order "31". After a zigzag address "35" to be generated in the generation order "32", therefore, the row and column differentials $\Delta y$ and $\Delta x$ may be read in the reverse order. Thereafter the zigzag addresses Ad can be generated similarly to the first embodiment. Thus, the amount of data to be stored for the row and column differentials $\Delta y$ and $\Delta x$ can be reduced as follows:

$$2 \times [2 \text{ (bits)} \times 64/2] = 128 \text{ (bits)} \qquad (5)$$

Table 4 shows the data to be stored. Similarly to Table 3, the readout addresses are started from zero.

TABLE 4

| READOUT ADDRESS | ROW DIFFERENTIAL $\Delta y$ | COLUMN DIFFERENTIAL $\Delta x$ |
|---|---|---|
| 0 | 00 | 01 |
| 1 | 01 | 11 |
| 2 | 01 | 00 |
| 3 | 11 | 01 |
| 4 | 11 | 01 |
| 5 | 00 | 01 |
| 6 | 01 | 11 |
| 7 | 01 | 11 |
| 8 | 01 | 11 |
| 9 | 01 | 00 |
| 10 | 11 | 01 |
| 11 | 11 | 01 |
| 12 | 11 | 01 |
| 13 | 11 | 01 |
| 14 | 00 | 01 |
| 15 | 01 | 11 |
| 16 | 01 | 11 |
| 17 | 01 | 11 |
| 18 | 01 | 11 |
| 19 | 01 | 11 |
| 20 | 01 | 00 |
| 21 | 11 | 01 |
| 22 | 11 | 01 |
| 23 | 11 | 01 |
| 24 | 11 | 01 |
| 25 | 11 | 01 |
| 26 | 11 | 01 |
| 27 | 00 | 01 |
| 28 | 01 | 11 |
| 29 | 01 | 11 |
| 30 | 01 | 11 |
| 31 | 01 | 11 |

Figure 9:
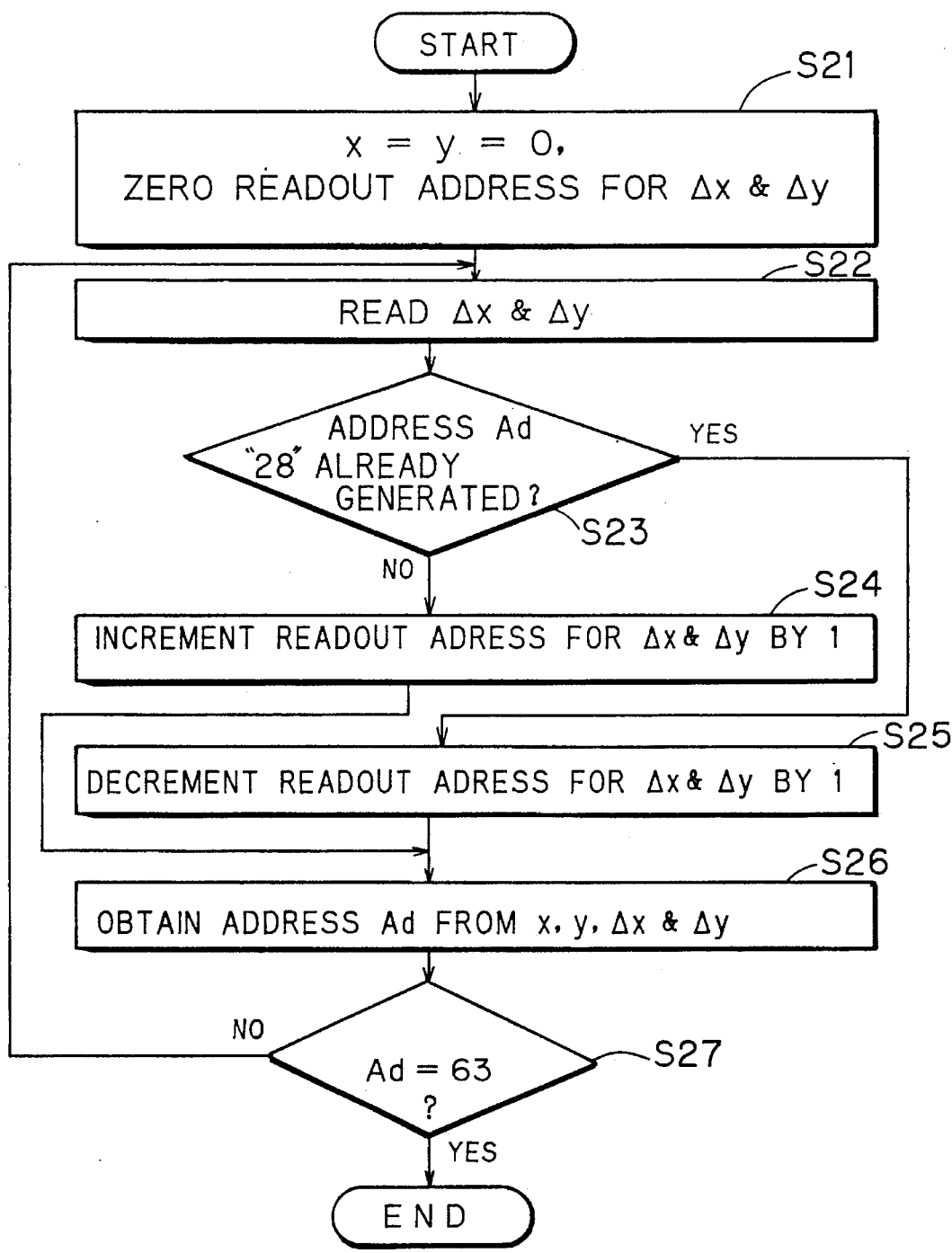
FIG. 9 is a flow chart showing the procedure of a second embodiment of the present invention.
Figure 12:
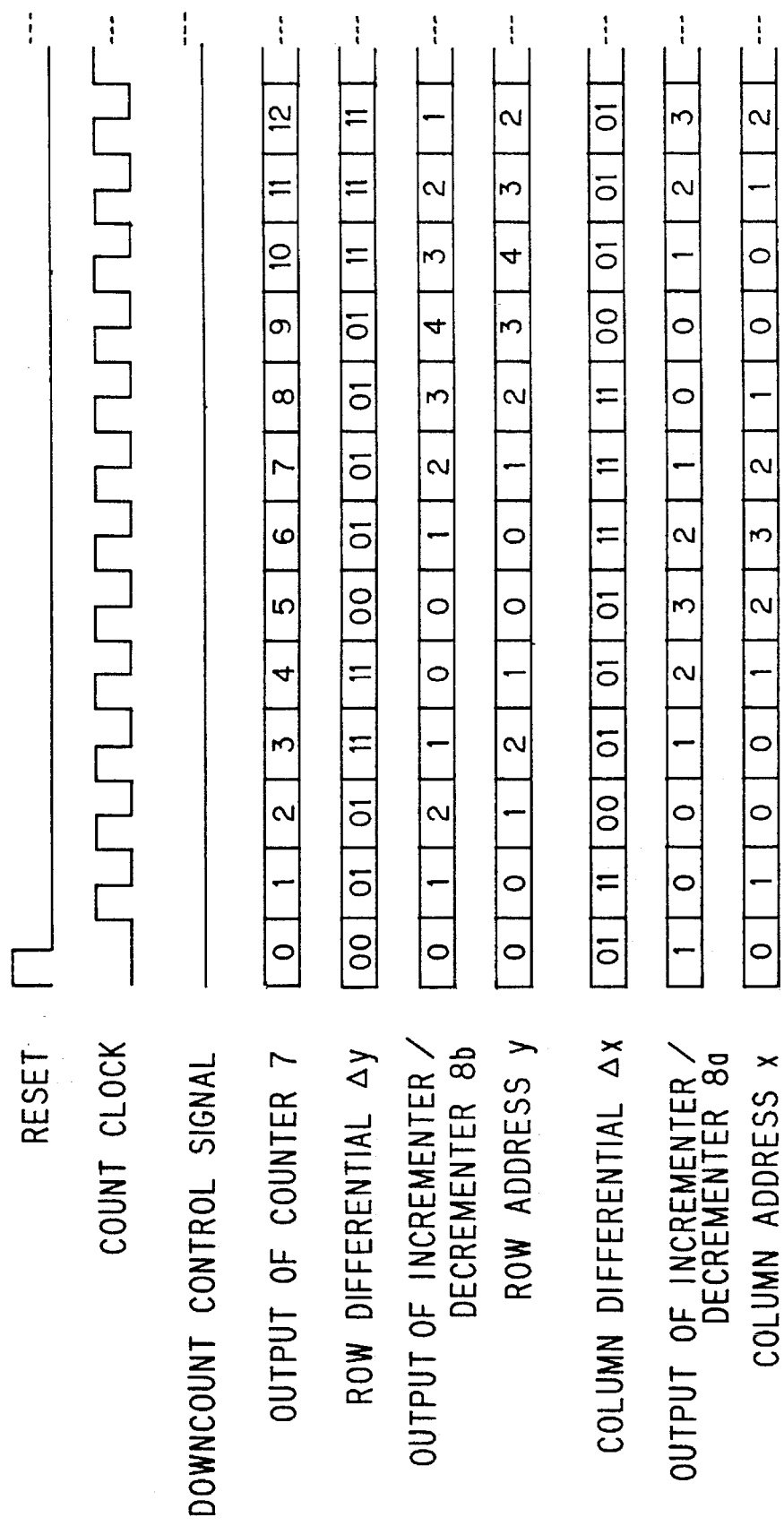
FIG. 12 is a timing chart for illustrating the second embodiment of the present invention.
Figure 13:
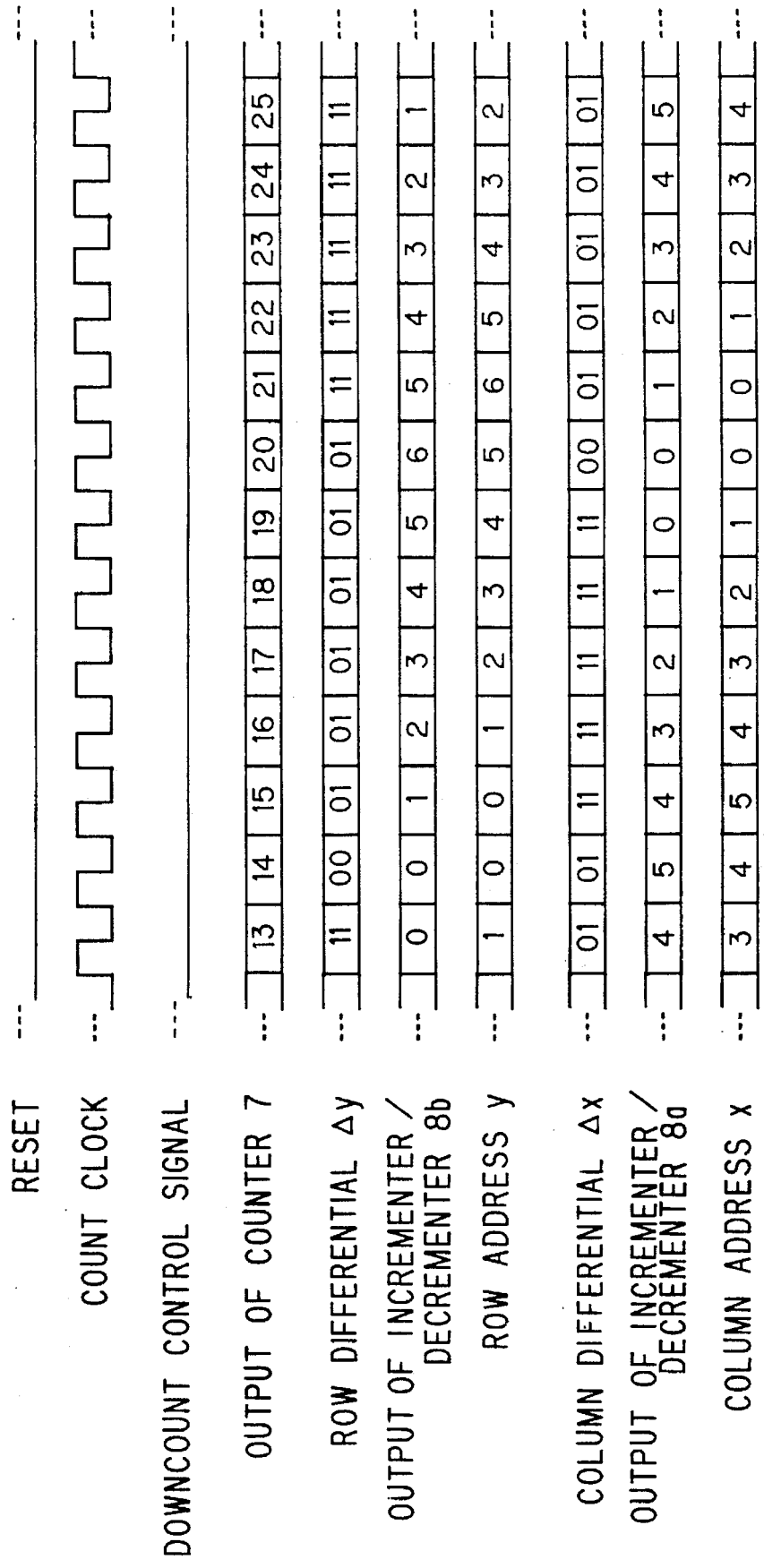
FIG. 13 is a timing chart for illustrating the second embodiment of the present invention.

FIG. 9 shows an algorithm expressing the second embodiment in the form of a flow chart. A step S21 for initialization and a step S22 for reading the row and column differentials $\Delta y$ and $\Delta x$ are similar to the steps S11 and S12 shown in FIG. 12.

Then, a determination is made at a step S23 a to whether or not a zigzag address "28" is already generated. If the zigzag address "28" is not yet generated, the readout address is incremented by 1 at a step S24, similarly to the step S13 shown in FIG. 1. Then, a new zigzag address is obtained at a step S26. These steps are also similar to the steps S14 to S15 shown in FIG. 1.

When the zigzag address "28" is already generated, on the other hand, the process is advanced from the step S23 to a step S25, so that the readout address is decremented by 1. Thereafter the process is advanced to steps S26 and S27. According to the second embodiment, readout addresses are updated (step S24) in advance of the step S26 for obtaining the zigzag addresses in the generation order "0" to the generation order "31", the readout address already corresponds to the stage of the generation order "32" in the stage (step S26) where the zigzag address "28" corresponding to the generation order "31" is generated. At the step S22, the row and column differentials $\Delta y$ and $\Delta x$ stored in a readout address "31" corresponding to the stage of the generation order "32" in Table 2 are read. After such reading, the determination at the step S23, i.e., updating of the zigzag address is performed.

In order to assume that a readout address corresponding to generation order "33" is "30" in advance of generating a zigzag address corresponding to generation order "32" (step S26) and to thereafter successively decrement the readout addresses, therefore, it is necessary to confirm not presence/absence of generation of a zigzag address "35" corresponding to the generation order "32" forming the center of symmetry, but presence/absence of generation of a zigzag address "28" corresponding to the generation order "31".

Figure 10:
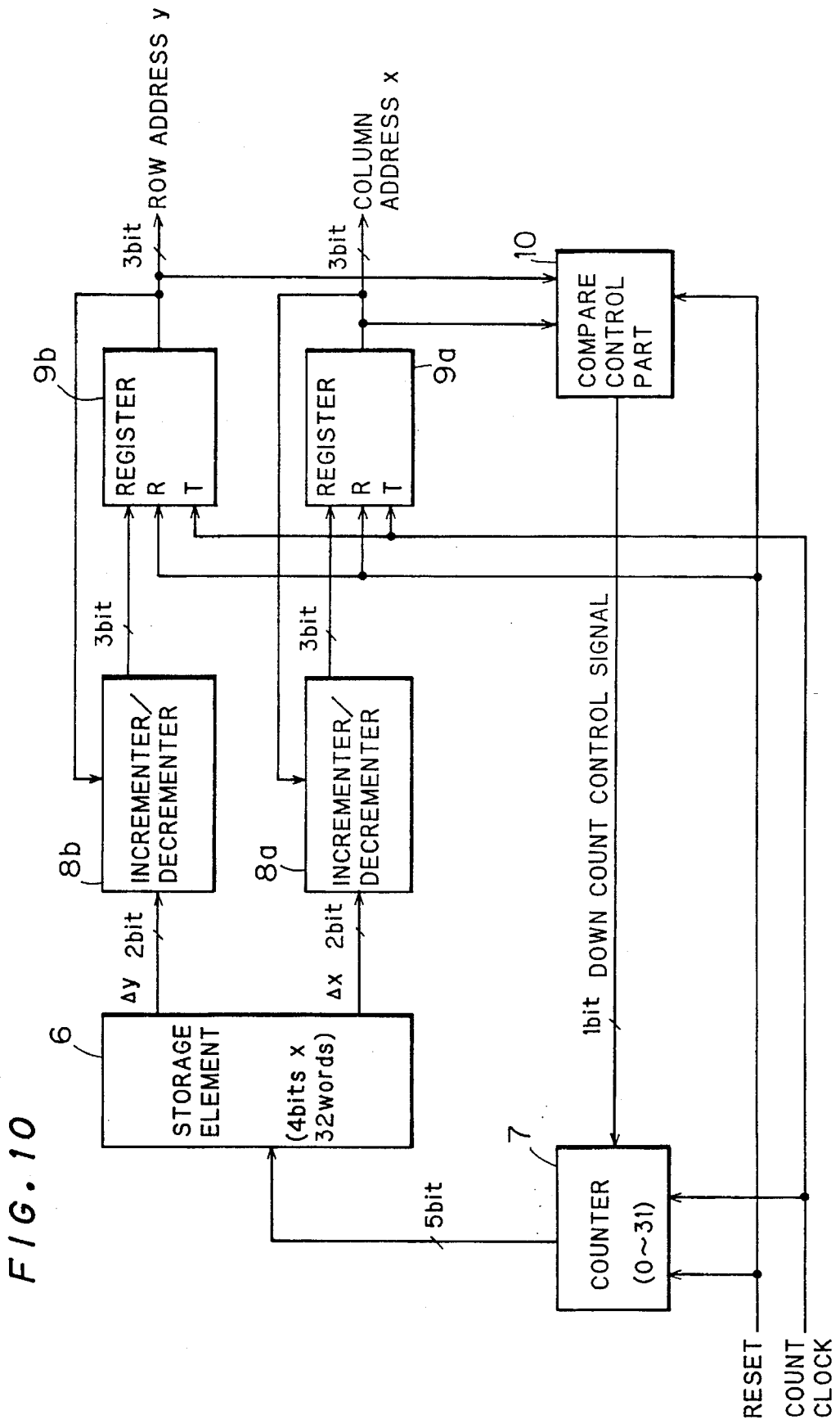
FIG. 10 is a block diagram for illustrating the second embodiment of the present invention.

FIG. 10 shows a zigzag address generation circuit for implementing the aforementioned algorithm in practice. In addition to the circuit shown in FIG. 2, provided with a compare control part 10 for confirming presence/absence of generation of the zigzag address "28" from the row and column addresses y and x for downcounting a counter 7. This circuit is structured similarly to that shown in FIG. 2, except that the capacity of a storage element 6 is reduced to 32 words, the count numbers of the counter 7 are reduced to 0 to 31 and a downcount control signal is supplied from the compare control part 10.

Figure 11:
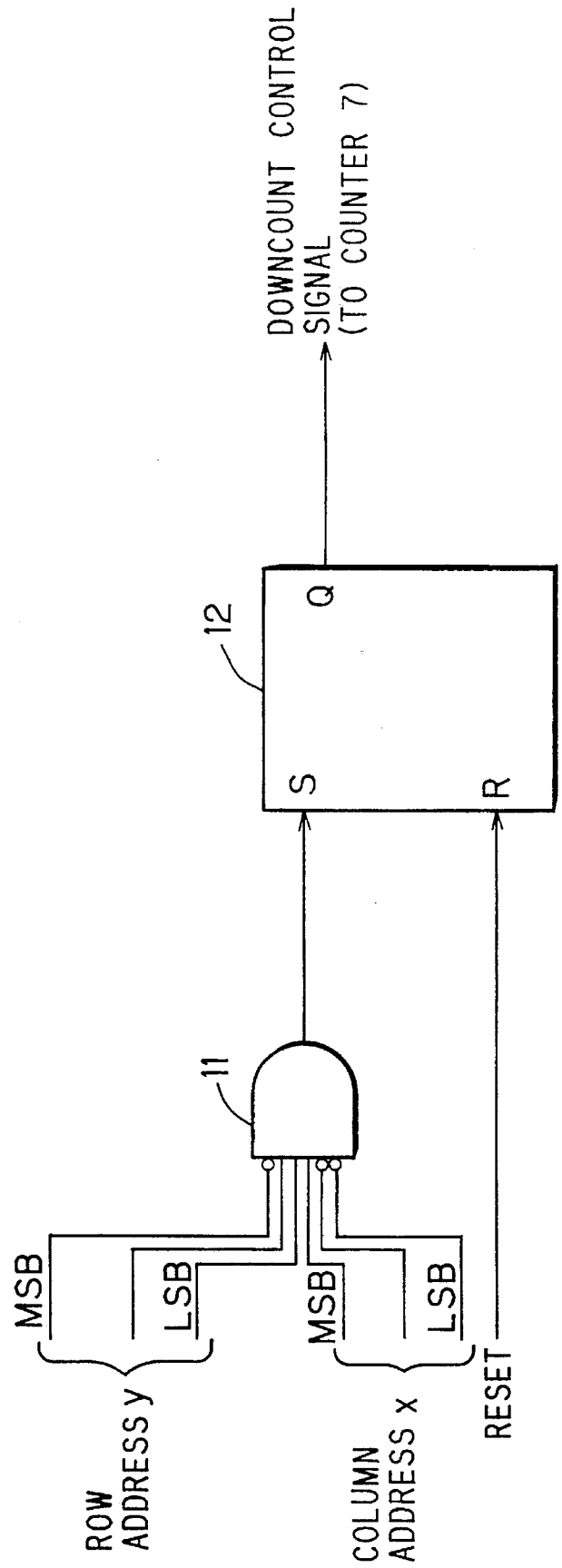
FIG. 11 is a block diagram showing a compare control part 10.

The compare control part 10, which corresponds to the step S23 shown in FIG. 9, is formed by an AND gate 11 and an RS flip-flop 12, as shown in FIG. 11. The AND gate 11 obtains a row address "011" and a column address "100" corresponding to the zigzag address "28" to set the RS flip-flop 12, whereby a downcount control signal is transmitted to the counter 7. The counter 7 operates as a down counter after the same receives the downcount control signal, while the same operates as an up counter before it receives the signal.

Figure 14:
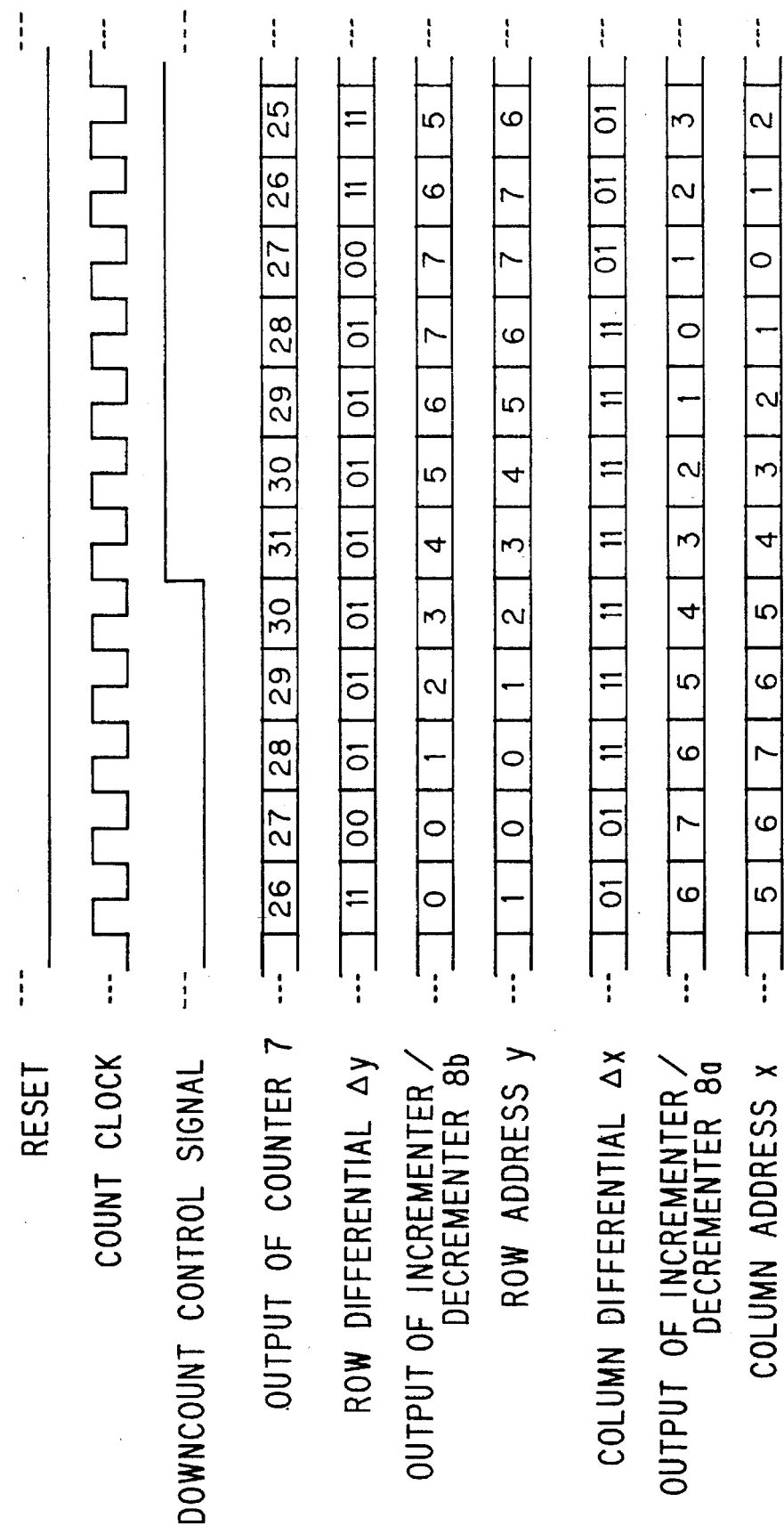
FIG. 14 is a timing chart for illustrating the second embodiment of the present invention.
Figure 15:
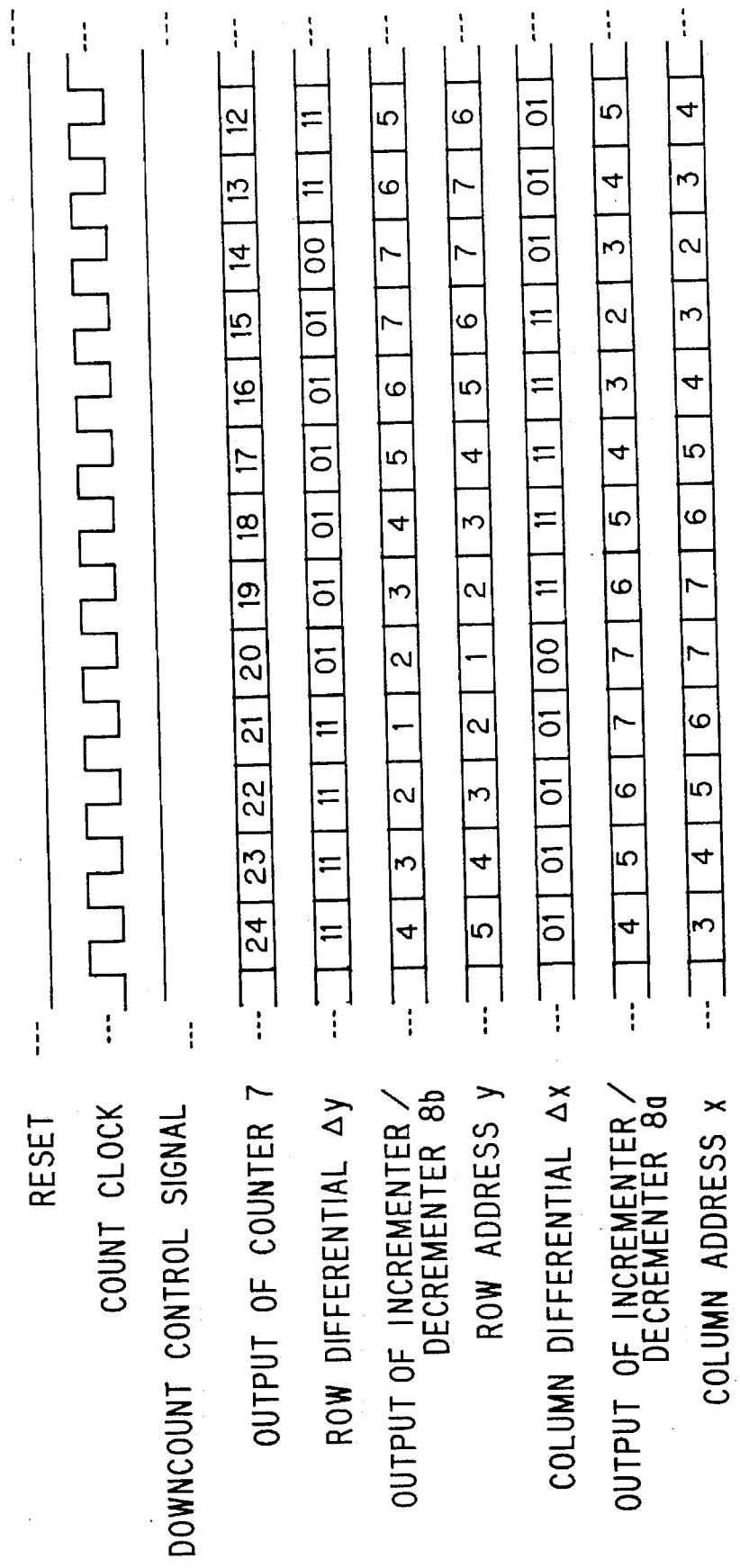
FIG. 15 is a timing chart for illustrating the second embodiment of the present invention.
Figure 16:
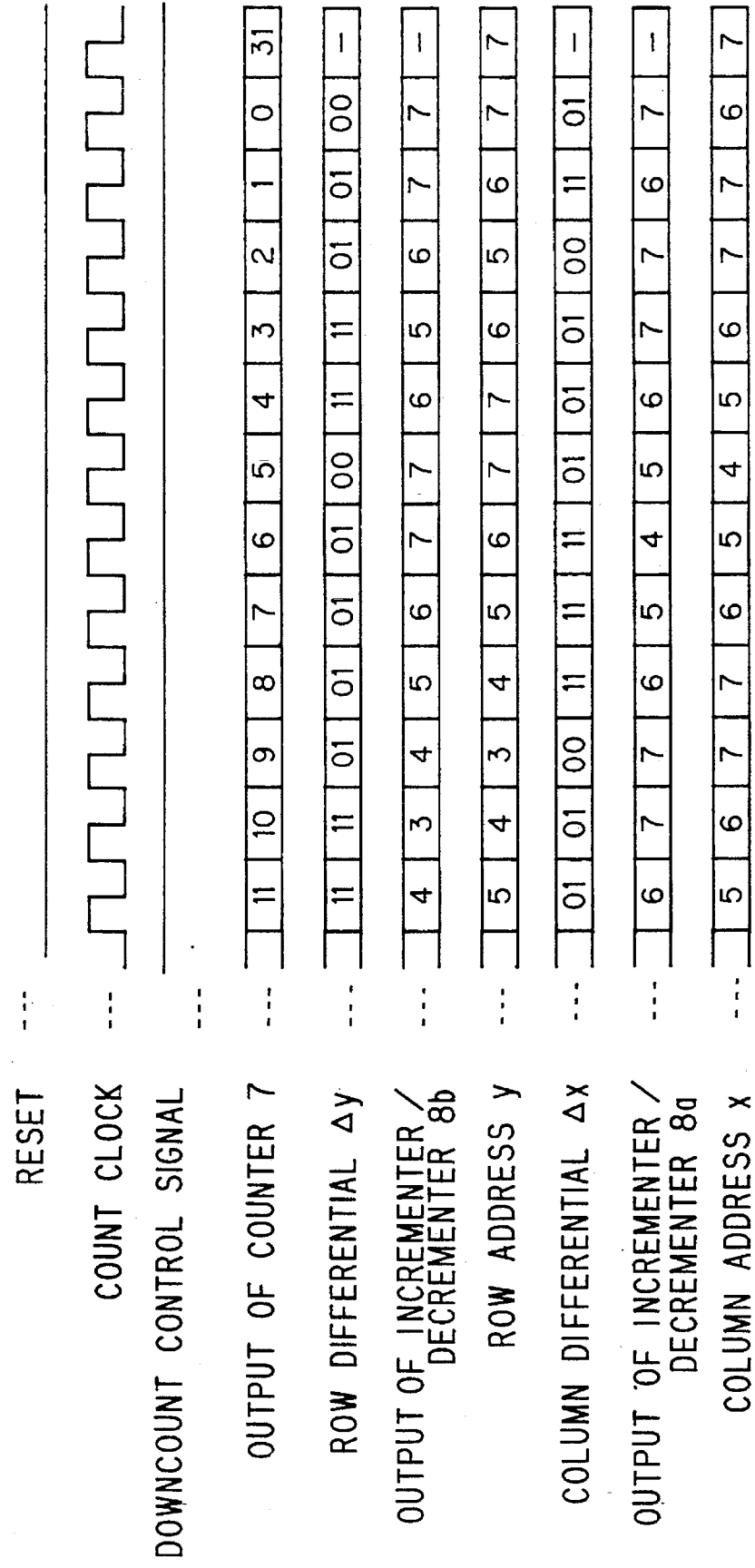
FIG. 16 is a timing chart for illustrating the second embodiment of the present invention.

FIGS. 12 to 16 show states of generation of the row and column addresses y and x in relation to the clock signal (counter clock). FIGS. 12, 13, 14, 15 and 16 show the generation order "0" to "12", the generation order "13" to "25", the generation order "26" to "37", the generation order "38" to "50" and the generation order "51" to "63" respectively. It is understood that a high level is attained from the downcount control signal when the generation order is changed from "30" to "31" and thereafter the outputs of the counter 7 are decremented one by one (FIG. 14). It is also understood that the row and column differentials $\Delta y$ and $\Delta x$ being read after the generation order "32" are identical to those shown in FIGS. 5 to 7.

(B-3) Third Embodiment

As to the row and column differentials $\Delta y$ and $\Delta x$, there is a rule in addition to that described with reference to (B-2), and it is possible to further reduce the capacity of the storage element 6 through this. Referring to Table 5, the same contents as Table 2 are described except for the rightmost column.

TABLE 5

| GENERATION ORDER | ZIGZAG ADDRESS ad | HIGH-ORDER 3 BITS y | LOW-ORDER 3 BITS x | ROW DIFFERENTIAL $\Delta x$ | COLUMN DIFFERENTIAL $\Delta y$ | STATE SYMBOL |
|---|---|---|---|---|---|---|
| 0 | 0 | 0 | 0 | | | |
| 1 | 1 | 0 | 1 | 0 | 1 | a |
| 2 | 8 | 1 | 0 | 1 | −1 | b |
| 3 | 16 | 2 | 0 | 1 | 0 | c |
| 4 | 9 | 1 | 1 | −1 | 1 | d |
| 5 | 2 | 0 | 2 | −1 | 1 | d |
| 6 | 3 | 0 | 3 | 0 | 1 | a |
| 7 | 10 | 1 | 2 | 1 | −1 | b |
| 8 | 17 | 2 | 1 | 1 | −1 | b |
| 9 | 24 | 3 | 0 | 1 | −1 | b |
| 10 | 32 | 4 | 0 | 1 | 0 | c |
| 11 | 25 | 3 | 1 | −1 | 1 | d |
| 12 | 18 | 2 | 2 | −1 | 1 | d |
| 13 | 11 | 1 | 3 | −1 | 1 | d |
| 14 | 4 | 0 | 4 | −1 | 1 | d |
| 15 | 5 | 0 | 5 | 0 | 1 | a |
| 16 | 12 | 1 | 4 | 1 | −1 | b |
| 17 | 19 | 2 | 3 | 1 | −1 | b |
| 18 | 26 | 3 | 2 | 1 | −1 | b |
| 19 | 33 | 4 | 1 | 1 | −1 | b |
| 20 | 40 | 5 | 0 | 1 | −1 | b |
| 21 | 48 | 6 | 0 | 1 | 0 | c |
| 22 | 41 | 5 | 1 | −1 | 1 | d |
| 23 | 34 | 4 | 2 | −1 | 1 | d |
| 24 | 27 | 3 | 3 | −1 | 1 | d |
| 25 | 20 | 2 | 4 | −1 | 1 | d |
| 26 | 13 | 1 | 5 | −1 | 1 | d |
| 27 | 6 | 0 | 6 | −1 | 1 | d |
| 28 | 7 | 0 | 7 | 0 | 1 | a |
| 29 | 14 | 1 | 6 | 1 | −1 | b |
| 30 | 21 | 2 | 5 | 1 | −1 | b |
| 31 | 28 | 3 | 4 | 1 | −1 | b |
| 32 | 35 | 4 | 3 | 1 | −1 | b |
| 33 | 42 | 5 | 2 | 1 | −1 | b |
| 34 | 49 | 6 | 1 | 1 | −1 | b |
| 35 | 56 | 7 | 0 | 1 | −1 | b |
| 36 | 67 | 7 | 1 | 0 | 1 | a |
| 37 | 50 | 6 | 2 | −1 | 1 | d |
| 38 | 43 | 5 | 3 | −1 | 1 | d |
| 39 | 36 | 4 | 4 | −1 | 1 | d |
| 40 | 29 | 3 | 5 | −1 | 1 | d |

TABLE 5-continued

| GENERATION ORDER | ZIGZAG ADDRESS ad | HIGH-ORDER 3 BITS y | LOW-ORDER 3 BITS x | ROW DIFFERENTIAL $\Delta x$ | COLUMN DIFFERENTIAL $\Delta y$ | STATE SYMBOL |
|---|---|---|---|---|---|---|
| 41 | 22 | 2 | 6 | −1 | 1 | d |
| 42 | 15 | 1 | 7 | −1 | 1 | d |
| 43 | 23 | 2 | 7 | 1 | 0 | c |
| 44 | 30 | 3 | 6 | 1 | −1 | b |
| 45 | 37 | 4 | 5 | 1 | −1 | b |
| 46 | 44 | 5 | 4 | 1 | −1 | b |
| 47 | 51 | 6 | 3 | 1 | −1 | b |
| 48 | 58 | 7 | 2 | 1 | −1 | b |
| 49 | 59 | 7 | 3 | 0 | 1 | a |
| 50 | 52 | 6 | 4 | −1 | 1 | d |
| 51 | 45 | 5 | 5 | −1 | 1 | d |
| 52 | 38 | 4 | 6 | −1 | 1 | d |
| 53 | 31 | 3 | 7 | −1 | 1 | d |
| 54 | 39 | 4 | 7 | 1 | 0 | c |
| 55 | 46 | 5 | 6 | 1 | −1 | b |
| 56 | 53 | 6 | 5 | 1 | −1 | b |
| 57 | 60 | 7 | 4 | 1 | −1 | b |
| 58 | 61 | 7 | 5 | 0 | 1 | a |
| 59 | 54 | 6 | 6 | −1 | 1 | d |
| 60 | 47 | 5 | 7 | −1 | 1 | d |
| 61 | 55 | 6 | 7 | 1 | 0 | c |
| 62 | 62 | 7 | 6 | 1 | −1 | b |
| 63 | 63 | 7 | 7 | 0 | 1 | a |

As described with reference to (B-1), each of the row and column differentials $\Delta y$ and $\Delta x$ is a two-bit signal, which can take three modes. When the row and column differentials $\Delta y$ and $\Delta x$ are regarded as pairs, it is understood that these can take only four states, as follows:

$$(\Delta y, \Delta x) = (0, 1), (1, -1), (1, 0), (-1, 1) \quad (6)$$

State symbols a, b, c and d are assigned to these, which are shown in the rightmost column of Table 5.

Thus, these state symbols may be stored in place of the row and column differentials, as differential data for obtaining zigzag addresses. Since the four states can be expressed in two-bit data, the amount of data to be stored may be as follows:

$$2 \text{ (bits)} \times 63 = 126 \text{ (bits)} \quad (7)$$

Figure 17:
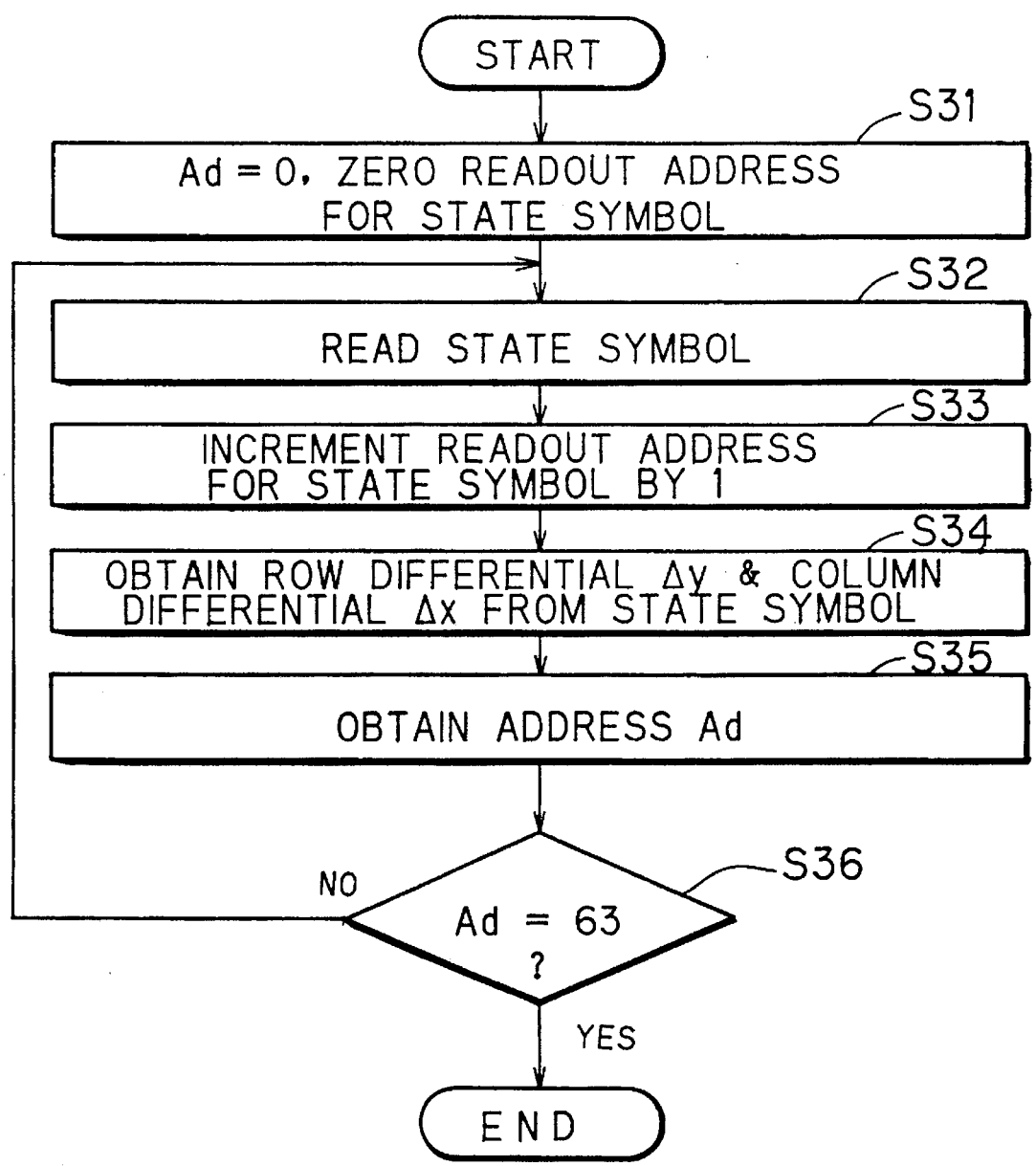
FIG. 17 is a flow chart showing the procedure of a third embodiment of the present invention.

FIG. 17 shows the algorithm of the third embodiment in the form of a flow chart. It is assumed that the state symbols a to d are expressed as "00", "01", "10" and "11" respectively, and successively stored along readout addresses started from zero.

TABLE 6

| READOUT ADDRESS | STATE SIGNAL | ROW DIFFER- ENTIAL $\Delta y$ | COLUMN DIFFER- ENTIAL $\Delta x$ |
|---|---|---|---|
| 0 | 00 | 00 | 01 |
| 1 | 01 | 01 | 11 |
| 2 | 10 | 01 | 00 |
| 3 | 11 | 11 | 01 |
| 4 | 11 | 11 | 01 |
| 5 | 00 | 00 | 01 |
| 6 | 01 | 01 | 11 |
| 7 | 01 | 01 | 11 |
| 8 | 01 | 01 | 11 |
| 9 | 10 | 01 | 00 |
| 10 | 11 | 11 | 01 |
| 11 | 11 | 11 | 01 |
| 12 | 11 | 11 | 01 |

TABLE 6-continued

| READOUT ADDRESS | STATE SIGNAL | ROW DIFFER- ENTIAL $\Delta y$ | COLUMN DIFFER- ENTIAL $\Delta x$ |
|---|---|---|---|
| 13 | 11 | 11 | 01 |
| 14 | 00 | 00 | 01 |
| 15 | 01 | 01 | 11 |
| 16 | 01 | 01 | 11 |
| 17 | 01 | 01 | 11 |
| 18 | 01 | 01 | 11 |
| 19 | 01 | 01 | 11 |
| 20 | 10 | 01 | 00 |
| 21 | 11 | 11 | 01 |
| 22 | 11 | 11 | 01 |
| 23 | 11 | 11 | 01 |
| 24 | 11 | 11 | 01 |
| 25 | 11 | 11 | 01 |
| 26 | 11 | 11 | 01 |
| 27 | 00 | 00 | 01 |
| 28 | 01 | 01 | 11 |
| 29 | 01 | 01 | 11 |
| 30 | 01 | 01 | 11 |
| 31 | 01 | 01 | 11 |
| 32 | 01 | 01 | 11 |
| 33 | 01 | 01 | 11 |
| 34 | 01 | 01 | 11 |
| 35 | 00 | 00 | 01 |
| 36 | 11 | 11 | 01 |
| 37 | 11 | 11 | 01 |
| 38 | 11 | 11 | 01 |
| 39 | 11 | 11 | 01 |
| 40 | 11 | 11 | 01 |
| 41 | 11 | 11 | 01 |
| 42 | 10 | 01 | 00 |
| 43 | 01 | 01 | 11 |
| 44 | 01 | 01 | 11 |
| 45 | 01 | 01 | 11 |
| 46 | 01 | 01 | 11 |
| 47 | 01 | 01 | 11 |
| 48 | 00 | 00 | 01 |
| 49 | 11 | 11 | 01 |
| 50 | 11 | 11 | 01 |
| 51 | 11 | 11 | 01 |
| 52 | 11 | 11 | 01 |

TABLE 6-continued

| READOUT ADDRESS | STATE SIGNAL | ROW DIFFERENTIAL Δy | COLUMN DIFFERENTIAL Δx |
|---|---|---|---|
| 53 | 10 | 01 | 00 |
| 54 | 01 | 01 | 11 |
| 55 | 01 | 01 | 11 |
| 56 | 01 | 01 | 11 |
| 57 | 00 | 00 | 01 |
| 58 | 11 | 11 | 01 |
| 59 | 11 | 11 | 01 |
| 60 | 10 | 01 | 00 |
| 61 | 01 | 01 | 11 |
| 62 | 00 | 00 | 01 |
| 63 | — | — | — |

At a step S31, initial states are set and a zigzag address Ad is zeroed, while a readout address for a state symbol is also assumed to be "0". Then, any one of the state symbols a to d is read (step S32), and the readout address for the state symbol is incremented by 1 (step S33). A pair of row and column differentials Δy and Δx is obtained from the state symbol (step S34), and the zigzag address Ad is further obtained on the basis of this. A determination is made at a step S36 as to whether or not a zigzag address to be generated in generation order "63" is generated, so that zigzag addresses are successively generated.

Figure 18:
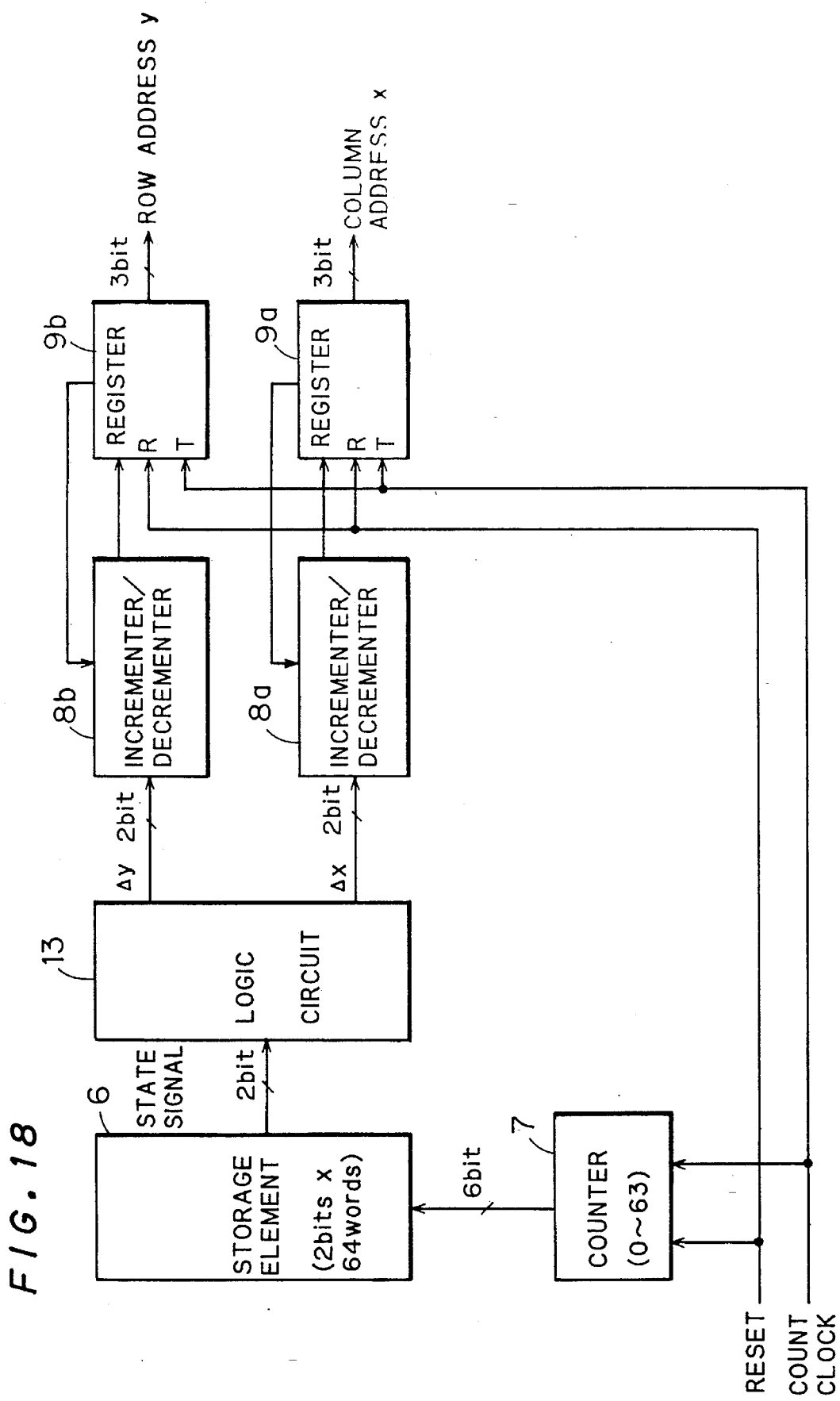
FIG. 18 is a block diagram for illustrating the third embodiment of the present invention.

FIG. 18 shows a zigzag address generation circuit for implementing the aforementioned algorithm in practice. A storage element 6, which stores the state symbols a, b, c and d as two-bit state signals respectively, has capacity of 2 bits by 64 words.

Figure 19:
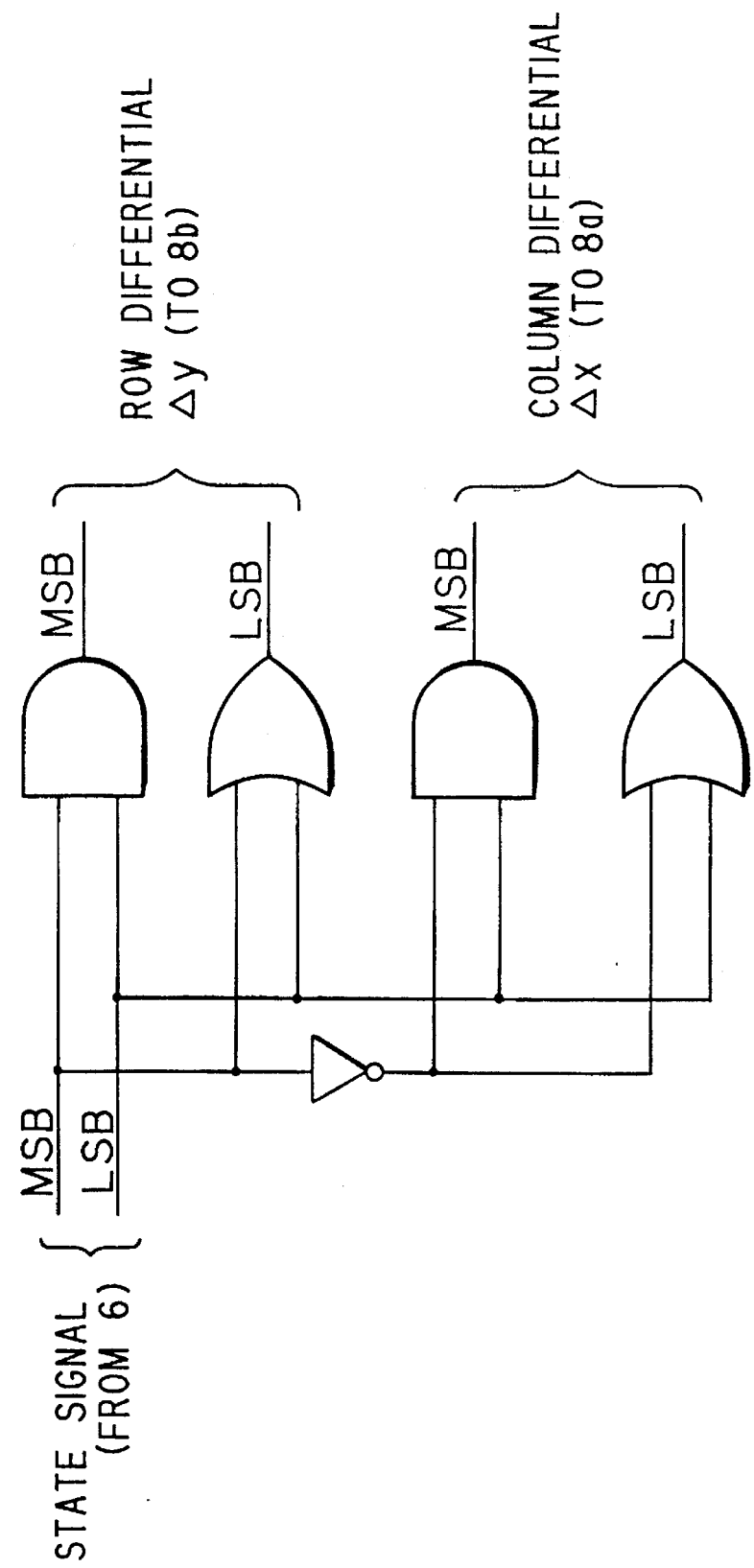
FIG. 19 is a block diagram of a logic circuit 13.
Figure 20:
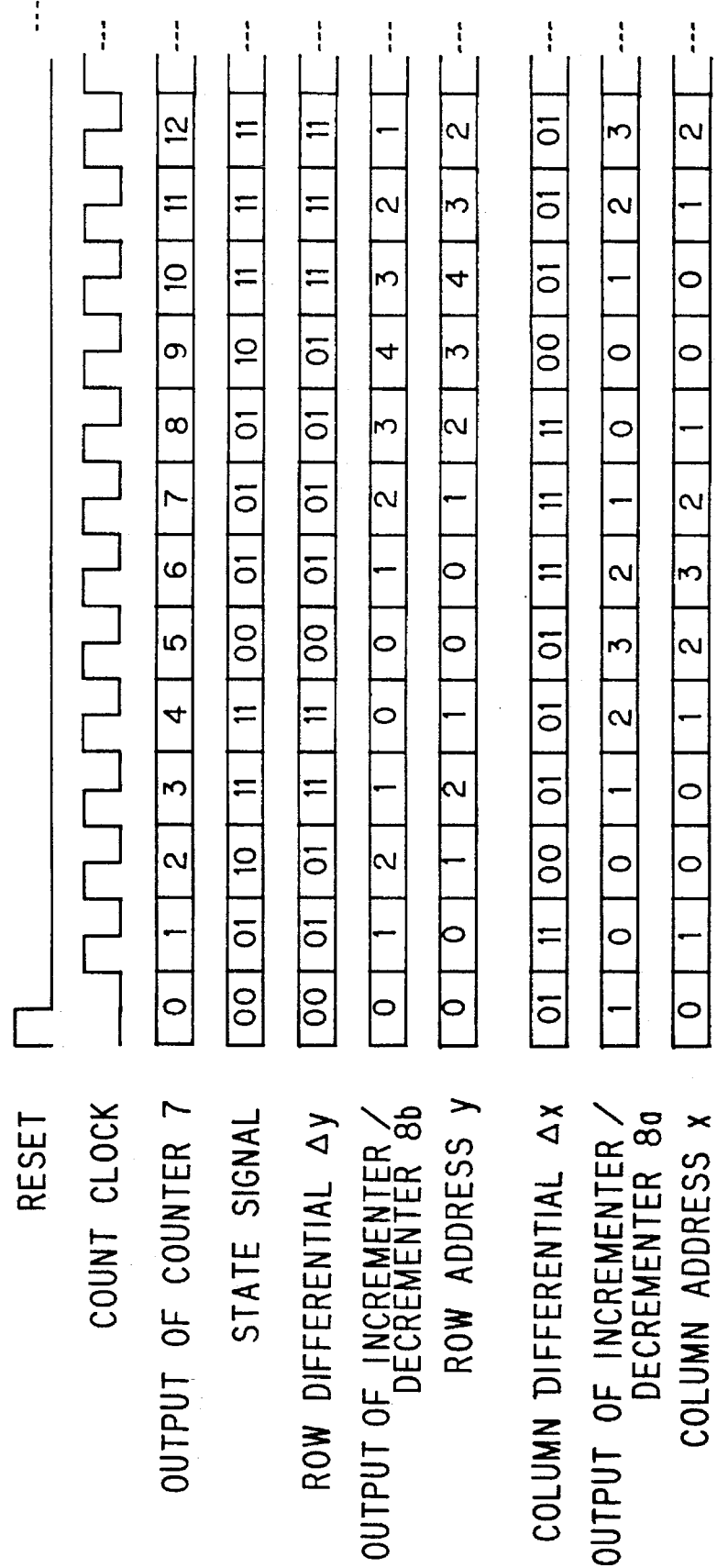
FIG. 20 is a timing chart for illustrating the third embodiment of the present invention.
Figure 21:
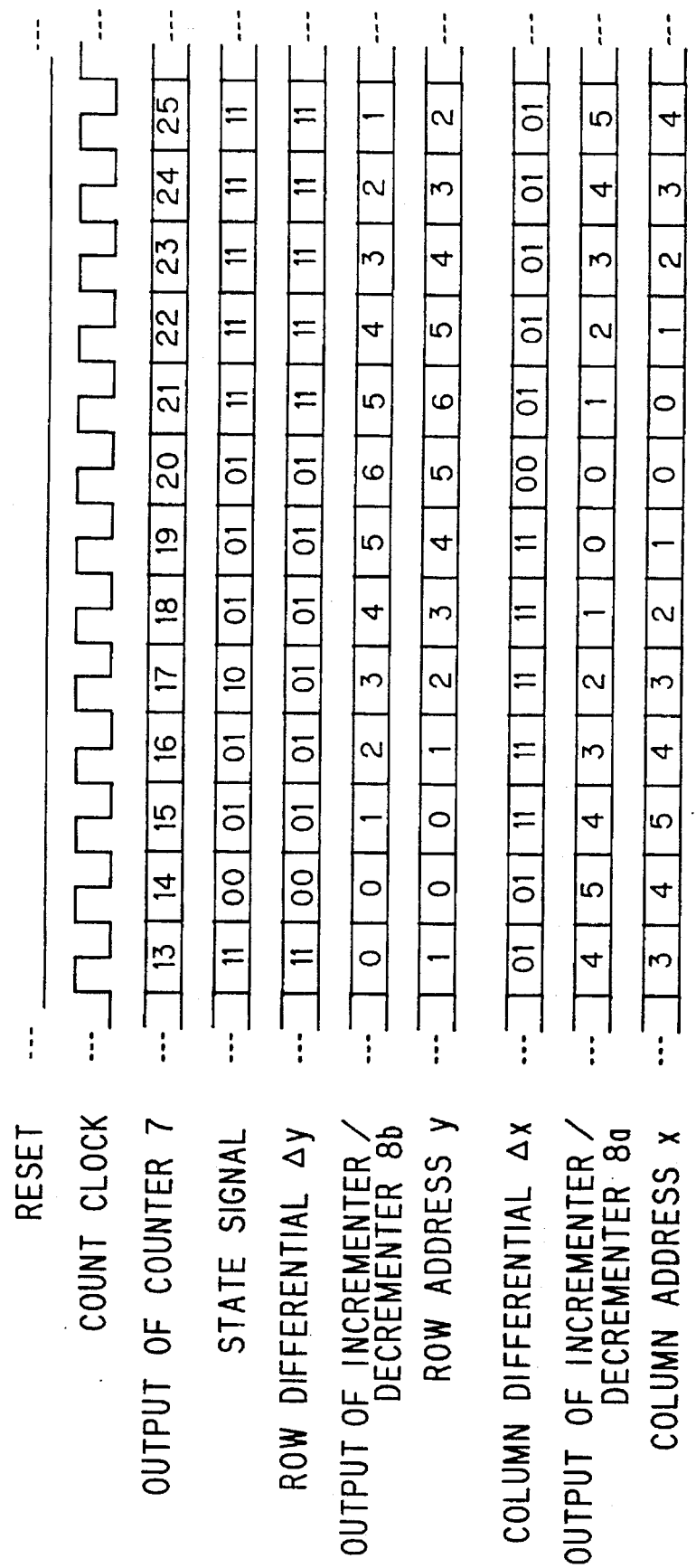
FIG. 21 is a timing chart for illustrating the third embodiment of the present invention.
Figure 24:
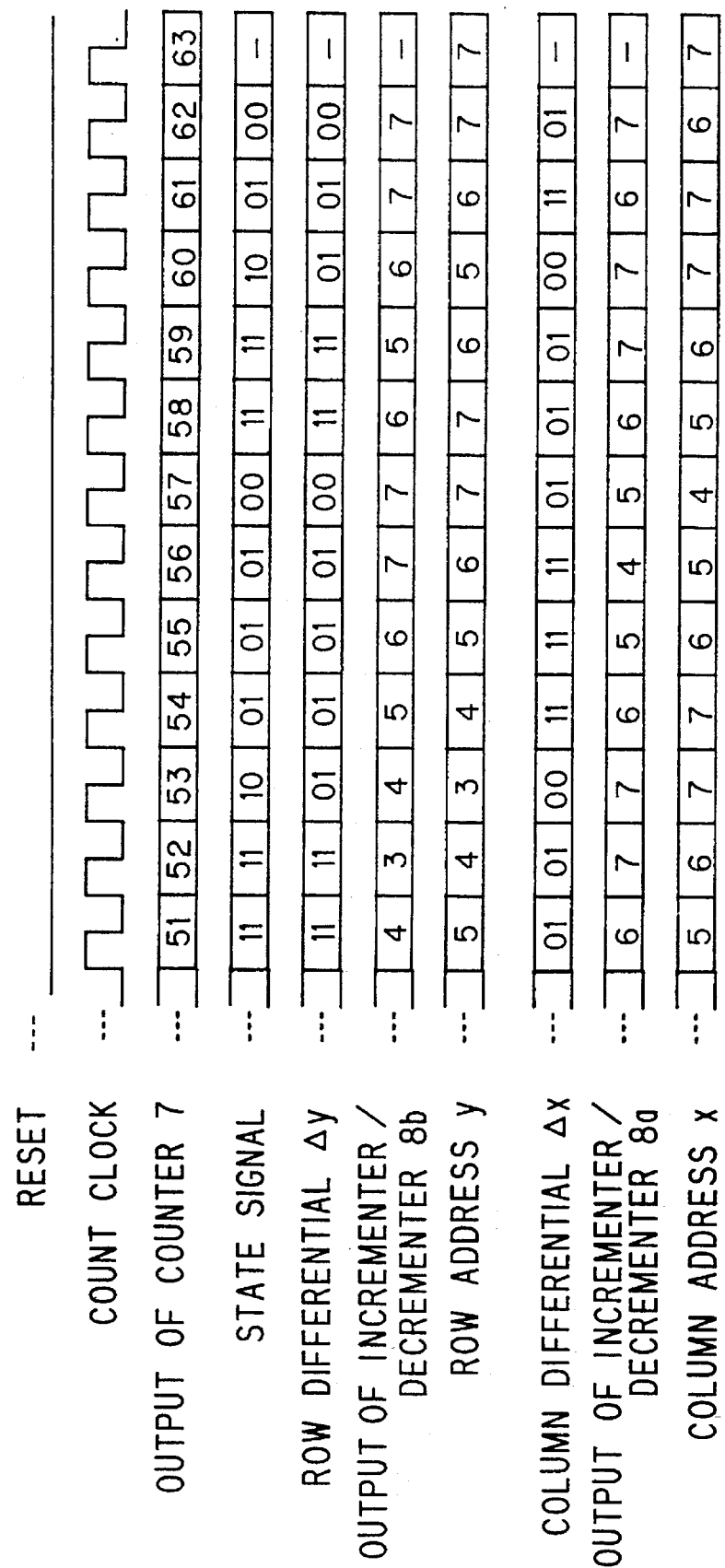
FIG. 24 is a timing chart for illustrating the third embodiment of the present invention.

A logic circuit 13, which is adapted to obtain row and column differentials Δy and Δx from the two-bit state signals, corresponds to a step S34. FIG. 19 shows the structure of the logic circuit 13. Other structure is similar to that of the circuit shown in FIG. 2.

Table 7 shows a truth table of the logic circuit 13.

TABLE 7

| OUTPUT OF STORAGE ELEMENT | OUTPUT OF LOGIC CIRCUIT | | |
|---|---|---|---|
|  | Δy | Δx | STATE |
| 00 | 00 | 01 | a |
| 01 | 01 | 11 | b |
| 10 | 01 | 00 | c |
| 11 | 11 | 01 | d |

As described with reference to (B-1), each of the row and column differentials can take three modes "neither incremented nor decremented", "incremented by 1" and "decremented by 1", which are expressed in "00", "01" and "11". It is understood that these three modes are restored from the state signals (storage element outputs).

When the row and column differentials Δy and Δx are obtained, zigzag addresses can be thereafter obtained similarly to the first embodiment, which is implemented by the circuit shown in FIG. 2 in practice.

FIGS. 20 to 24 show the manners of generation of the row and column addresses y and x in relation to clock signals (count clocks). FIGS. 20, 21, 22, 23 and 24 show generation order "0" to "12", generation order "13" to "25", generation order "26" to "37", generation order "38" to "50" and generation order "51" to "60" respectively. Referring to FIGS. 20 to 24, state signals are employed in place of the state symbols a to d.

(B-4) Fourth Embodiment

In the third embodiment, it is possible to further reduce the amount of data to be stored. Generation order, state symbols, row differentials Δy and column differentials Δx shown in Table 8 are substantially identical to those shown in Table 5. However, the row and column differentials Δy and Δx are described in the same stages as those showing addresses storing state symbols forming the basis of generation in certain generation order.

TABLE 8

| GENERATION ORDER | READOUT ADDRESS | STATE SYMBOL | ROW DIFFERENTIAL Δy | COLUMN DIFFERENTIAL Δx |
|---|---|---|---|---|
| 0 | 0 | a | 0 | 1 |
| 1 | 1 | b | 1 | −1 |
| 2 | 2 | c | 1 | 0 |
| 3 | 3 | d | −1 | 1 |
| 4 | 4 | d | −1 | 1 |
| 5 | 5 | a | 0 | 1 |
| 6 | 6 | b | 1 | −1 |
| 7 | 7 | b | 1 | −1 |
| 8 | 8 | b | 1 | −1 |
| 9 | 9 | c | 1 | 0 |
| 10 | 10 | d | −1 | 1 |
| 11 | 11 | d | −1 | 1 |
| 12 | 12 | d | −1 | 1 |
| 13 | 13 | d | −1 | 1 |
| 14 | 14 | a | 0 | 1 |
| 15 | 15 | b | 1 | −1 |
| 16 | 16 | b | 1 | −1 |
| 17 | 17 | b | 1 | −1 |
| 18 | 18 | b | 1 | −1 |
| 19 | 19 | b | 1 | −1 |
| 20 | 20 | c | 1 | 0 |
| 21 | 21 | d | −1 | 1 |
| 22 | 22 | d | −1 | 1 |
| 23 | 23 | d | −1 | 1 |
| 24 | 24 | d | −1 | 1 |
| 25 | 25 | d | −1 | 1 |
| 26 | 26 | d | −1 | 1 |
| 27 | 27 | a | 0 | 1 |
| 28 | 28 | b | 1 | −1 |
| 29 | 29 | b | 1 | −1 |
| 30 | 30 | b | 1 | −1 |
| 31 | 31 | b | 1 | −1 |
| 32 | 30 | b | 1 | −1 |
| 33 | 29 | b | 1 | −1 |
| 34 | 28 | b | 1 | −1 |
| 35 | 27 | a | 0 | 1 |
| 36 | 26 | d | −1 | 1 |
| 37 | 25 | d | −1 | 1 |
| 38 | 24 | d | −1 | 1 |
| 39 | 23 | d | −1 | 1 |
| 40 | 22 | d | −1 | 1 |
| 41 | 21 | d | −1 | 1 |
| 42 | 20 | c | 1 | 0 |
| 43 | 19 | b | 1 | −1 |
| 44 | 18 | b | 1 | −1 |
| 45 | 17 | b | 1 | −1 |
| 46 | 16 | b | 1 | −1 |
| 47 | 15 | b | 1 | −1 |
| 48 | 14 | a | 0 | 1 |
| 49 | 13 | d | −1 | 1 |
| 50 | 12 | d | −1 | 1 |
| 51 | 11 | d | −1 | 1 |
| 52 | 10 | d | −1 | 1 |
| 53 | 9 | c | 1 | 0 |
| 54 | 8 | b | 1 | −1 |
| 55 | 7 | b | 1 | −1 |
| 56 | 6 | b | 1 | −1 |
| 57 | 5 | a | 0 | 1 |
| 58 | 4 | d | −1 | 1 |
| 59 | 3 | d | −1 | 1 |
| 60 | 2 | c | 1 | 0 |
| 61 | 1 | b | 1 | −1 |
| 62 | 0 | a | 0 | 1 |
| 63 |  |  |  |  |

Similarly to the description with reference to (B-2), each of the row and column differentials Δy and Δx has symmetrical order as to generation order "32". Thus, it is understood that each state symbol has similar symmetry.

Thus, the number of state symbols to be stored may be 32, which is substantially half that in the third embodiment, and the amount of the data may be reduced as follows:

2 (bits)×32=64 (bits)   (8)

Table 9 shows the data to be stored and the row and column differentials Δy and Δx generated therefrom.

TABLE 9

| READOUT ADDRESS | STATE SIGNAL | ROW DIFFERENTIAL Δy | COLUMN DIFFERENTIAL Δx |
|---|---|---|---|
| 0 | 00 | 00 | 01 |
| 1 | 01 | 01 | 11 |
| 2 | 10 | 01 | 00 |
| 3 | 11 | 11 | 01 |
| 4 | 11 | 11 | 01 |
| 5 | 00 | 00 | 01 |
| 6 | 01 | 01 | 11 |
| 7 | 01 | 01 | 11 |
| 8 | 01 | 01 | 11 |
| 9 | 10 | 01 | 00 |
| 10 | 11 | 11 | 01 |
| 11 | 11 | 11 | 01 |
| 12 | 11 | 11 | 01 |
| 13 | 11 | 11 | 01 |
| 14 | 00 | 00 | 01 |
| 15 | 01 | 01 | 11 |
| 16 | 01 | 01 | 11 |
| 17 | 01 | 01 | 11 |
| 18 | 01 | 01 | 11 |
| 19 | 01 | 01 | 11 |
| 20 | 10 | 01 | 00 |
| 21 | 11 | 11 | 01 |
| 22 | 11 | 11 | 01 |
| 23 | 11 | 11 | 01 |
| 24 | 11 | 11 | 01 |
| 25 | 11 | 11 | 01 |
| 26 | 11 | 11 | 01 |
| 27 | 00 | 00 | 01 |
| 28 | 01 | 01 | 11 |
| 29 | 01 | 01 | 11 |
| 30 | 01 | 01 | 11 |
| 31 | 01 | 01 | 11 |

Figure 25:
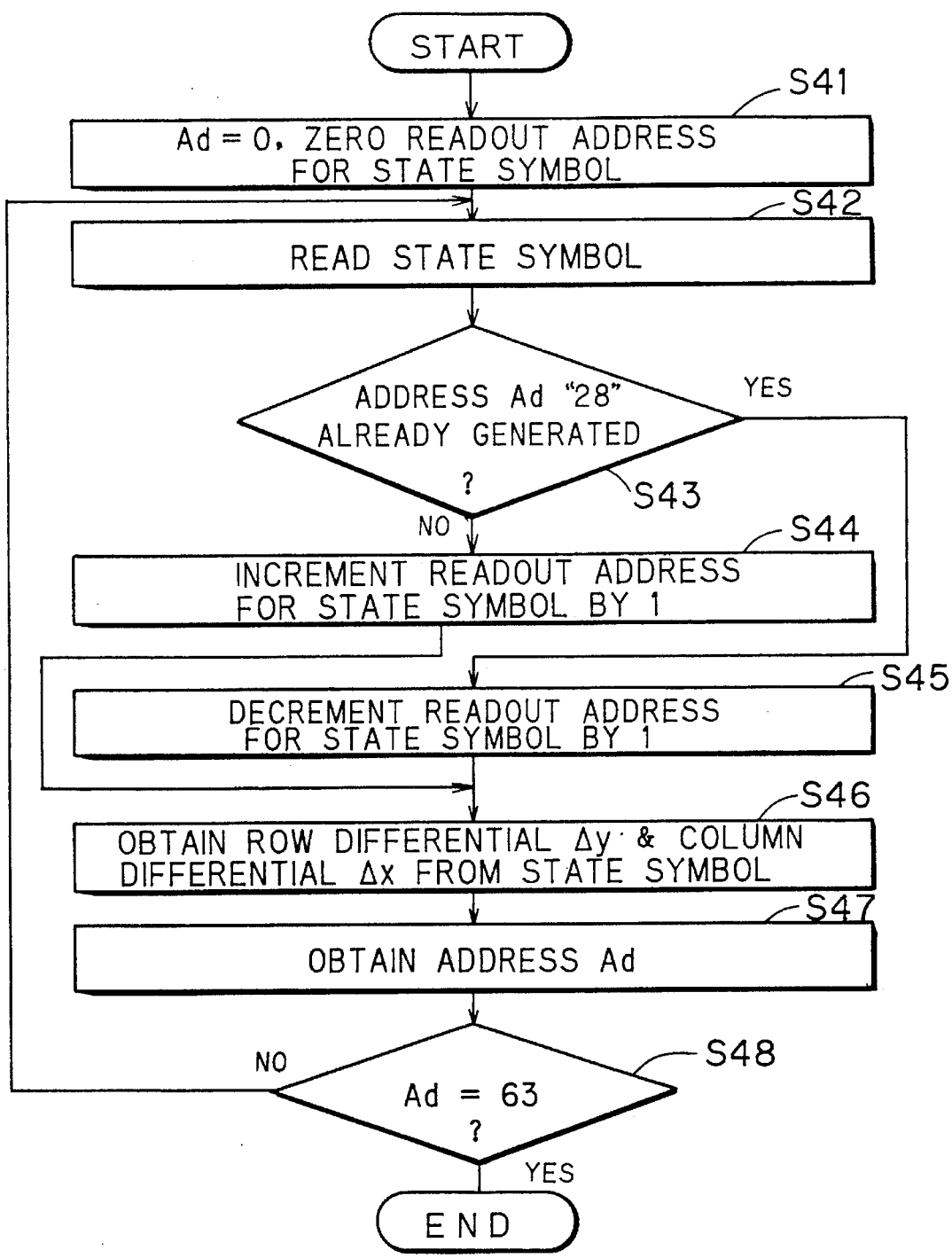
FIG. 25 is a flow chart showing the procedure of a fourth embodiment of the present invention.

FIG. 25 shows the algorithm of the fourth embodiment in the form of a flow chart. The state symbols a to d are stored in readout addresses "0" to "31" in the order shown in Table 9. First, initialization is performed at a step S41. This corresponds to the step S31 shown in FIG. 17. Then, state symbols are read similarly to the step S32 (step S42).

Similarly to the steps S23 to S25, the readout addresses are changed at steps S43 to S45. Namely, the readout address is incremented by 1 if a zigzag address "28" is not yet generated (step S44), while the former is decremented by 1 if the latter is already generated (step S45). Thereafter processing is progressed similarly to the steps S34 to S36 shown in FIG. 17 (steps S46 to S48).

Figure 26:
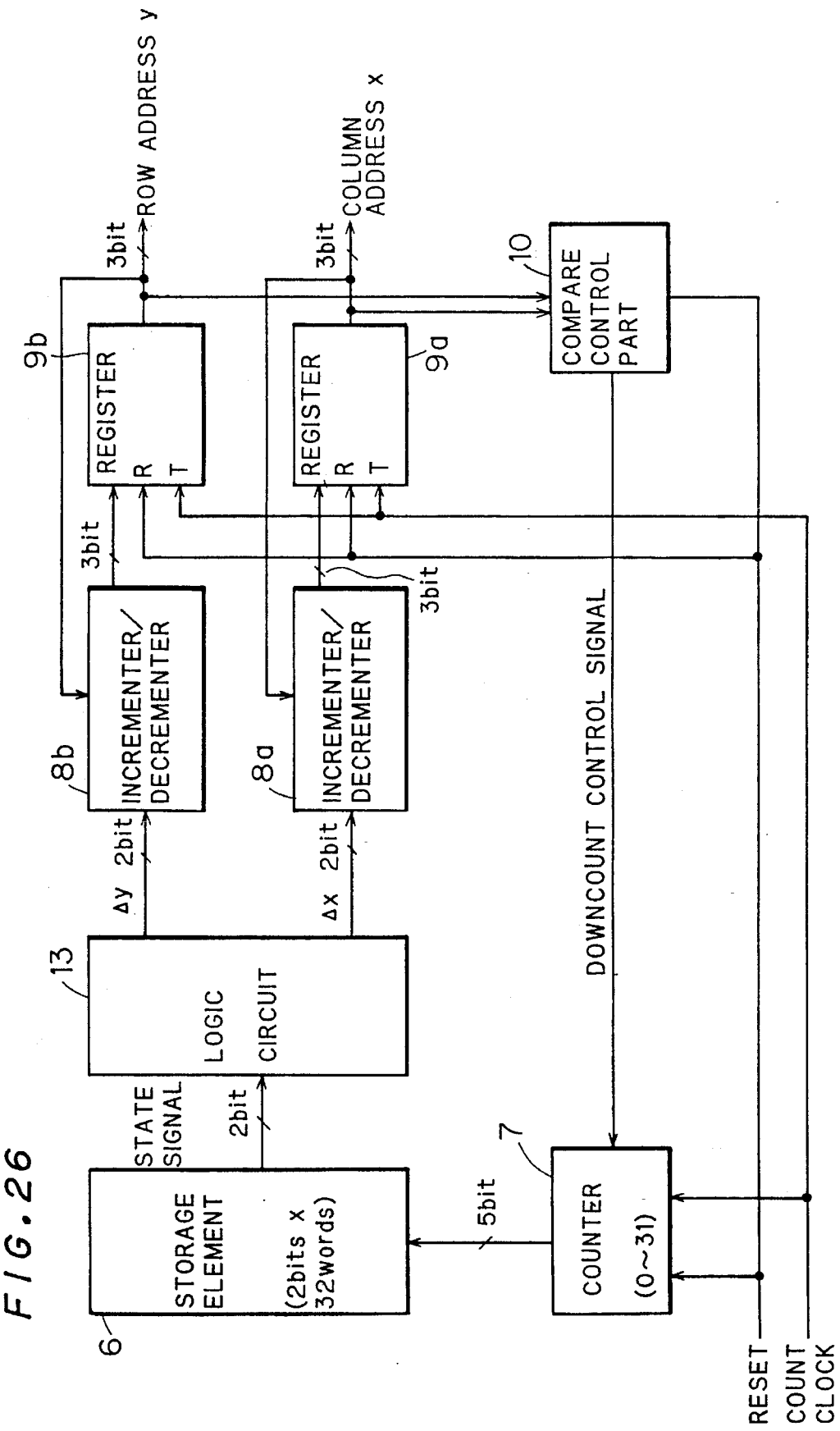
FIG. 26 is a block diagram for illustrating the fourth embodiment of the present invention.
Figure 27:
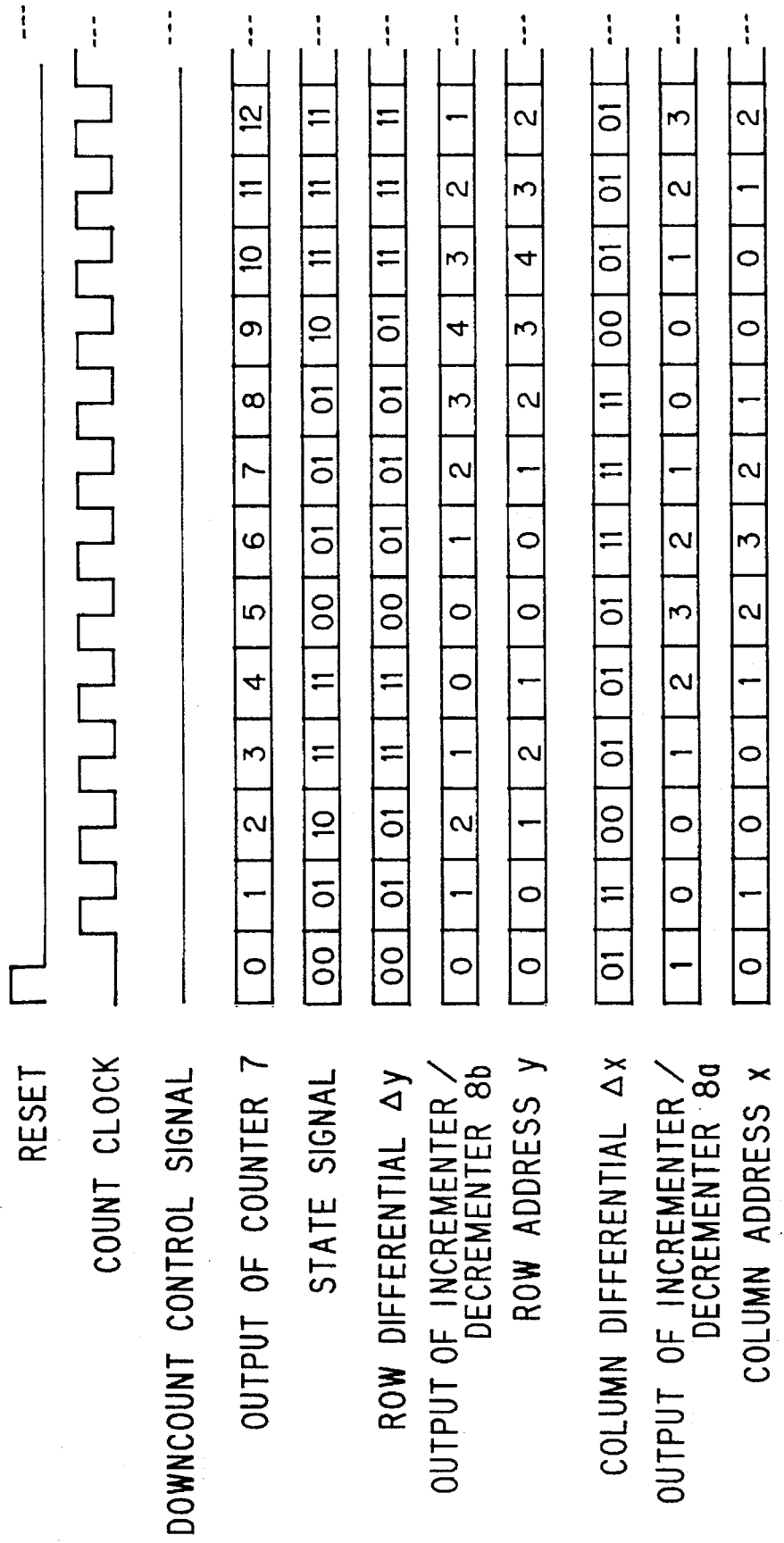
FIG. 27 is a timing chart for illustrating the fourth embodiment of the present invention.
Figure 28:
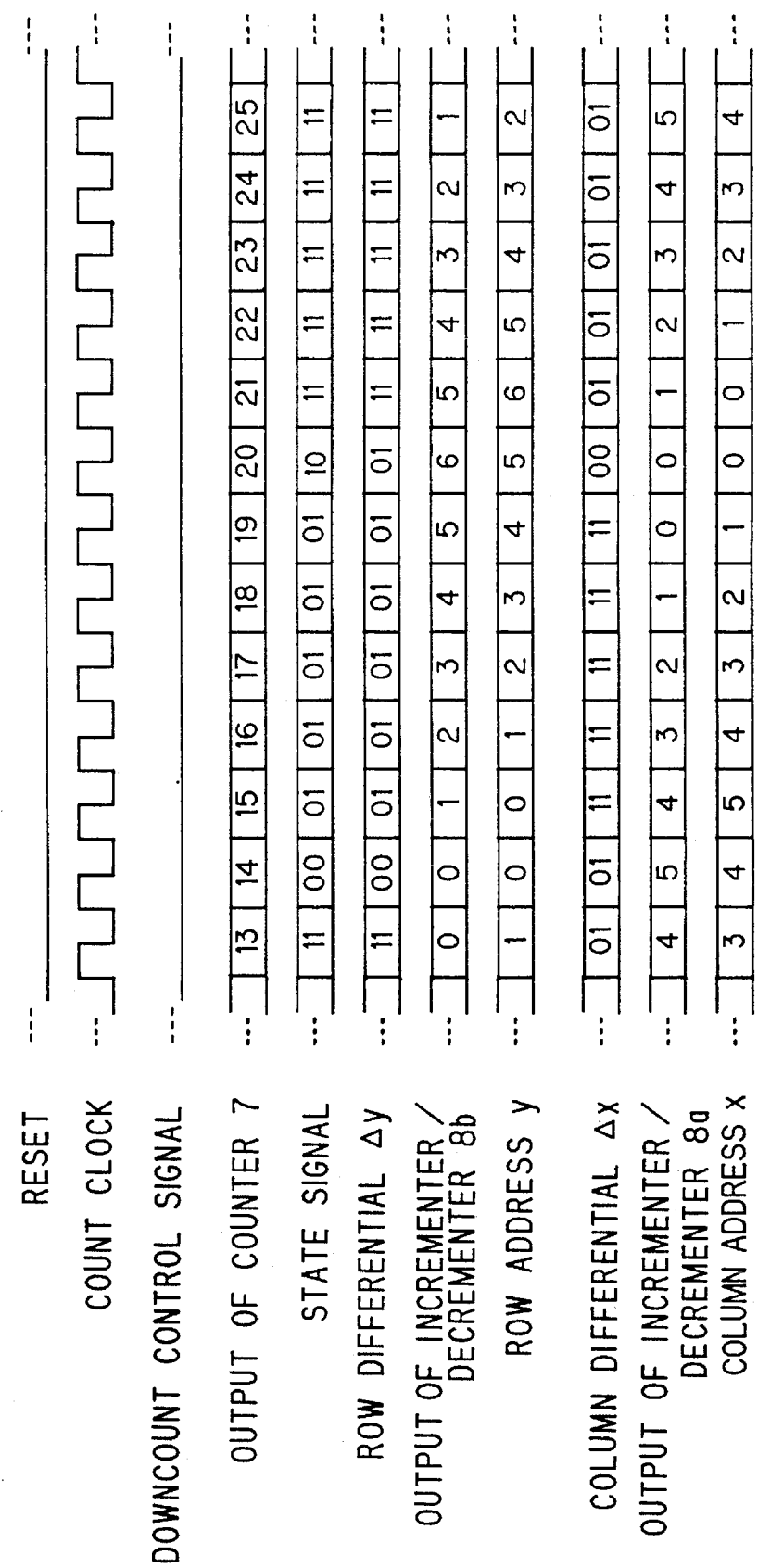
FIG. 28 is a timing chart for illustrating the fourth embodiment of the present invention.

FIG. 26 shows a zigzag address generation circuit for implementing the aforementioned algorithm in practice. A storage element 6 requires capacity of 2 bits by 32 words. This circuit is structured similarly to that shown in FIG. 18, except that count numbers of a counter 7 are reduced to 0 to 31, a downcount control signal is supplied from a compare control part 10, and the compare control part 10 is provided. The compare control part 10 can be formed by the AND gate 11 and the RS flip-flop shown in FIG. 11, similarly to the case of the second embodiment.

In the circuit shown in FIG. 26, therefore, a logic (6)cuit 13 generates row and column differentials Δy and Δx similarly to the circuit shown in FIG. 18, while the compare control part 10 drives the counter 7 as a down counter upon detection of the zigzag address "28", similarly to the circuit shown in FIG. 10. Row and column addresses y and x are generated from the row and column differentials Δy and Δx similarly to the circuit shown in FIG. 2, as a matter of course.

Figure 29:
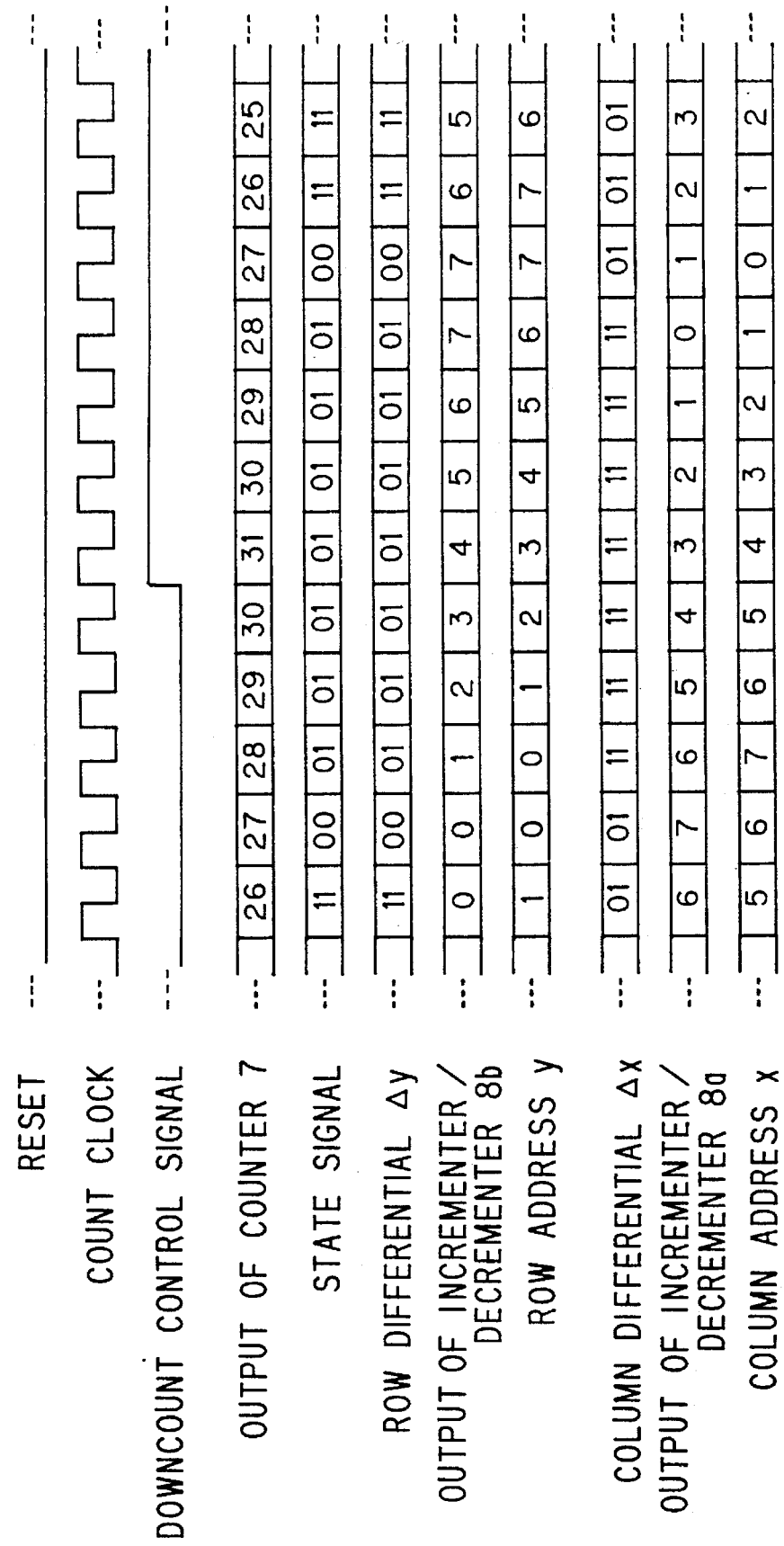
FIG. 29 is a timing chart for illustrating the fourth embodiment of the present invention.
Figure 30:
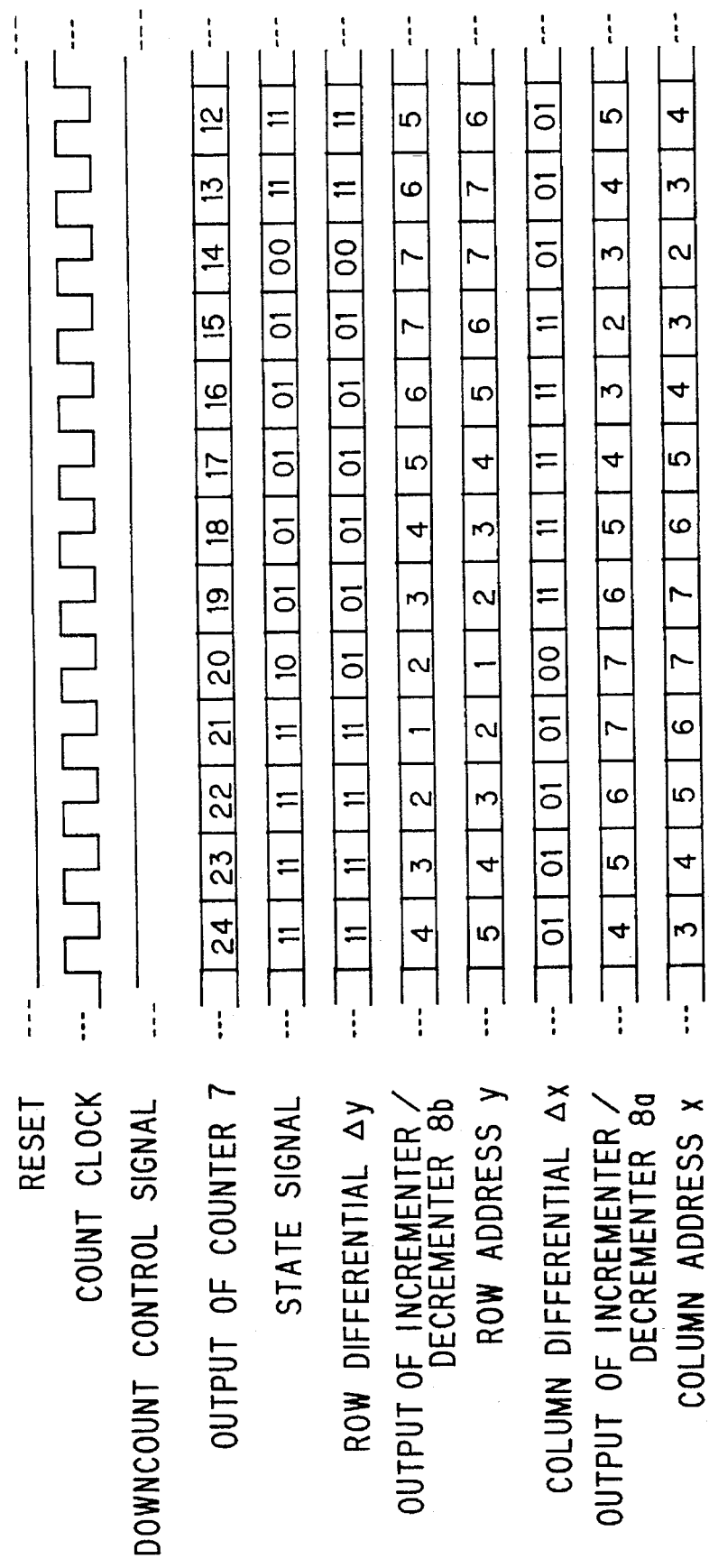
FIG. 30 is a timing chart for illustrating the fourth embodiment of the present invention.
Figure 31:
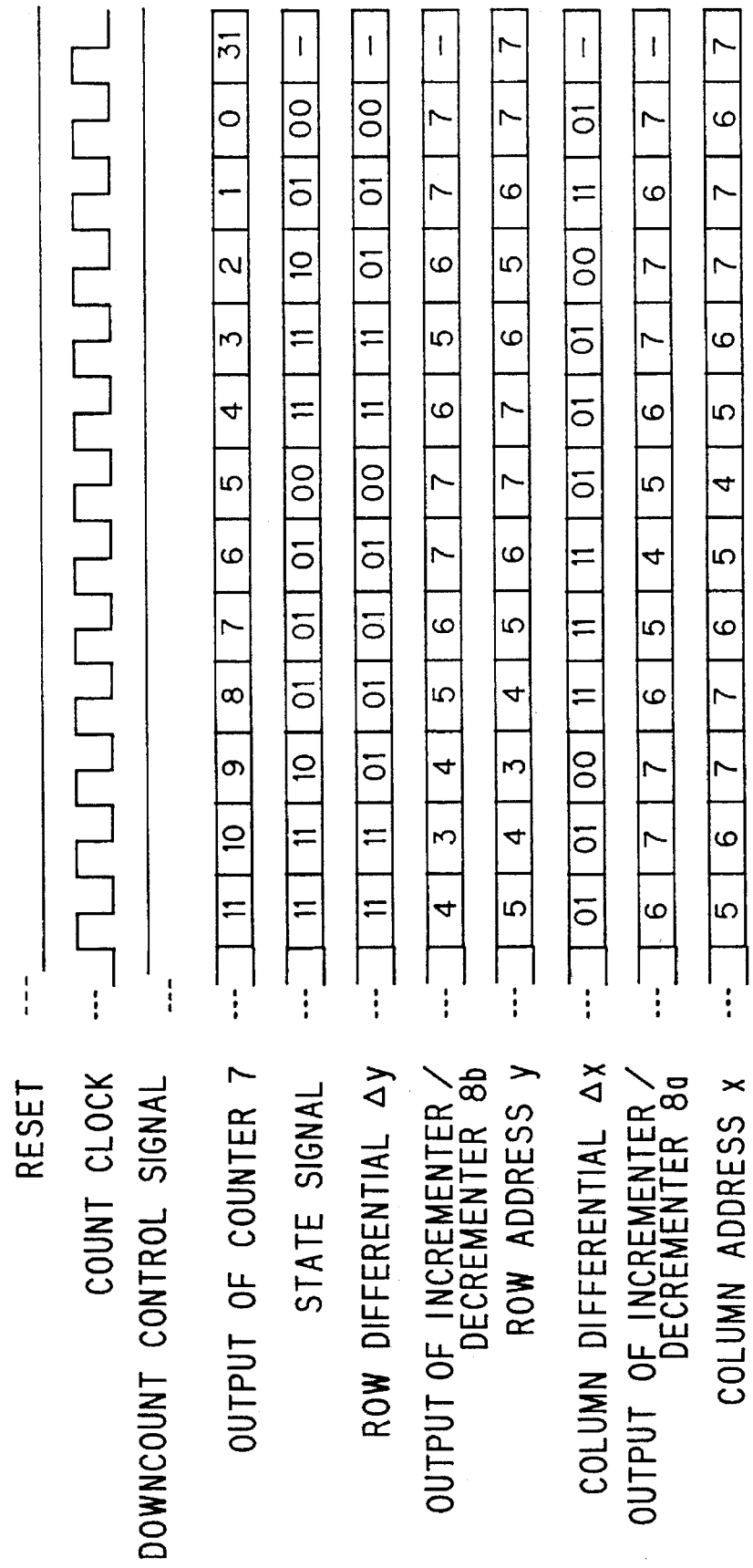
FIG. 31 is a timing chart for illustrating the fourth embodiment of the present invention.

FIGS. 27 to 31 show manners of generation of the row and column addresses y and x in relation to clock signals (count clocks). FIGS. 27, 28, 29, 30 and 31 show generation order "0" to "12", generation order "13" to "25", generation order "26" to "37", generation order "38" to "50" and generation order "51" to "63" respectively. It is understood that the downcount control signal goes high when the generation order is changed from "30" to "31" so that the outputs of the counter 7 are thereafter decremented one by one, while the row and column differentials Δy and Δx are generated similarly to the first to third embodiments (FIG. 29).

(B-5) Fifth Embodiment

While state symbols are introduced in the fifth embodiment, the state signals are also changed in a rule, which can be used to reduce the number of data to be stored. Table 10 shows generation orders, state symbols, row differentials Δy and column differentials Δx which are identical to those shown in Table 8 respectively.

TABLE 10

| GENERATION ORDER | READOUT ADDRESS | STATE CHANGE SIGNAL | STATE SYMBOL | ROW DIFFERENTIAL Δy | COLUMN DIFFERENTIAL Δx |
|---|---|---|---|---|---|
| 0 | 0 | 1 | a | 0 | 1 |
| 1 | 1 | 1 | b | 1 | −1 |
| 2 | 2 | 1 | c | 1 | 0 |
| 3 | 3 | 0 | d | −1 | 1 |
| 4 | 4 | 1 | d | −1 | 1 |
| 5 | 5 | 1 | a | 0 | 1 |
| 6 | 6 | 0 | b | 1 | −1 |
| 7 | 7 | 0 | b | 1 | −1 |
| 8 | 8 | 1 | b | 1 | −1 |
| 9 | 9 | 1 | c | 1 | 0 |
| 10 | 10 | 0 | d | −1 | 1 |
| 11 | 11 | 0 | d | −1 | 1 |
| 12 | 12 | 0 | d | −1 | 1 |
| 13 | 13 | 1 | d | −1 | 1 |

TABLE 10-continued

| GENERATION ORDER | READOUT ADDRESS | STATE CHANGE SIGNAL | STATE SYMBOL | ROW DIFFERENTIAL Δy | COLUMN DIFFERENTIAL Δx |
|---|---|---|---|---|---|
| 14 | 14 | 1 | a | 0 | 1 |
| 15 | 15 | 0 | b | 1 | −1 |
| 16 | 16 | 0 | b | 1 | −1 |
| 17 | 17 | 0 | b | 1 | −1 |
| 18 | 18 | 0 | b | 1 | −1 |
| 19 | 19 | 1 | b | 1 | −1 |
| 20 | 20 | 1 | c | 1 | 0 |
| 21 | 21 | 0 | d | −1 | 1 |
| 22 | 22 | 0 | d | −1 | 1 |
| 23 | 23 | 0 | d | −1 | 1 |
| 24 | 24 | 0 | d | −1 | 1 |
| 25 | 25 | 0 | d | −1 | 1 |
| 26 | 26 | 1 | d | −1 | 1 |
| 27 | 27 | 1 | a | 0 | 1 |
| 28 | 28 | 0 | b | 1 | −1 |
| 29 | 29 | 0 | b | 1 | −1 |
| 30 | 30 | 0 | b | 1 | −1 |
| 31 | 31 | 0 | b | 1 | −1 |
| 32 | 32 | 0 | b | 1 | −1 |
| 33 | 33 | 0 | b | 1 | −1 |
| 34 | 34 | 1 | b | 1 | −1 |
| 35 | 35 | 1 | a | 0 | 1 |
| 36 | 36 | 0 | d | −1 | 1 |
| 37 | 37 | 0 | d | −1 | 1 |
| 38 | 38 | 0 | d | −1 | 1 |
| 39 | 39 | 0 | d | −1 | 1 |
| 40 | 40 | 0 | d | −1 | 1 |
| 41 | 41 | 1 | d | −1 | 1 |
| 42 | 42 | 1 | c | 1 | 0 |
| 43 | 43 | 0 | b | 1 | −1 |
| 44 | 44 | 0 | b | 1 | −1 |
| 45 | 45 | 0 | b | 1 | −1 |
| 46 | 46 | 0 | b | 1 | −1 |
| 47 | 47 | 1 | b | 1 | −1 |
| 48 | 48 | 1 | a | 0 | 1 |
| 49 | 49 | 0 | d | −1 | 1 |
| 50 | 50 | 0 | d | −1 | 1 |
| 51 | 51 | 0 | d | −1 | 1 |
| 52 | 52 | 1 | d | −1 | 1 |
| 53 | 53 | 1 | c | 1 | 0 |
| 54 | 54 | 0 | b | 1 | −1 |
| 55 | 55 | 0 | b | 1 | −1 |
| 56 | 56 | 1 | b | 1 | −1 |
| 57 | 57 | 1 | a | 0 | 1 |
| 58 | 58 | 0 | d | −1 | 1 |
| 59 | 59 | 1 | d | −1 | 1 |
| 60 | 60 | 1 | c | 1 | 0 |
| 61 | 61 | 1 | b | 1 | −1 |
| 62 | 62 | 1 | a | 0 | 1 |
| 63 | 63 | | | | |

However, the state symbols a, b, c and d are changed in alphabetical order (hereinafter referred to as "order P") up to generation order "31", and thereafter changed in reverse order (hereinafter referred to as "order Q"). If means for successively generating state symbols in two directions of a, b, c, d, a, . . . (order P) and d, c, b, a, d, . . . (order Q) is previously provided, it is possible to successively obtain the state symbols by simply specifying presence/absence of change, to thereafter obtain zigzag addresses similarly to the aforementioned embodiments. The state change signals appearing in Table 10 show presence/absence of change of the state symbols.

For example, all state change signals are "1" in generation order "0", generation order "1" and generation order "2", and this means that the state symbols are changed. Thus, the state symbols are changed from a to b, from b to c and from c to d respectively. On the other hand, the state change signal takes a value "0" in the generation order "3". This means that no change is caused in the state symbol, which remains at d also in the generation order "4". In other words, the state change signals can be regarded as differential data to be stored.

Thus, each state change signal can be expressed in one-bit information of "0" or "1", whereby the amount of data to be stored as a whole is as follows:

$$1 \text{ (bit)} \times 64 = 64 \text{ (bits)} \tag{9}$$

Figure 32:
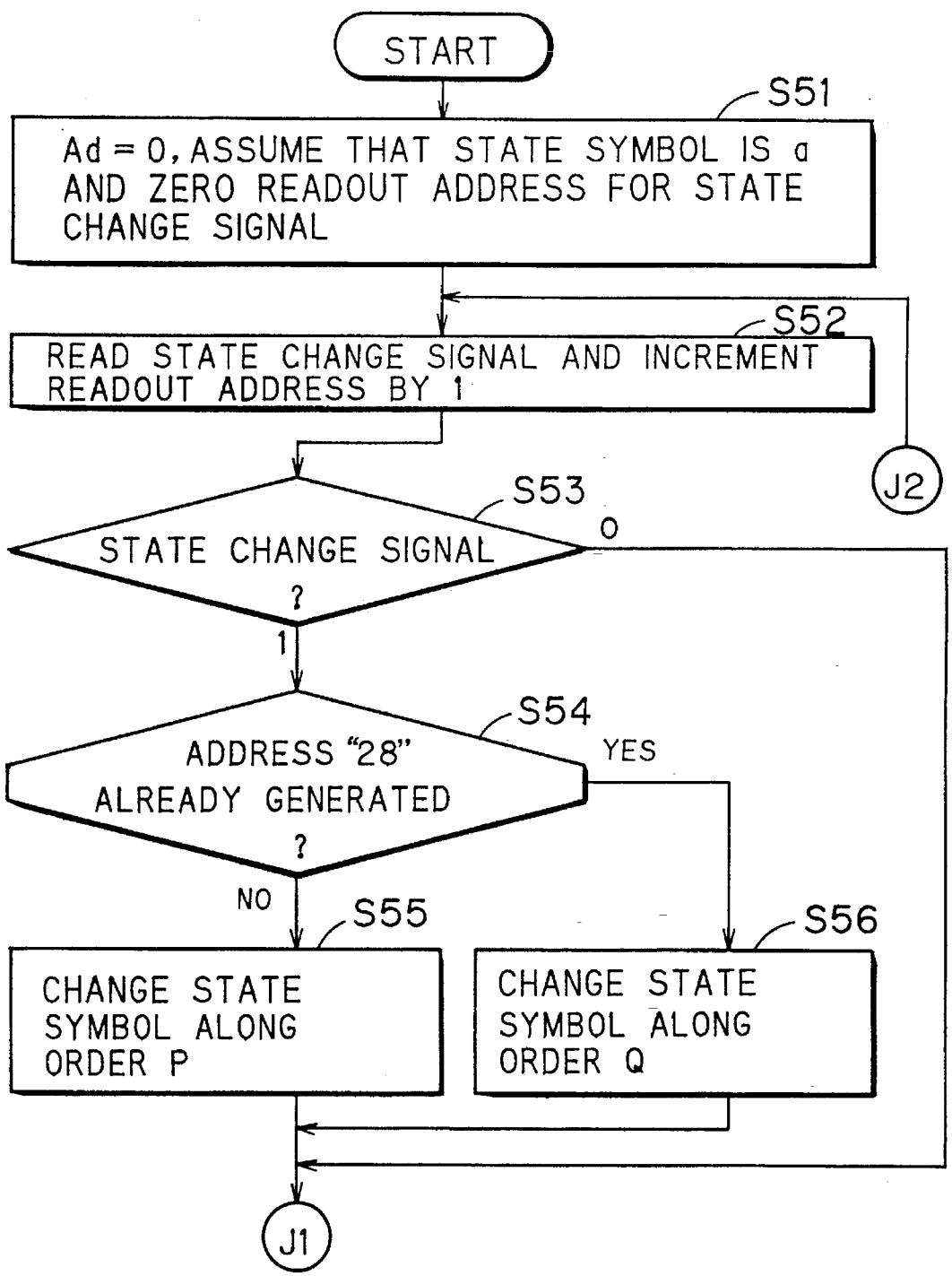
FIG. 32 is a flow chart showing the procedure of a fifth embodiment of the present invention.
Figure 33:
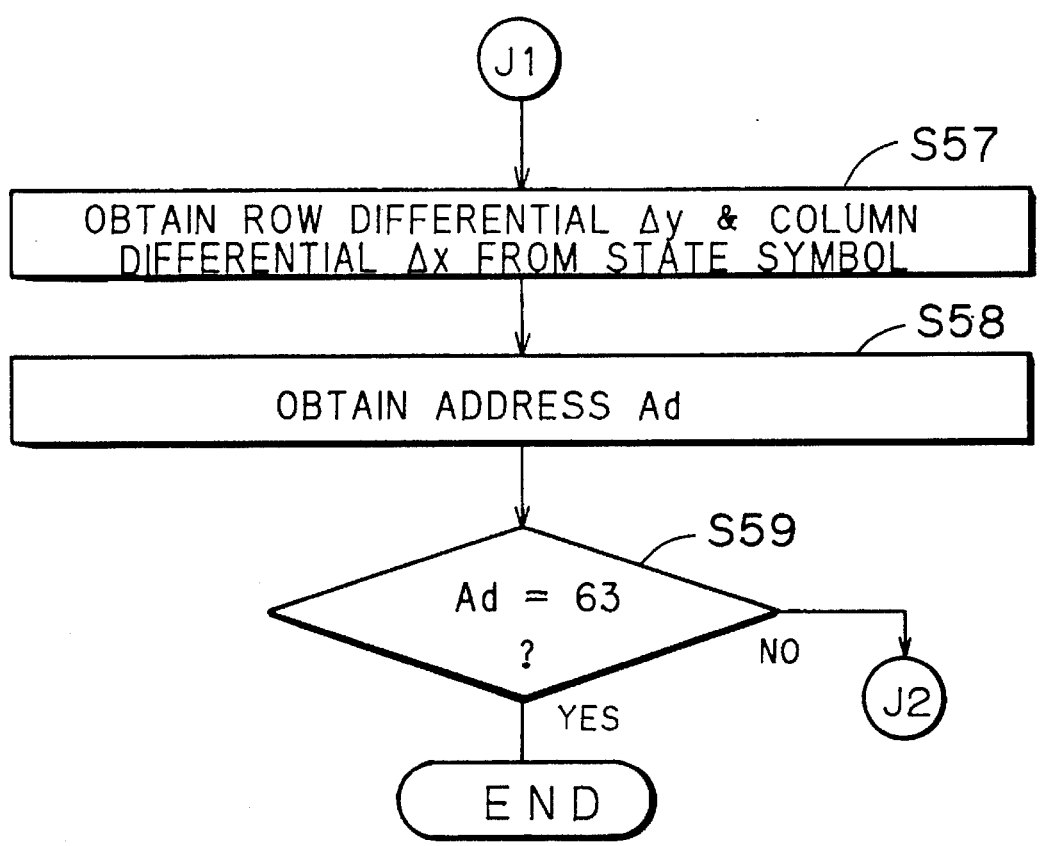
FIG. 33 is a flow chart showing the procedure of the fifth embodiment of the present invention.

FIGS. 32 and 33 show the algorithm of the fifth embodiment in the form of flow charts. For the purpose of simplification, it is assumed that the state change signals are stored along readout addresses in a storage element such as a ROM.

The order of generation of the state symbols a, b, c and d is already decided, and it is not necessary to read the same from storage means. However, since it is necessary to invert the generation order of the state symbols from the order P to the order Q in an intermediate stage, i.e., after generation of a zigzag address "35" similarly to the second and fourth embodiments, a step similar to the steps S23 and S43 shown in FIGS. 9 and 25 is required.

At a step S51, a zigzag address, a state symbol and a readout address for a state change signal are initialized as "0", "a" and "0" respectively. Then, the state change signal is read (step S52) so that the process is advanced to a step S57 if the state change signal is "0", while the process is advanced to a step S54 if the signal is "1" (step S53). At a step S54, a determination is made as to whether the state symbols are generated in the order P or the order Q. If the generation order is relatively young and a zigzag address "28" is not yet generated, the state symbols are changed along the order P (step S55). When the generation order is relatively old and the zigzag address "28" is already generated, the state symbols are changed along the order Q. There may be such a case that the state change signal is "0" and the state symbol is not changed, as a matter of course (step S53).

Thereafter row and column differentials $\Delta y$ and $\Delta x$ are obtained from the state symbol (step S57), a zigzag address Ad is obtained (step S58) and a determination is made as to whether or not all zigzag addresses are generated (step S59), similarly to the steps S45 to S48 shown in FIG. 25. If a zigzag address "63" to be finally generated is not yet generated, the process is returned to the step S52, while the procedure is terminated if the address "63" is generated.

Figure 34:
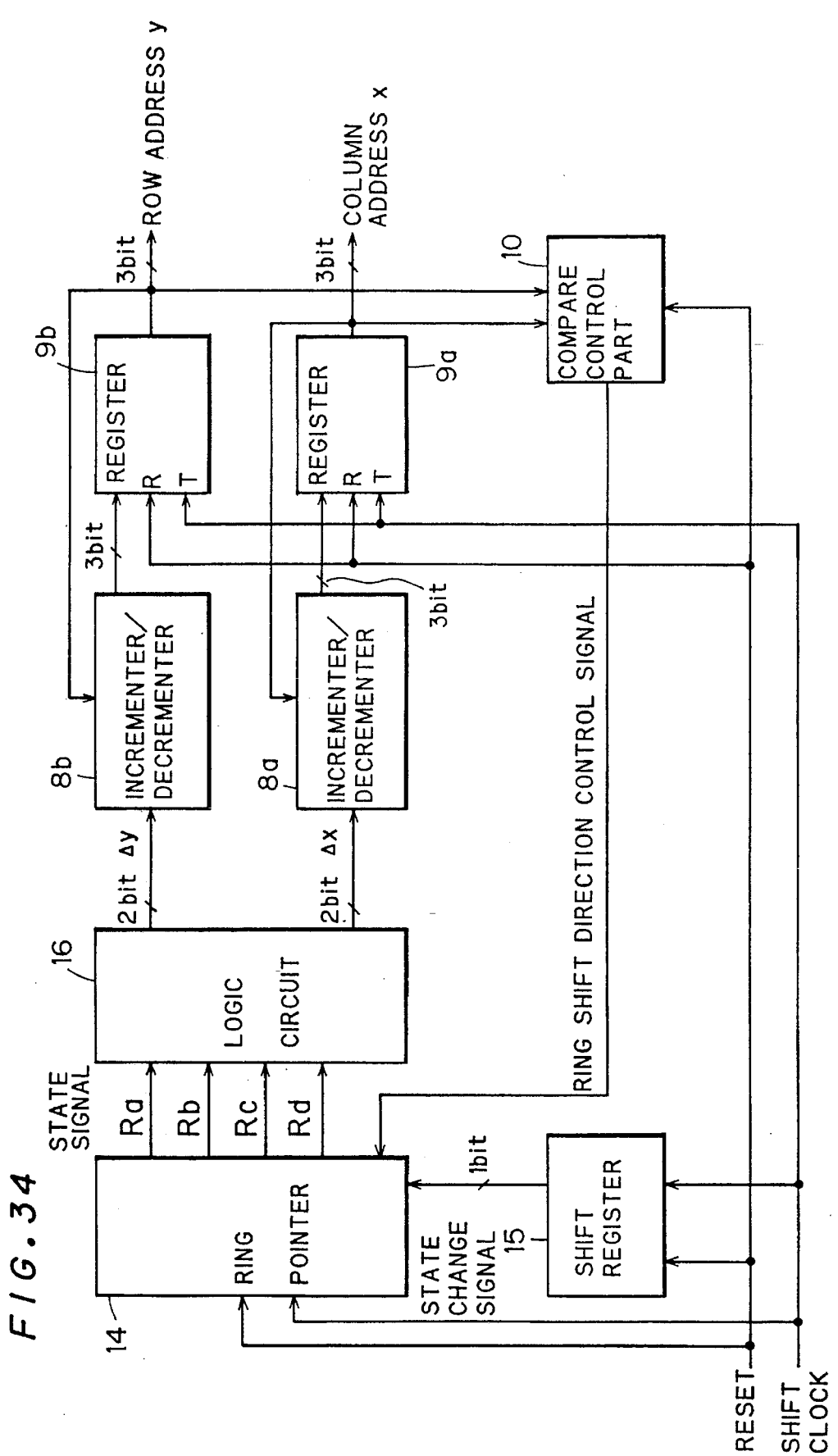
FIG. 34 is a block diagram for illustrating the fifth embodiment of the present invention.

FIG. 34 shows a zigzag address generation circuit for implementing the above algorithm in practice. In this circuit, no storage element 6 is employed but a presettable shift register 15 of 1 bit by 64 stages is employed as storage means for state change signals, which are differential data. The shift register 15 receives a reset signal and a clock signal, to generate state change signals along initialization after readout operation and the generation order. Table 11 shows data generated by the shift register 15.

TABLE 11

| SHIFT ORDER | 0 | 1 | 2 | 3 | 4 | 5 | 6 | 7 | 8 |
|---|---|---|---|---|---|---|---|---|---|
| DATA GENERATED BY SHIFT REGISTER 15 | 1 | 1 | 1 | 0 | 1 | 1 | 0 | 0 | 1 |
| SHIFT ORDER | 9 | 10 | 11 | 12 | 13 | 14 | 15 | 16 | |
| DATA GENERATED BY SHIFT REGISTER 15 | 1 | 0 | 0 | 0 | 1 | 1 | 0 | 0 | |
| SHIFT ORDER | 17 | 18 | 19 | 20 | 21 | 22 | 23 | 24 | |
| DATA GENERATED BY SHIFT REGISTER 15 | 0 | 0 | 1 | 1 | 0 | 0 | 0 | 0 | |
| SHIFT ORDER | 25 | 26 | 27 | 28 | 29 | 30 | 31 | 32 | |
| DATA GENERATED BY SHIFT REGISTER 15 | 0 | 1 | 1 | 0 | 0 | 0 | 0 | 0 | |
| SHIFT ORDER | 33 | 34 | 35 | 36 | 37 | 38 | 39 | 40 | |
| DATA GENERATED BY SHIFT REGISTER 15 | 0 | 1 | 1 | 0 | 0 | 0 | 0 | 0 | |
| SHIFT ORDER | 41 | 42 | 43 | 44 | 45 | 46 | 47 | 48 | |
| DATA GENERATED BY SHIFT REGISTER 15 | 1 | 1 | 0 | 0 | 0 | 0 | 1 | 1 | |
| SHIFT ORDER | 49 | 50 | 51 | 52 | 53 | 54 | 55 | 56 | |
| DATA GENERATED BY SHIFT REGISTER 15 | 0 | 0 | 0 | 1 | 1 | 0 | 0 | 1 | |
| SHIFT ORDER | 57 | 58 | 59 | 60 | 61 | 62 | 63 | | |
| DATA GENERATED BY SHIFT REGISTER 15 | 1 | 0 | 1 | 1 | 1 | — | — | | |

On the other hand, a ring pointer 14, which generates state signals Ra, Rb, Rc and Rd expressing the state symbols a, b, c and d respectively, corresponds to the steps S55 and S56. The state signals Ra, Rb, Rc and Rd are not the two-bit signals shown in the third and fourth embodiments. Only one of these signals takes a value "1", while the remaining three signals take values "0". The respective ones of the state signals Ra, Rb, Rc and Rd take values "1", to express the state symbols a, b, c and d respectively. The ring pointer 14 also receives the reset signal and the clock signal, to initialize the state symbol to a, i.e., (Ra, Rb, Rc, Rd)=(1, 0, 0, 0), and receives the state change signal, which is the content of the shifter register 15, to successively generate state signals.

The state signals Ra, Rb, Rc and Rd are inputted in a logic circuit 16, to be transformed to row and column differentials $\Delta y$ and $\Delta x$. Thereafter row and column addresses y and x are obtained from the row and column differentials $\Delta y$ and $\Delta x$ by incrementer/decrementers 8a and 8b and registers 9a and 9b, similarly to the first to fourth embodiments.

Further, a compare control part 10 is provided similarly to the second and fourth embodiments to monitor the zigzag addresses and invert the order P of the ring pointer 14 to the order Q by a ring shift direction control signal, in correspondence to the step S54.

Figure 35:
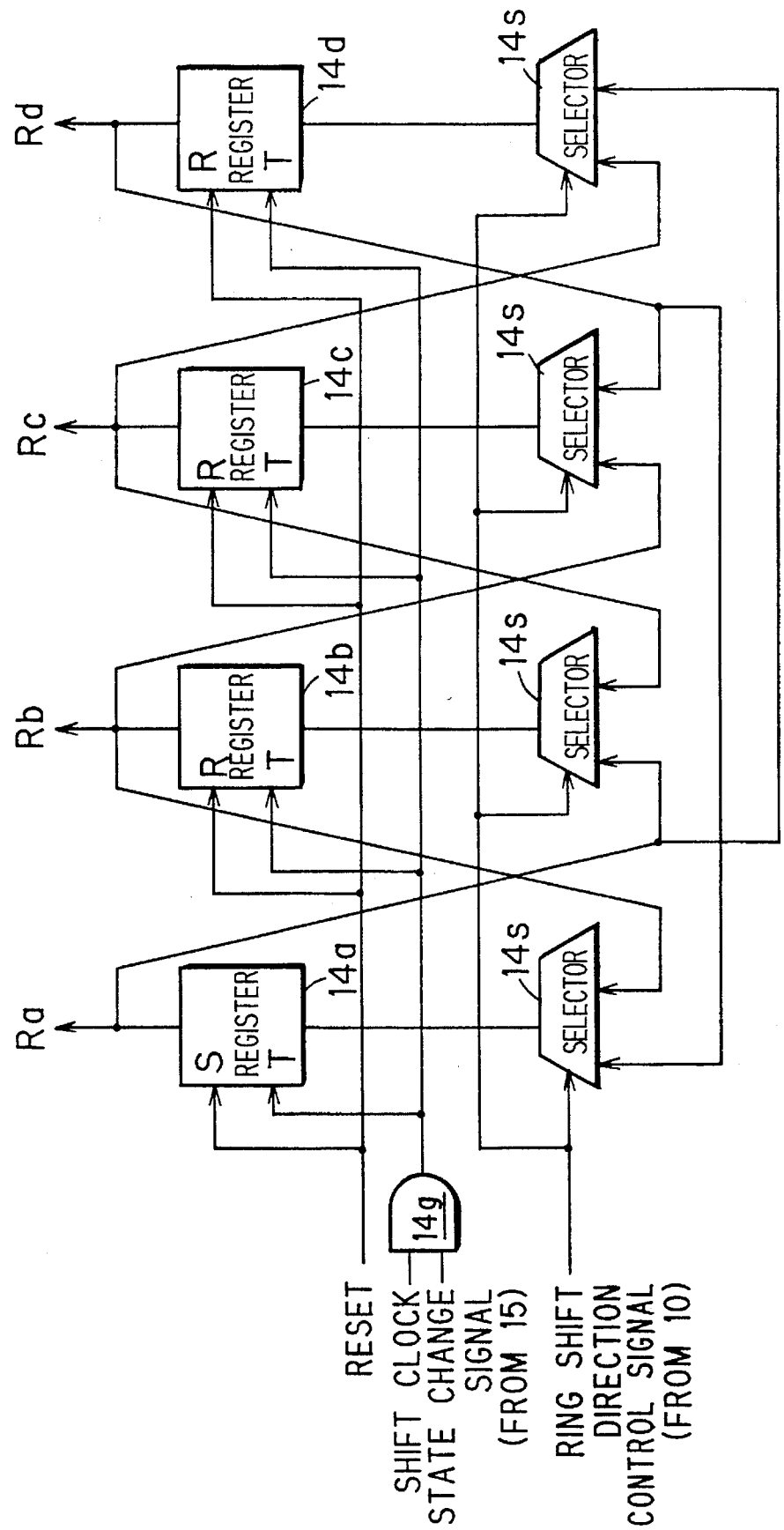
FIG. 35 is a block diagram of a ring pointer 14.

FIG. 35 shows the structure of the ring pointer 14. Registers 14a to 14d output state change signals Ra, Rb, Rc and Rd respectively. The outputs of the registers 14a, 14b, 14c and 14d are inputted the registers 14d and 14b, the registers 14a and 14c, the registers 14b and 14d and the registers 14c and 14a through selectors 14s respectively. Depending on the ring shift direction control signal received from the compare control part 10, each selector 14s decides the one of the registers to which the content of a certain register is shifted.

The content of each register is shifted since a gate 14g is opened only when each state change signal takes a value "1" so that a shift clock (clock signal) is supplied to a clock input T.

First, reset signals are supplied to a set input, a rest input R, a reset input R and a reset input R of the registers 14a, 14b, 14c and 14d respectively, so that the state signals are (Ra, Rb, Rc, Rd)=(1, 0, 0, 0) (corresponding to the step S51). When the ring shift direction control signal is "0", the contents of the registers 14a, 14b, 14c and 14d are transmitted to the registers 14b, 14c, 14d and 14a respectively through the selectors 14s. The contents of the respective registers are rewritten by the clock signal only when the state change signal takes a value "1" (corresponding to the steps S53 and S55). When transition from generation order "0" to generation order "1" takes place, for example, the state signals are (0, 1, 0, 0) since the state change signal is "1".

When the compare control part 10 determines that the zigzag address "28" is already generated (corresponding to the step S54) and the ring shift direction control signal is supplied to the selectors 14s as "1", the contents of the registers 14a, 14b, 14c and 14d are transmitted to the registers 14d, 14a, 14b and 14c respectively. As to transition from generation order "35" to generation order "36", for example, the state signals are changed from (1, 0, 0, 0) to (0, 0, 0, 1) since the state change signal is "1".

Figure 36:
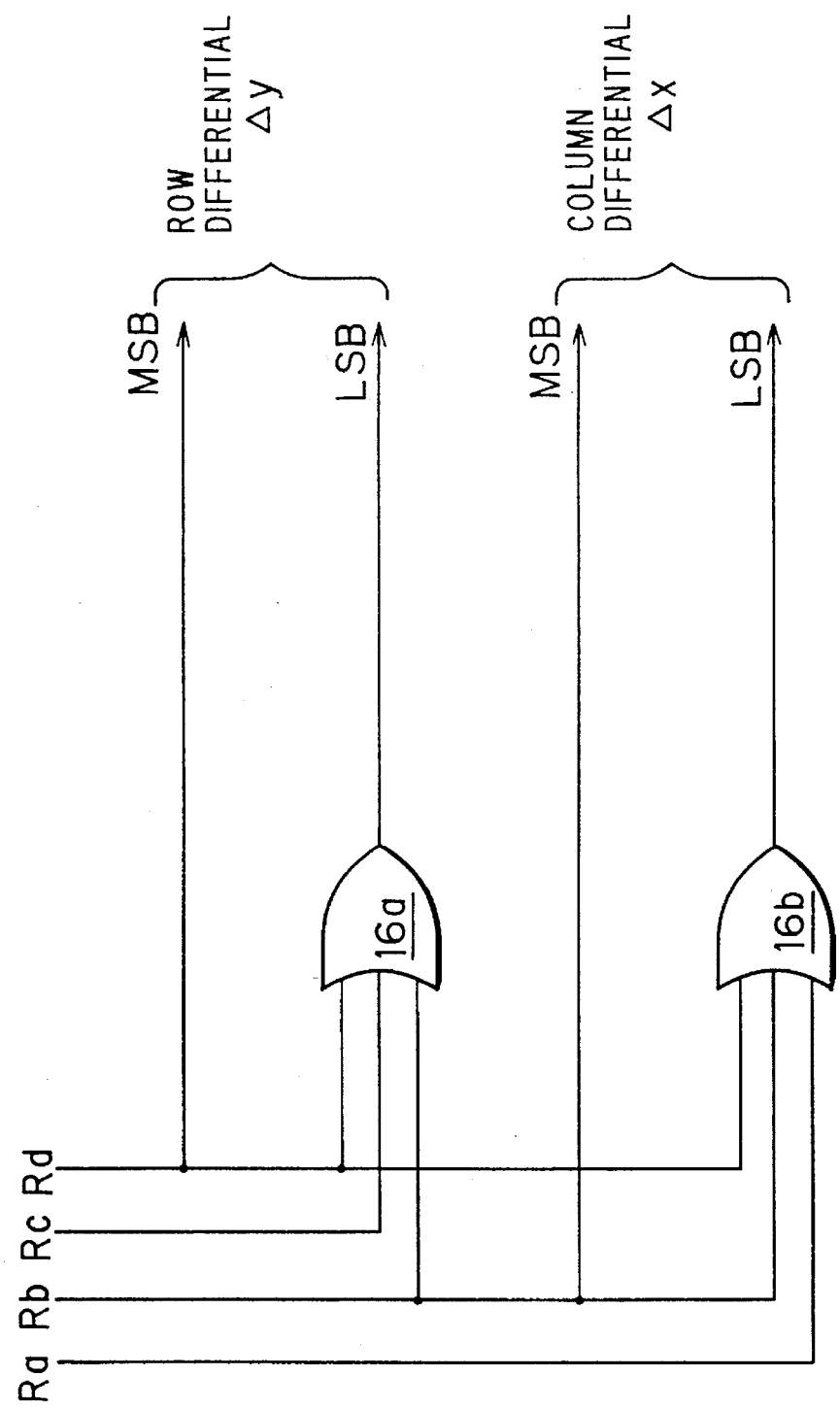
FIG. 36 is a block diagram of a logic circuit 16.
Figure 37:
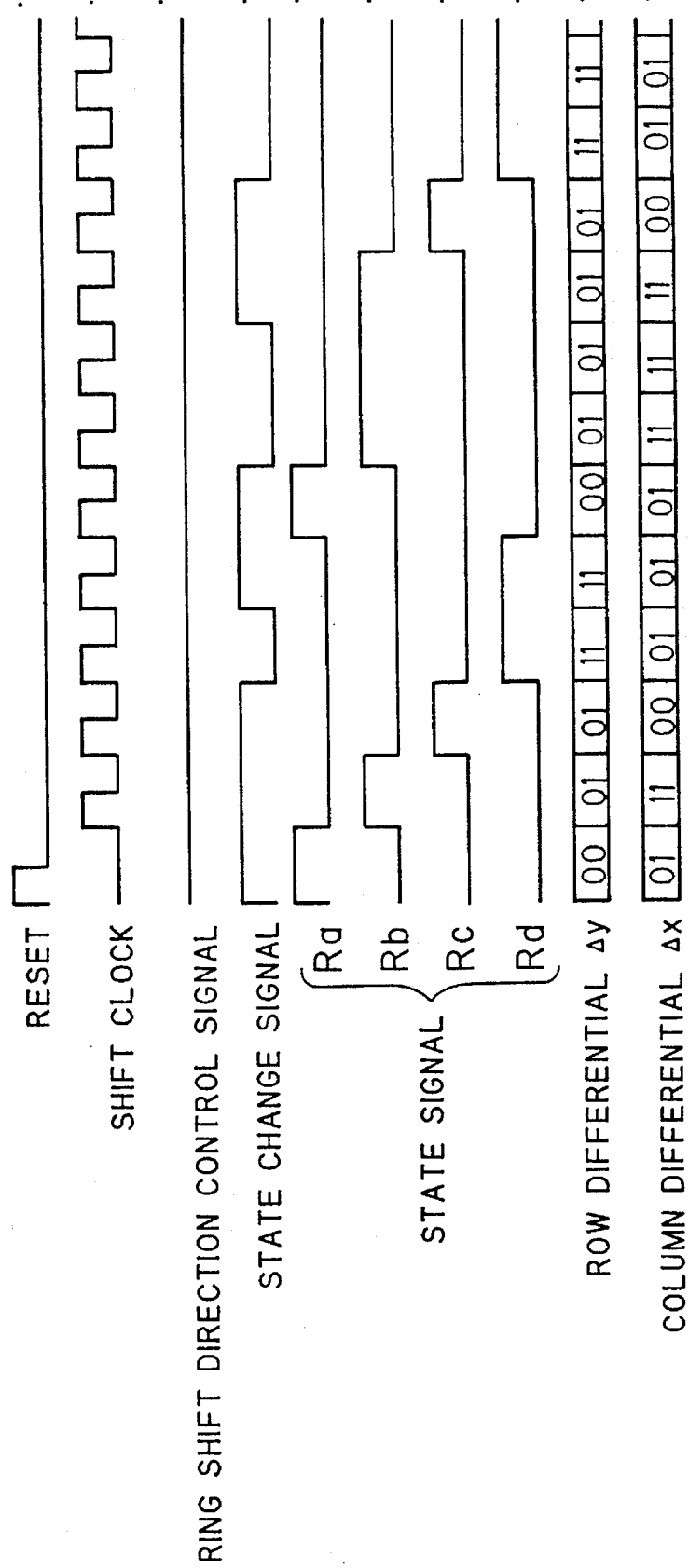
FIG. 37 is a timing chart for illustrating the fifth embodiment of the present invention.
Figure 38:
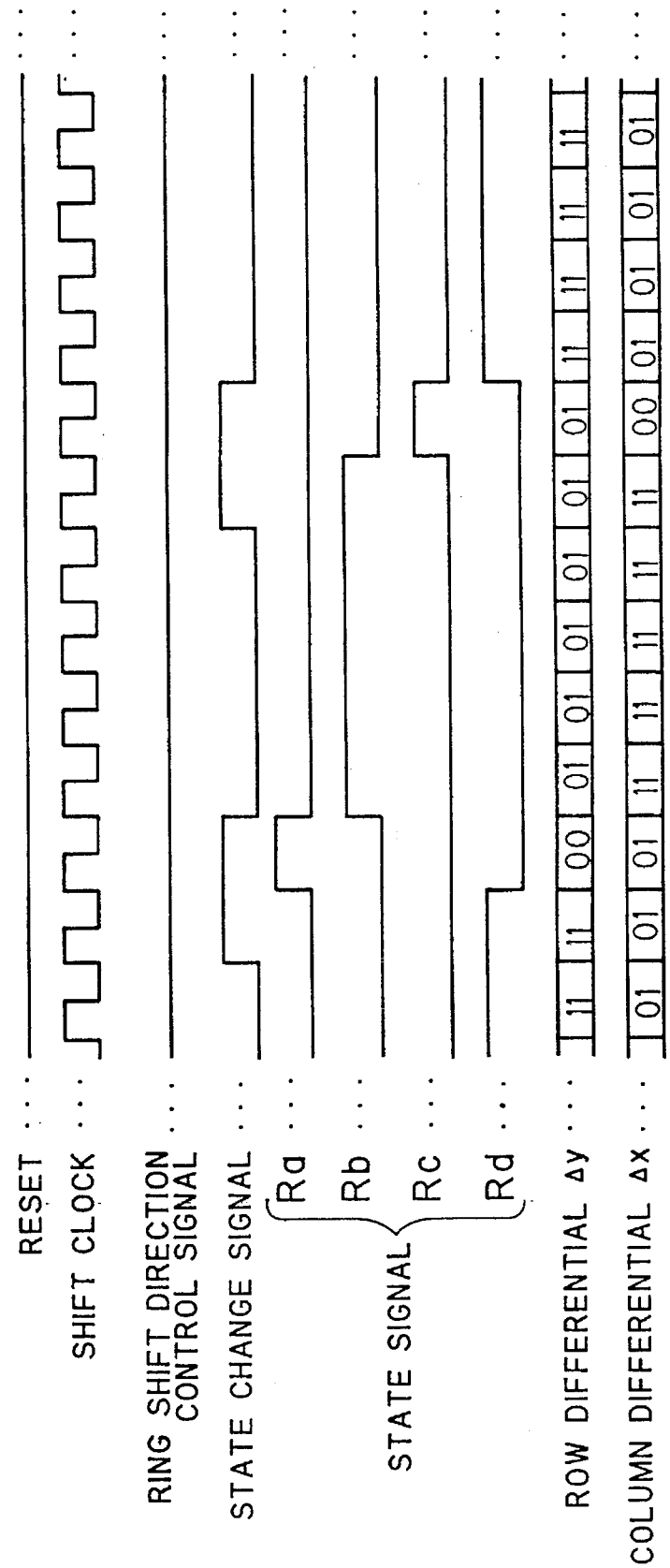
FIG. 38 is a timing chart for illustrating the fifth embodiment of the present invention.

The state signals thus obtained from the ring pointer 14 are transformed to row and column differentials $\Delta y$ and $\Delta x$ in the logic circuit 16. FIG. 36 shows the structure of the logic circuit 16. The state signals Ra, Rb, Rc and Rd are transformed to the row and column differentials $\Delta y$ and $\Delta x$ by gates 16a and 16b along Table 12.

TABLE 12

| STATE SIGNAL | | | | ROW DIFFERENTIAL Δy | COLUMN DIFFERENTIAL Δx | STATE SYMBOL |
|---|---|---|---|---|---|---|
| Ra | Rb | Rc | Rd | | | |
| 1 | 0 | 0 | 0 | 00 | 01 | a |
| 0 | 1 | 0 | 0 | 01 | 11 | b |
| 0 | 0 | 1 | 0 | 01 | 00 | c |
| 0 | 0 | 0 | 1 | 11 | 01 | d |

Figure 39:
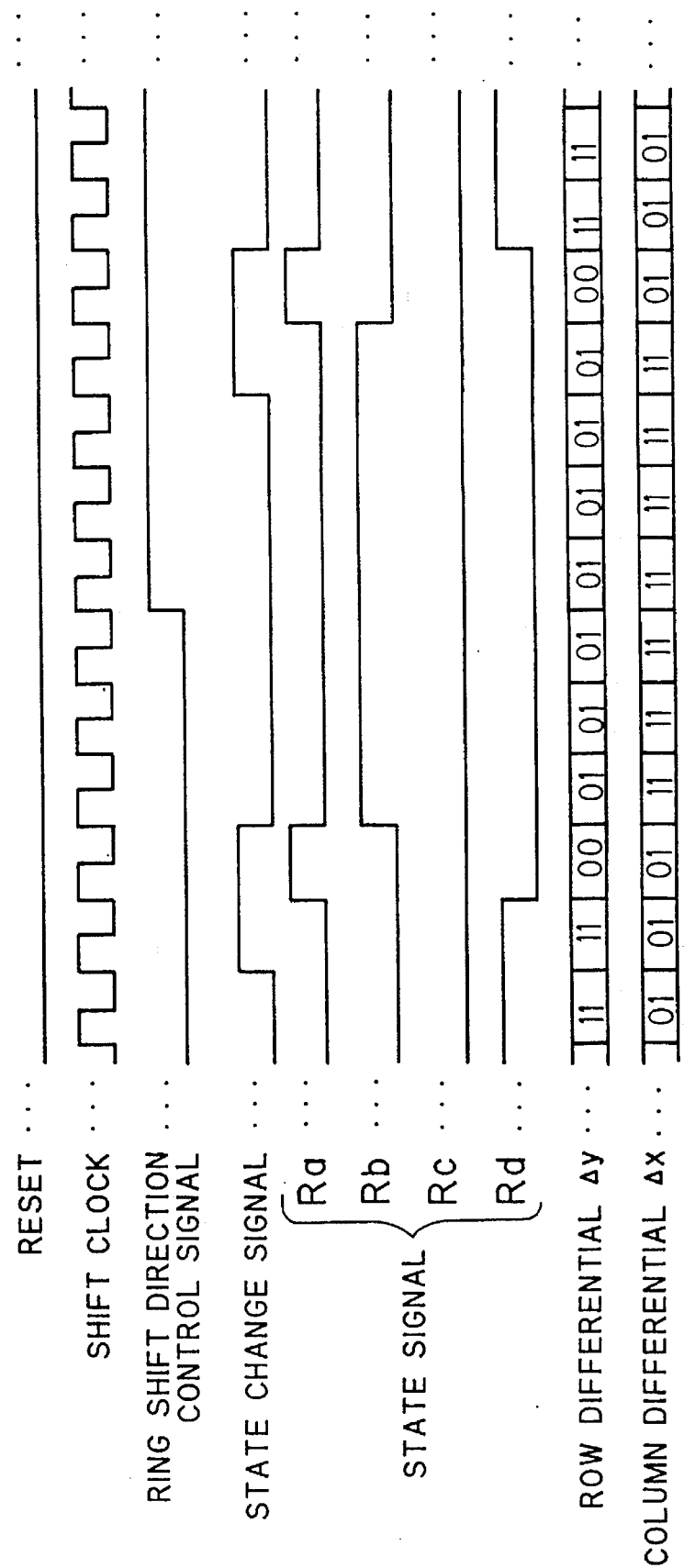
FIG. 39 is a timing chart for illustrating the fifth embodiment of the present invention.
Figure 40:
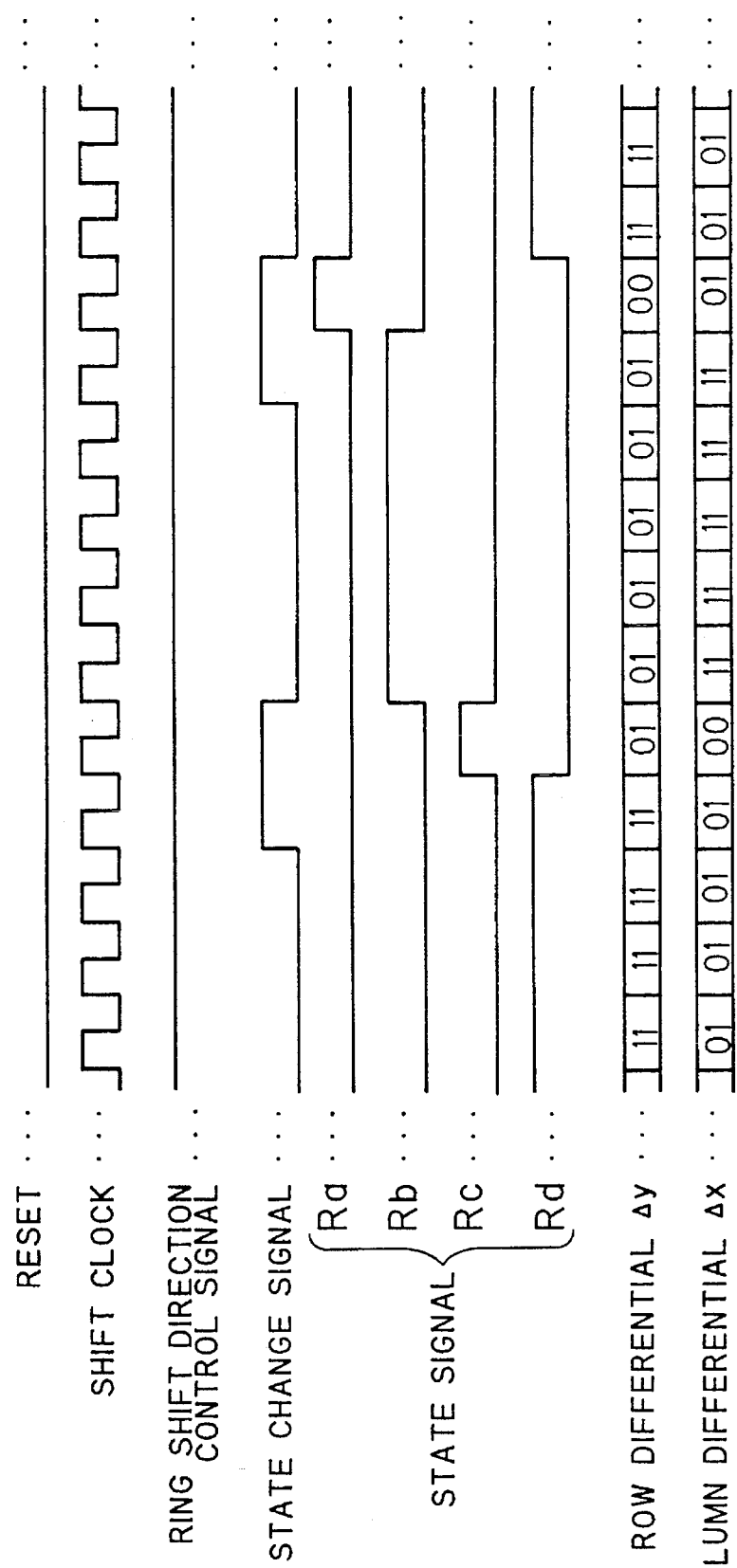
FIG. 40 is a timing chart for illustrating the fifth embodiment of the present invention.
Figure 41:
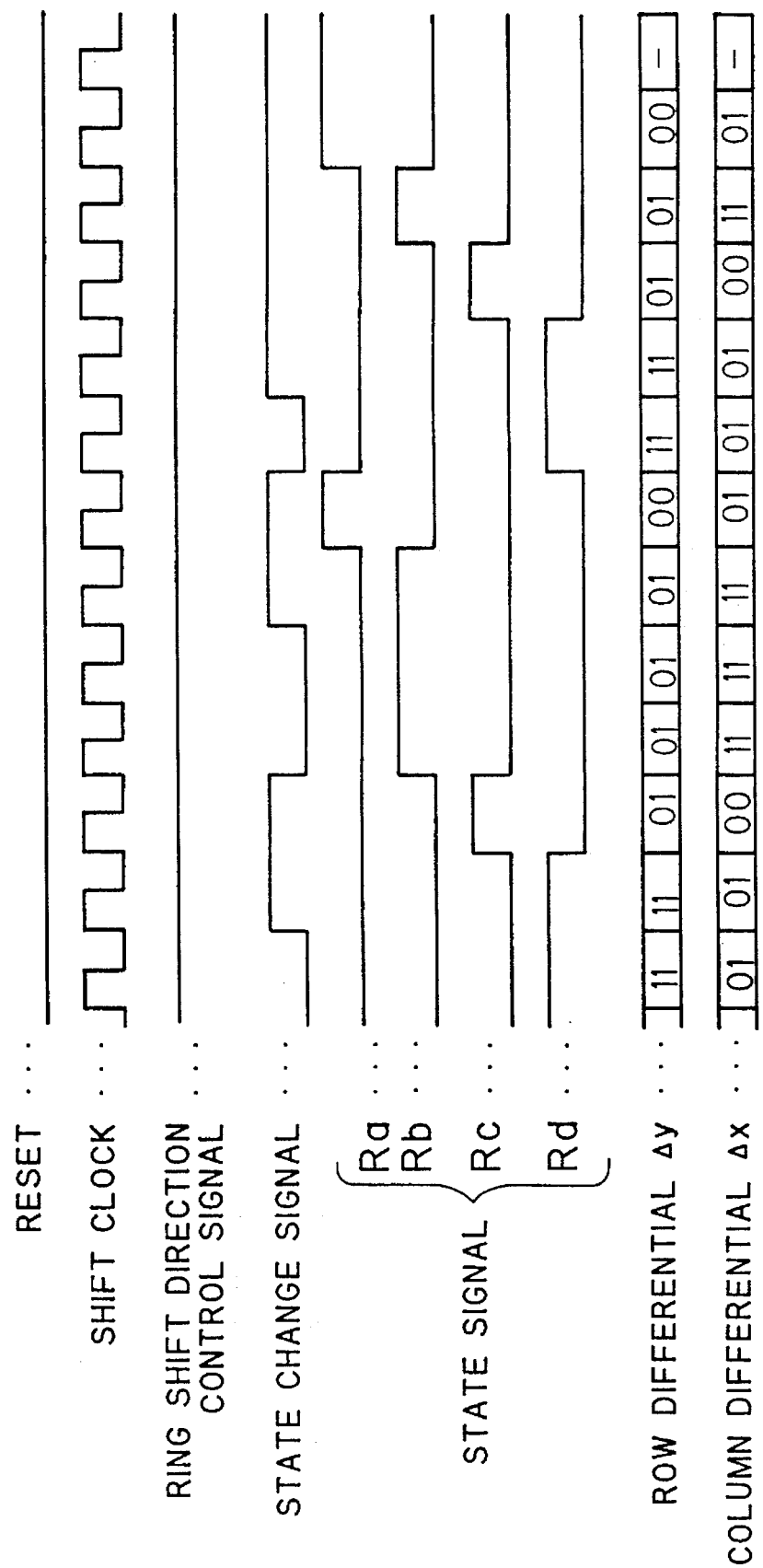
FIG. 41 is a timing chart for illustrating the fifth embodiment of the present invention.

FIGS. 37 to 41 show manners of generation of the row and column differentials Δy and Δx in relation to clock signals (clocks). Row and column addresses y and x are generated from the row and column differentials Δy and Δx similarly to the first to fourth embodiments, and hence description thereof is omitted. FIGS. 37, 38, 39, 40 and 41 show generation order "0" to "11", generation order "12" to "24", generation order "25" to "37", generation order "38" to "50" and generation order "51" to "63" respectively. The ring shift direction control signal rises in the generation order "31" to cause inversion from the order P to the order Q, so that selection directions of selectors 14s provided in the ring pointer 14 are thereafter switched (FIG. 39).

(B-6) Sixth Embodiment

As described with reference to (B-5), the order P and the order Q of changes of the state symbols are reverse to each other. However, it is understood that the state change signals are also symmetrically listed in relation to the shift order "30" and the shift order "31" shown in Table 1. Thus, it is possible to halve the amount of data of the state change signals to be stored similarly to the second and fourth embodiments. This is now described with reference to Table 13.

TABLE 13

| GENERATION ORDER | READOUT ADDRESS | STATE CHANGE SIGNAL | STATE SYMBOL | ROW DIFFERENTIAL Δy | COLUMN DIFFERENTIAL Δx |
|---|---|---|---|---|---|
| 0 | 0 | 1 | a | 0 | 1 |
| 1 | 1 | 1 | b | 1 | -1 |
| 2 | 2 | 1 | c | 1 | 0 |
| 3 | 3 | 0 | d | -1 | 1 |
| 4 | 4 | 1 | d | -1 | 1 |
| 5 | 5 | 1 | a | 0 | 1 |
| 6 | 6 | 0 | b | 1 | -1 |
| 7 | 7 | 0 | b | 1 | -1 |
| 8 | 8 | 1 | b | 1 | -1 |
| 9 | 9 | 1 | c | 1 | 0 |
| 10 | 10 | 0 | d | -1 | 1 |
| 11 | 11 | 0 | d | -1 | 1 |
| 12 | 12 | 0 | d | -1 | 1 |
| 13 | 13 | 1 | d | -1 | 1 |
| 14 | 14 | 1 | a | 0 | 1 |
| 15 | 15 | 0 | b | 1 | -1 |
| 16 | 16 | 0 | b | 1 | -1 |
| 17 | 17 | 0 | b | 1 | -1 |
| 18 | 18 | 0 | b | 1 | -1 |
| 19 | 19 | 1 | b | 1 | -1 |
| 20 | 20 | 1 | c | 1 | 0 |
| 21 | 21 | 0 | d | -1 | 1 |
| 22 | 22 | 0 | d | -1 | 1 |
| 23 | 23 | 0 | d | -1 | 1 |
| 24 | 24 | 0 | d | -1 | 1 |
| 25 | 25 | 0 | d | -1 | 1 |
| 26 | 26 | 1 | d | -1 | 1 |
| 27 | 27 | 1 | a | 0 | 1 |
| 28 | 28 | 0 | b | 1 | -1 |
| 29 | 29 | 0 | b | 1 | -1 |
| 30 | 30 | 0 | b | 1 | -1 |
| 31 | 30 | 0 | b | 1 | -1 |
| 32 | 29 | 0 | b | 1 | -1 |
| 33 | 28 | 0 | b | 1 | -1 |
| 34 | 27 | 1 | b | 1 | -1 |
| 35 | 26 | 1 | a | 0 | 1 |
| 36 | 25 | 0 | d | -1 | 1 |
| 37 | 24 | 0 | d | -1 | 1 |
| 38 | 23 | 0 | d | -1 | 1 |
| 39 | 22 | 0 | d | -1 | 1 |
| 40 | 21 | 0 | d | -1 | 1 |
| 41 | 20 | 1 | d | -1 | 1 |
| 42 | 19 | 1 | c | 1 | 0 |
| 43 | 18 | 0 | b | 1 | -1 |
| 44 | 17 | 0 | b | 1 | -1 |
| 45 | 16 | 0 | b | 1 | -1 |
| 46 | 15 | 0 | b | 1 | -1 |
| 47 | 14 | 1 | b | 1 | -1 |
| 48 | 13 | 1 | a | 0 | 1 |
| 49 | 12 | 0 | d | -1 | 1 |
| 50 | 11 | 0 | d | -1 | 1 |
| 51 | 10 | 0 | d | -1 | 1 |

TABLE 13-continued

| GENERATION ORDER | READOUT ADDRESS | STATE CHANGE SIGNAL | STATE SYMBOL | ROW DIFFERENTIAL $\Delta y$ | COLUMN DIFFERENTIAL $\Delta x$ |
|---|---|---|---|---|---|
| 52 | 9 | 1 | d | −1 | 1 |
| 53 | 8 | 1 | c | 1 | 0 |
| 54 | 7 | 0 | b | 1 | −1 |
| 55 | 6 | 0 | b | 1 | −1 |
| 56 | 5 | 1 | b | 1 | −1 |
| 57 | 4 | 1 | a | 0 | 1 |
| 58 | 3 | 0 | d | −1 | 1 |
| 59 | 2 | 1 | d | −1 | 1 |
| 60 | 1 | 1 | c | 1 | 0 |
| 61 | 0 | 1 | b | 1 | −1 |
| 62 |   |   | a | 0 | 1 |
| 63 |   |   |   |   |   |

Table 13 shows generation order, state change signals, state symbols, row differentials $\Delta y$ and column differentials $\Delta x$ which are identical to those in Table 10. However, readout addresses for storing the state change signals in a storage element such as ROM are listed in reverse order up to the generation order "30" and after the generation order "31". Thus, the amount of data to be stored can be reduced as follows:

$$1 \text{ (bit)} \times 31 = 31 \text{ (bits)} \qquad (10)$$

Figure 42:
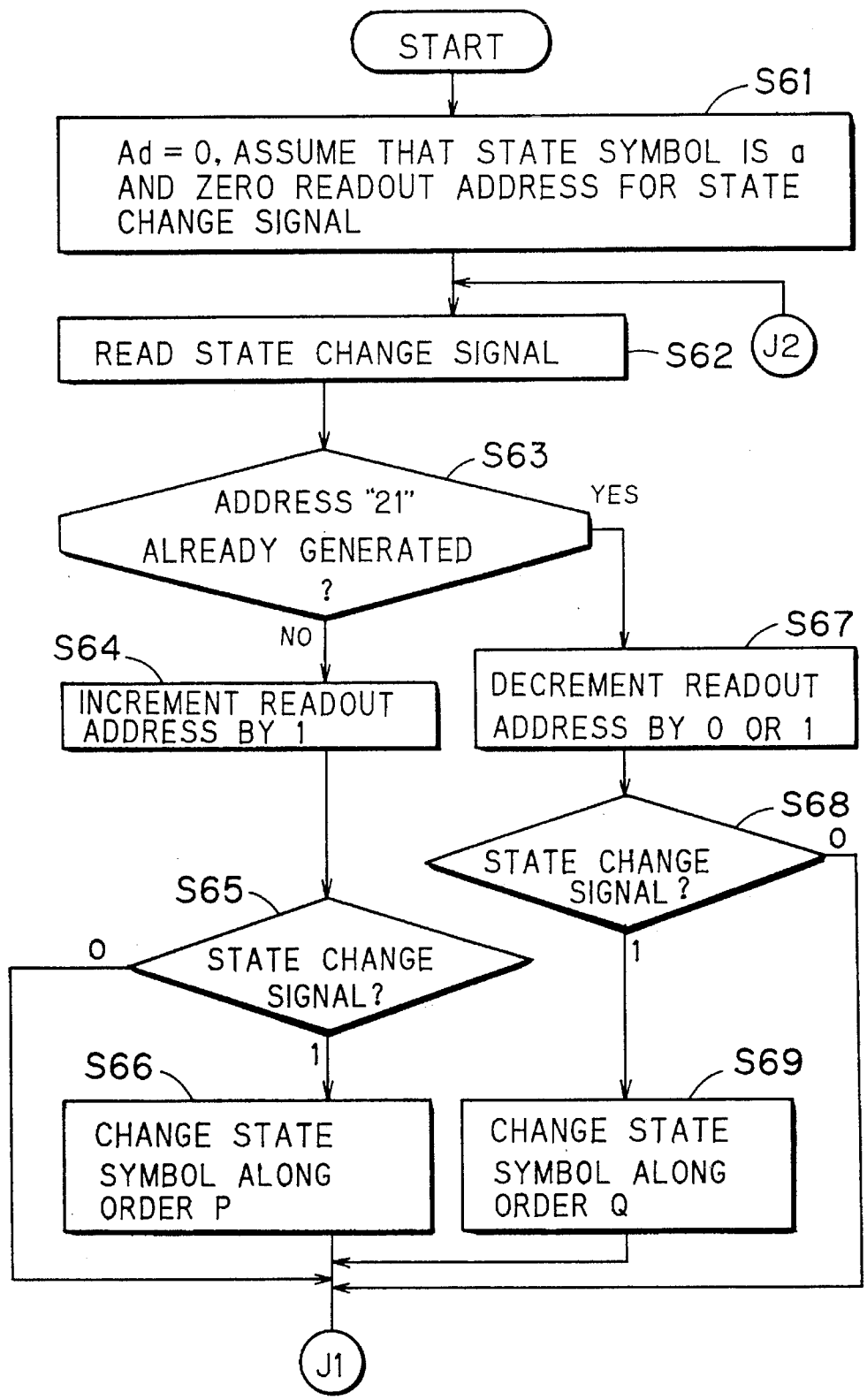
FIG. 42 is a flow chart showing the procedure of a sixth embodiment of the present invention.

FIG. 42 shows the algorithm of the sixth embodiment in the form of a flow chart. A portion corresponding to that described in (B-5) with reference to FIG. 33 is not described here to omit redundant description. Further, it is assumed that the state change signals are stored in a storage element such as ROM along the readout addresses.

At a step S61, a zigzag address, a state symbol and a readout address for a state change signal are initialized, and then the state change signal is read (step S62). Dissimilarly to the second, fourth and fifth embodiments, a determination is made as to whether or not a zigzag address "21" corresponding to generation order "30" is already generated (step S63), so that the process is advanced to a step S64 if the address is not yet generated, while the process is advanced to a step S67 if the same is already generated.

The steps S64, S65 and S66 correspond to a part of the step S52, the step S53 and the step S55 shown in FIG. 32 respectively, and operations thereof are similar to those of the fifth embodiment. In the sixth embodiment, however, presence/absence of generation of the zigzag address "21" has been determined at the step S63 and the step S54 shown in FIG. 32 is omitted from the flow chart of FIG. 42 since the same is not necessarily required.

When the process is advanced to the step S67, the readout address for the state change signal is decremented by zero or 1, to read out the state change signals in reverse order. Due to this procedure, it is possible to halve the amount of data to be stored as compared with the fifth embodiment.

Figure 43:
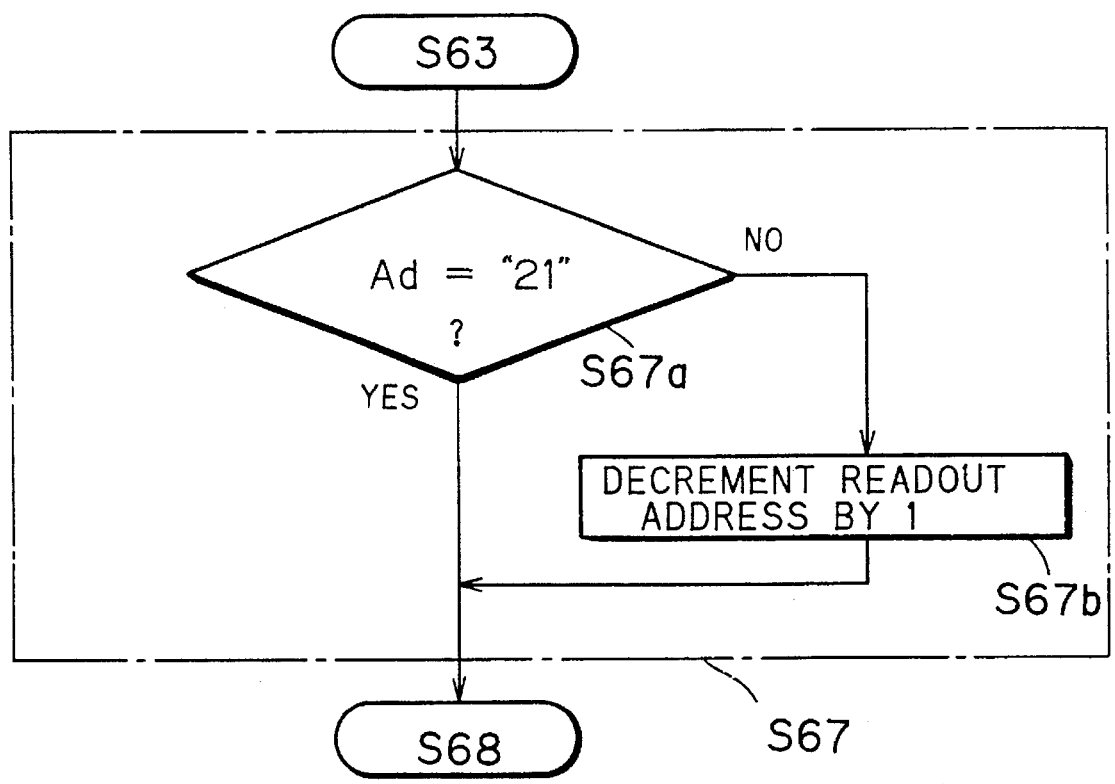
FIG. 43 is a flow chart showing the procedure of the sixth embodiment of the present invention.

FIG. 43 shows the step S67 in detail. Referring to the step S67, a determination is first made at a step S67a as to whether or not a current zigzag address Ad is "21". If the determination is of yes, the readout address is not changed. Since the readout address has already reached "30", it remains at "30" also in the next generation order "31".

When the current zigzag address Ad is not "21", on the other hand, it is recognized that the generation order is after "31" (including "31") since the determination has already been made at the step S63, and hence the readout address is decremented by 1 at a step S67b. The steps S68 and S69 correspond to the steps S53 and S56 shown in FIG. 32 respectively. Connectors J1 and J2 are connected not to those of FIG. 32 but to those of FIG. 33, to carry out the steps S57 to S58 also in the sixth embodiment.

Figure 44:
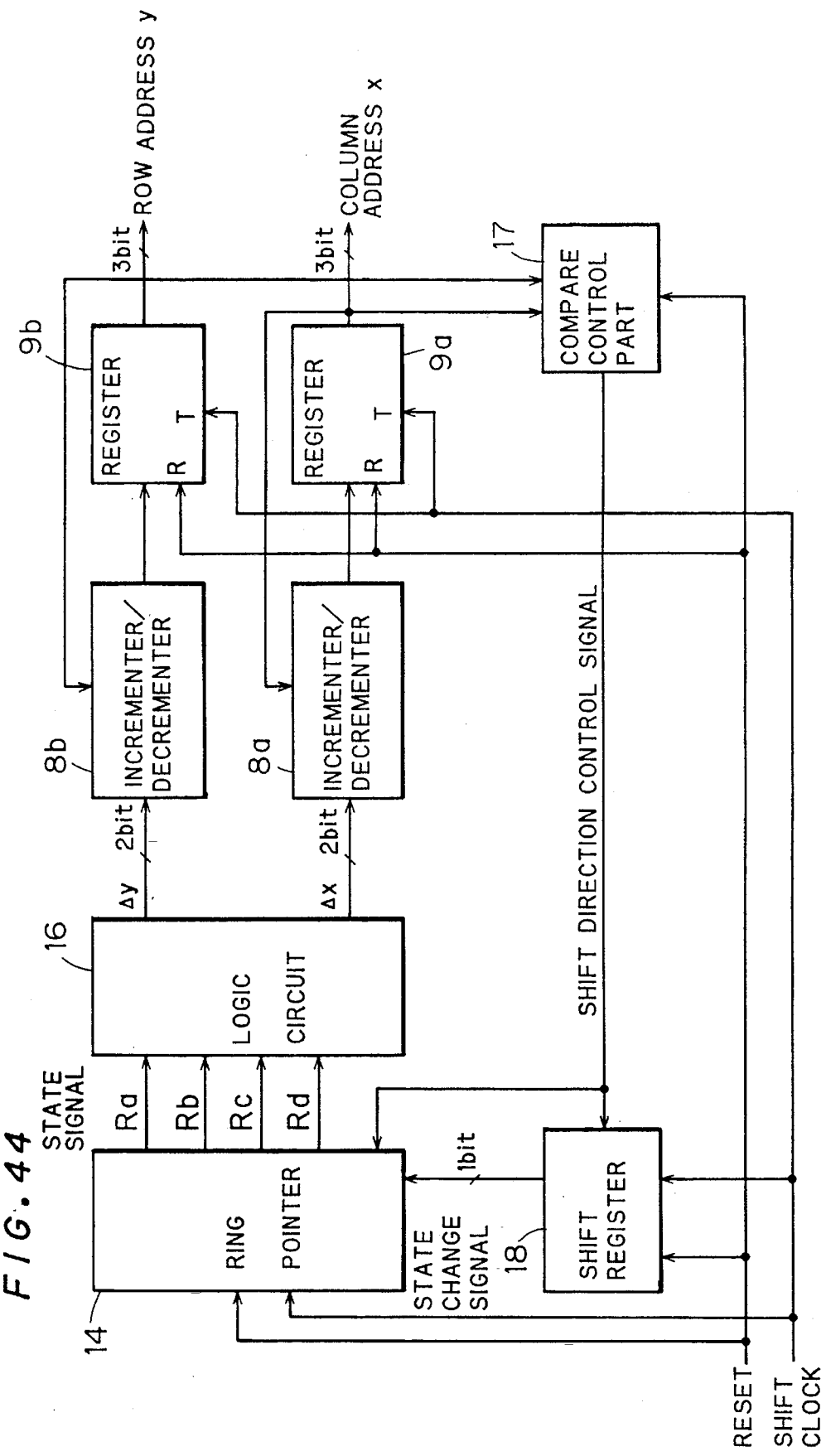
FIG. 44 is a block diagram for illustrating the sixth embodiment of the present invention.

In order to implement the above algorithm in practice, the ring shift direction control signal may be supplied also to the shift register 15 in the zigzag address generation circuit according to the fifth embodiment shown in FIG. 34, to invert the readout order in the shift register 15. FIG. 44 shows a zigzag address generation circuit which is obtained in correspondence to this. In this circuit, no storage element 6 is employed but a presettable shift register 18 of 1 bit by 31 stages is employed as storage means for state change signals, which are differential data. Namely, the storage means can be implemented by a shift register which is smaller in scale than the shift register 15 shown in FIG. 34. The ring shift direction control signal in FIG. 34 is assumed to be a shift direction control signal in FIG. 44.

Figure 45:
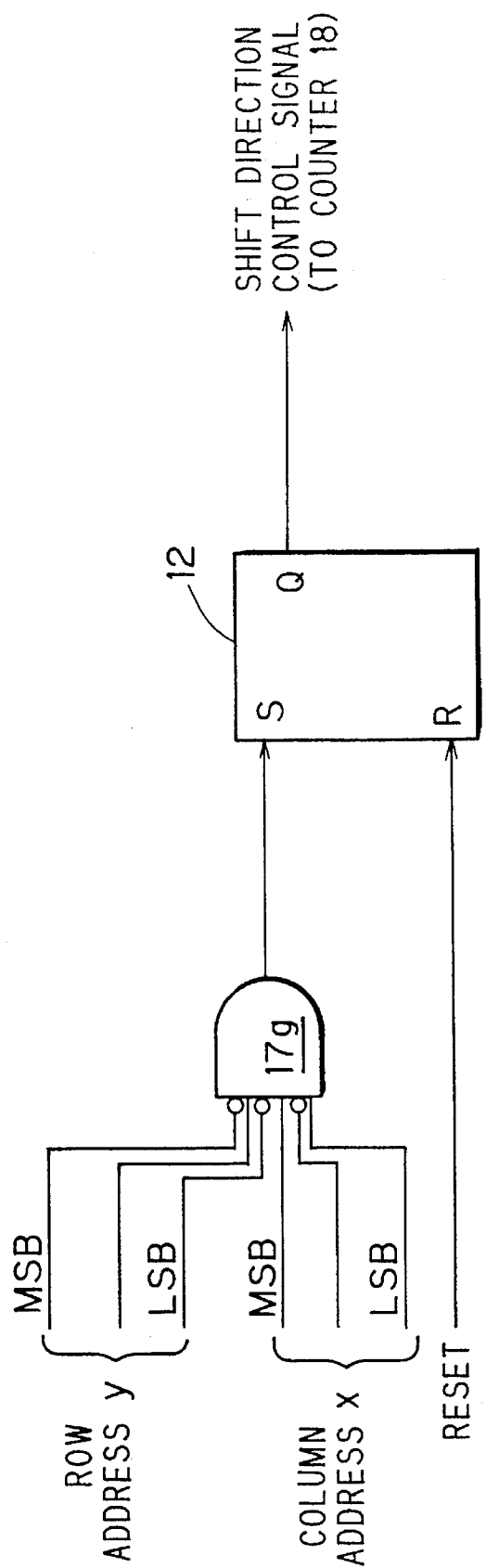
FIG. 45 is a block diagram of a compare control part 17.

A compare control part 17 has a structure which is similar to but slightly different from that of the compare control part 10, since the same detects the zigzag address "21". FIG. 45 shows an exemplary structure of the compare control part 17. A gate 17g detects the zigzag address "21", and thereafter the shift direction control signal becomes "1", to be transmitted to a counter 18.

Figure 46:
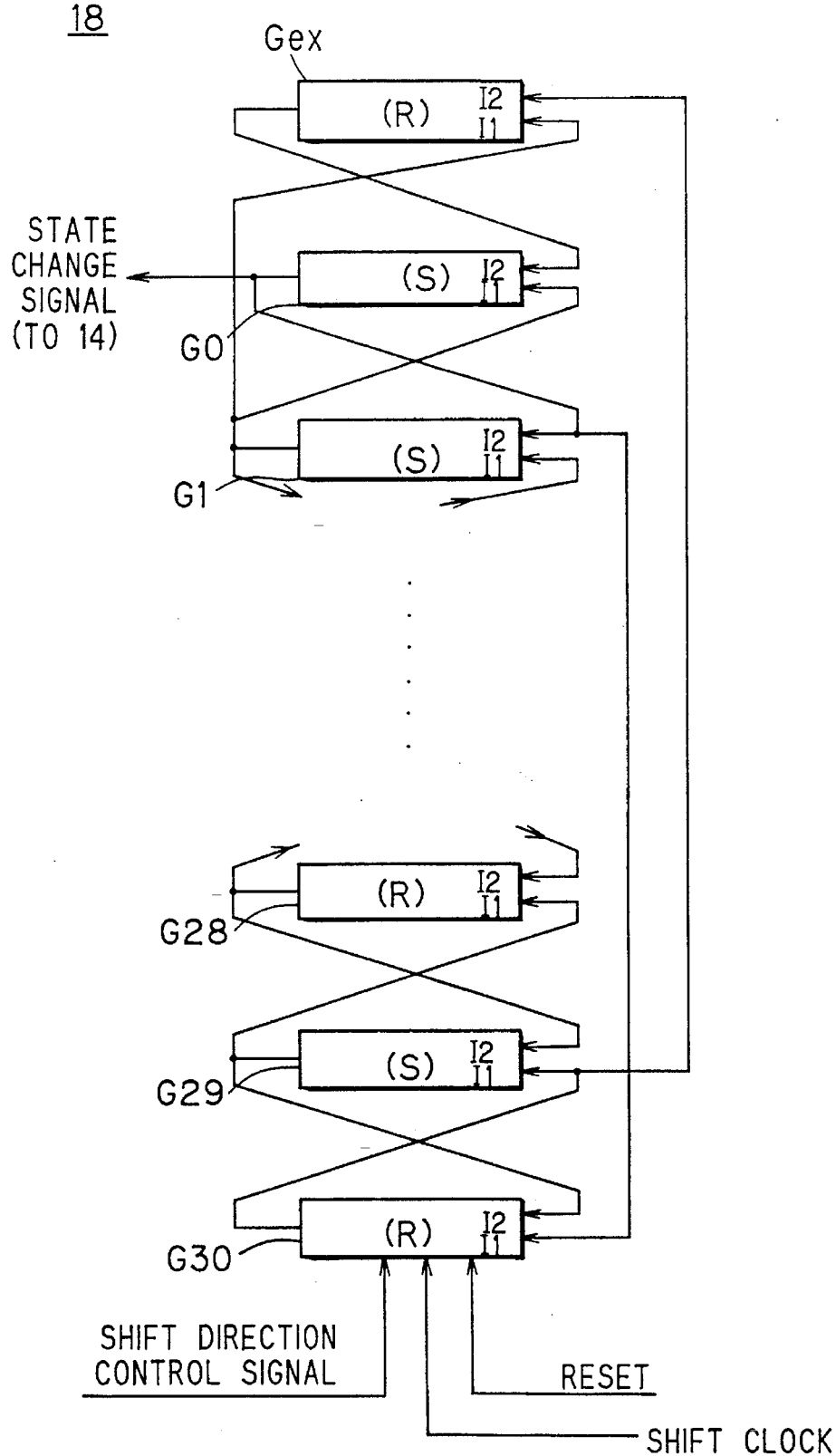
FIG. 46 is a block diagram of a shift register 18.
Figure 47:
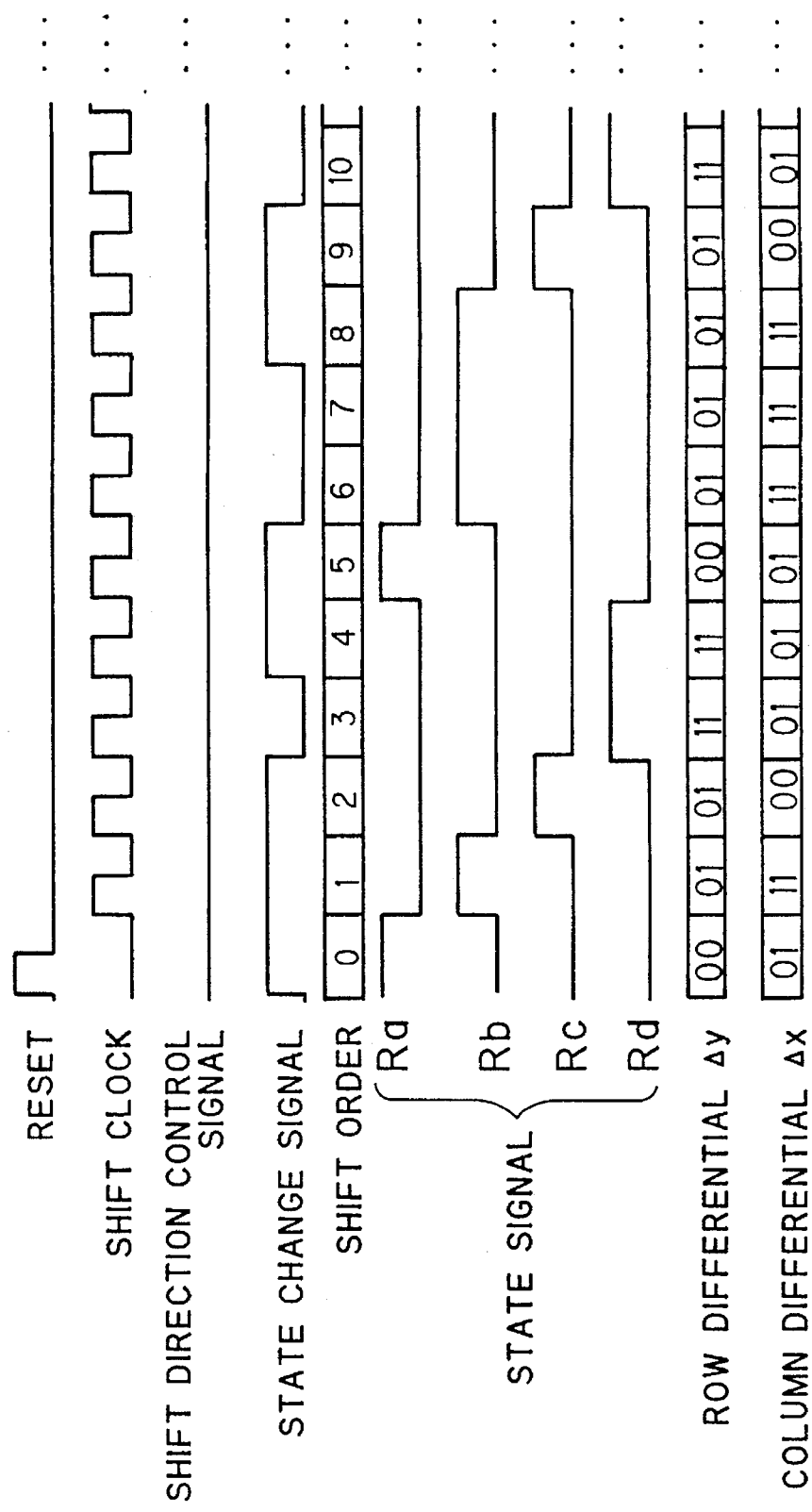
FIG. 47 is a timing chart for illustrating the sixth embodiment of the present invention.
Figure 48:
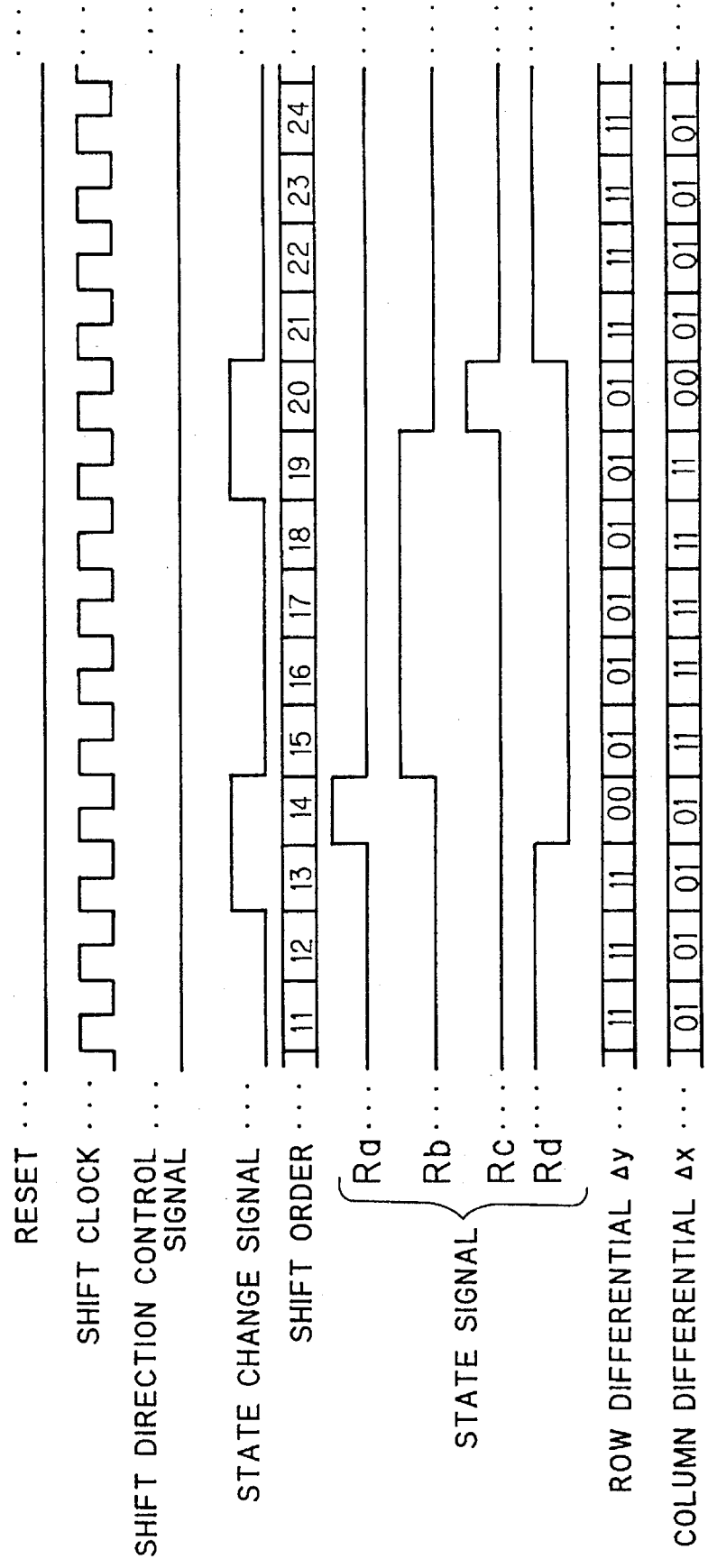
FIG. 48 is a timing chart for illustrating the sixth embodiment of the present invention.
Figure 49:
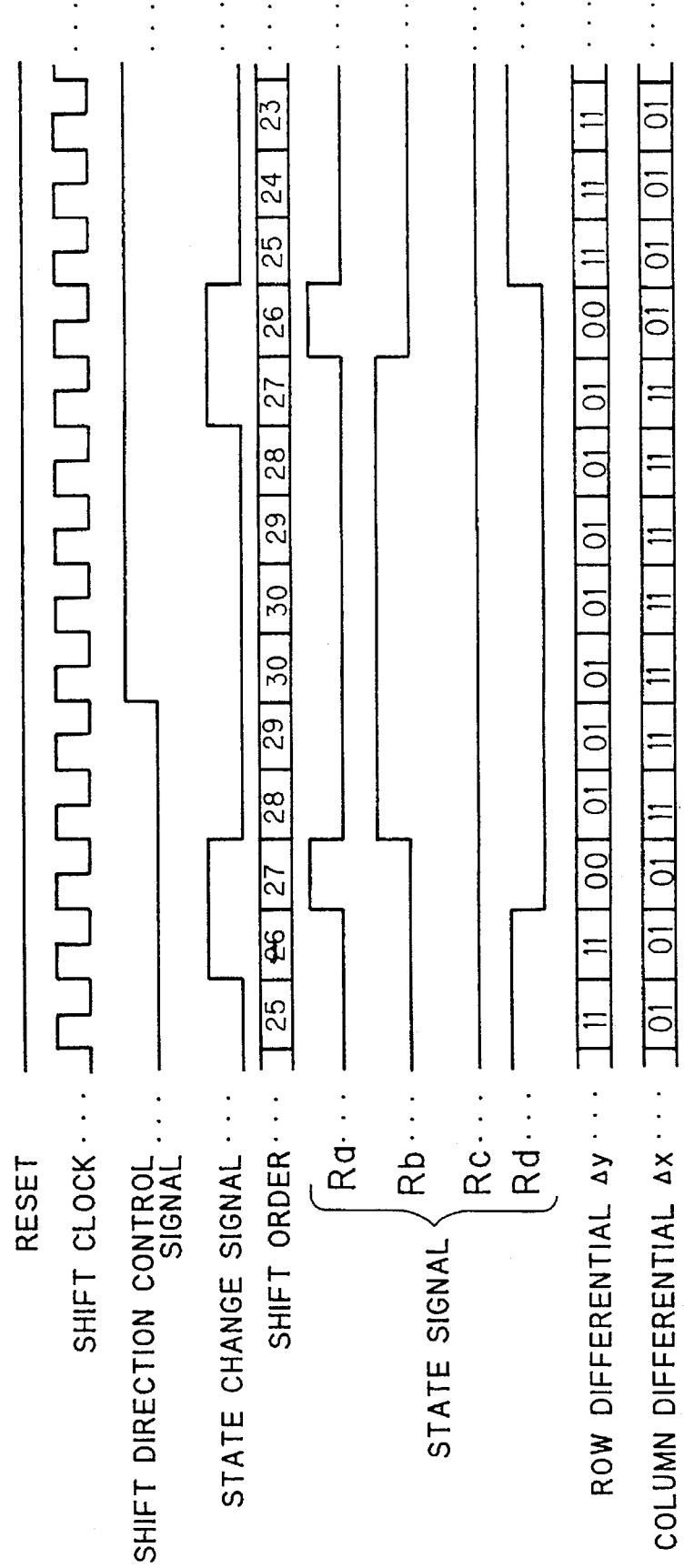
FIG. 49 is a timing chart for illustrating the sixth embodiment of the present invention.
Figure 50:
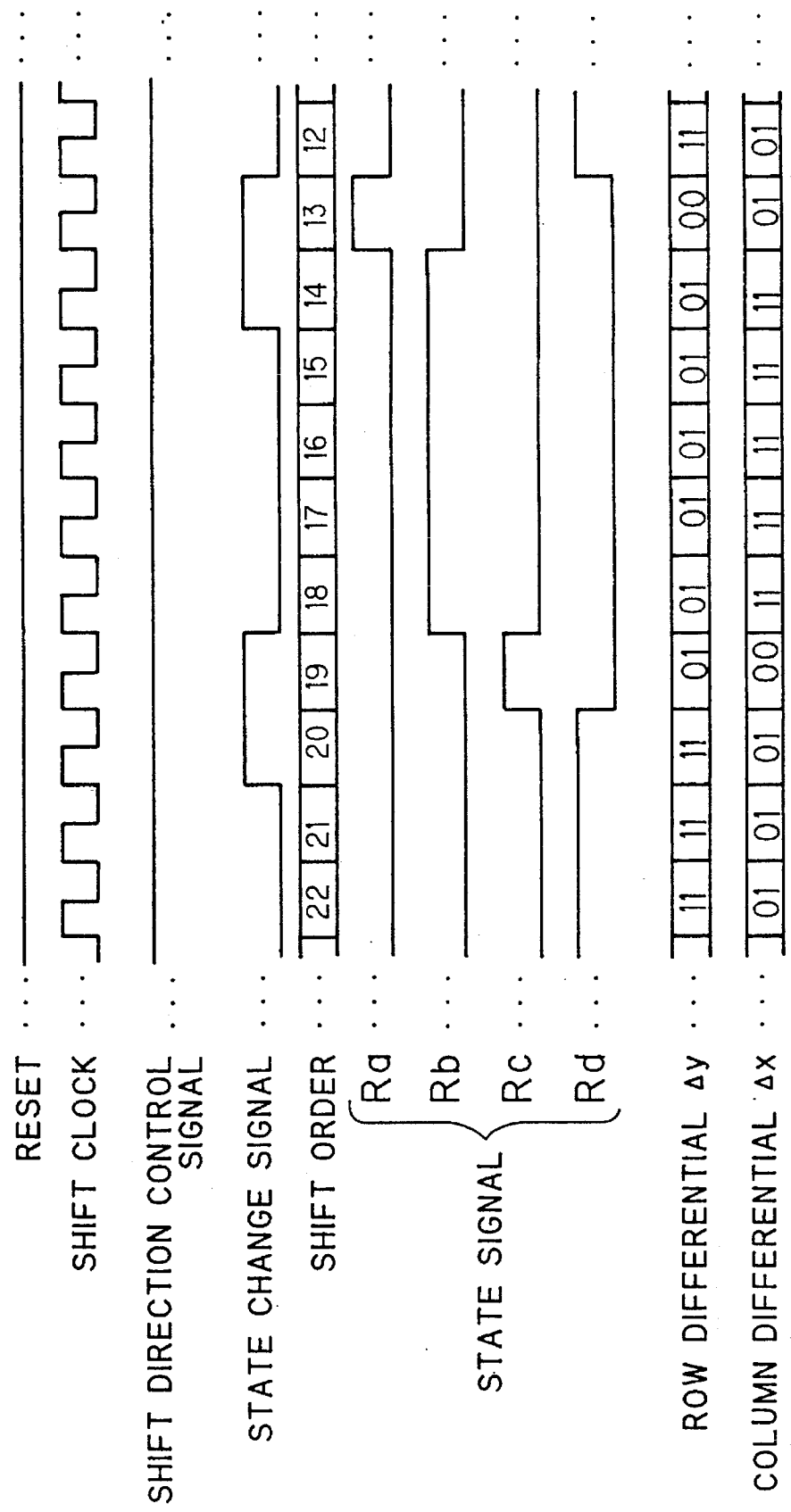
FIG. 50 is a timing chart for illustrating the sixth embodiment of the present invention.
Figure 51:
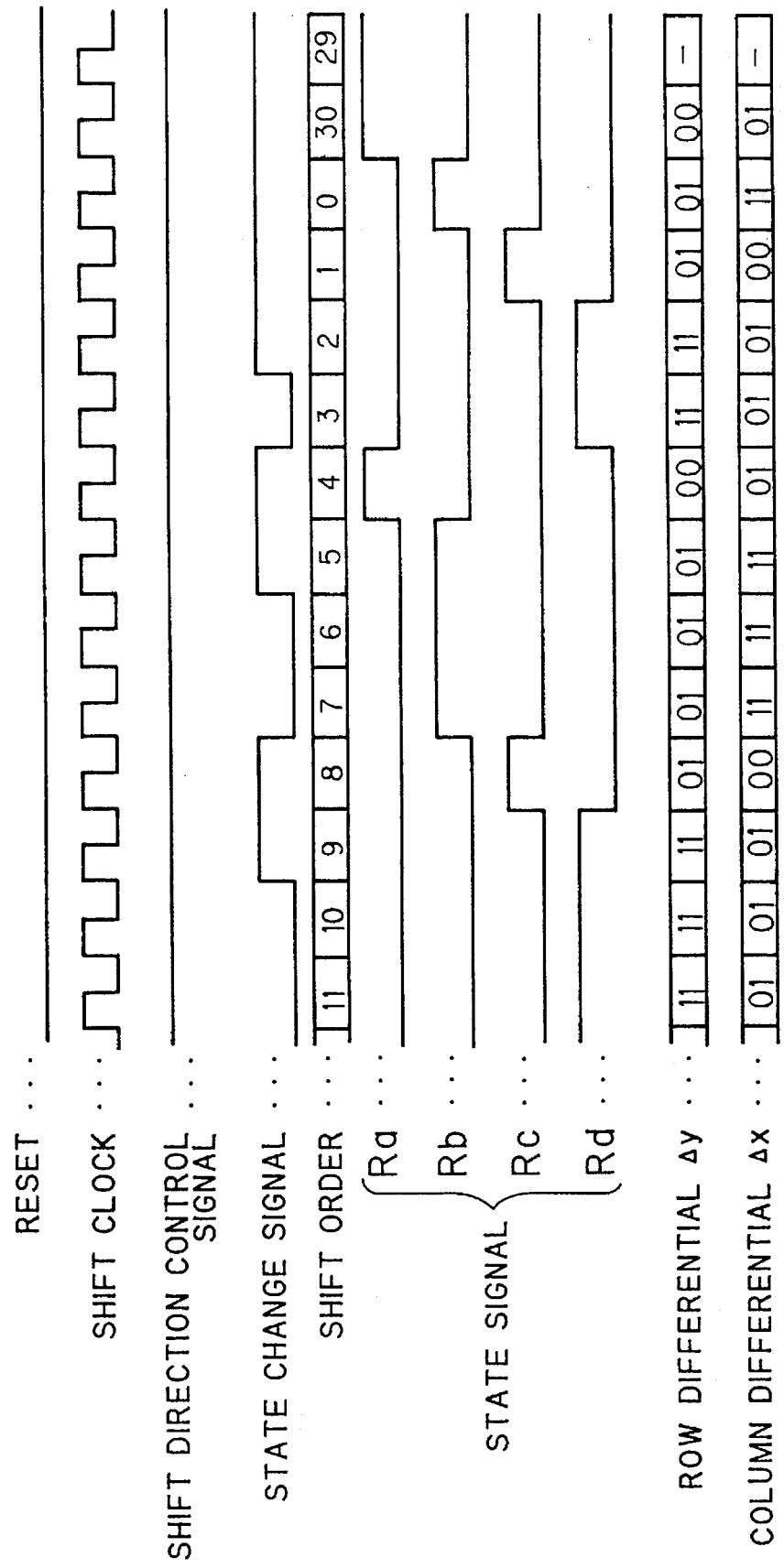
FIG. 51 is a timing chart for illustrating the sixth embodiment of the present invention.

While the state change signals can be stored in a general storage element as described in relation to the flow chart, a shift register 18 is employed here and an exemplary structure thereof is shown in FIG. 46. Each of registers Gex and G0 to G30 is either a register having a set function (denoted by (S) in FIG. 46) or a register having a reset function (denoted by (R) in FIG. 46), which outputs either one of two inputs I1 and I2. Selection and output timing thereof are controlled by a shift direction control signal and a shift clock received in each of the registers Gex and G0 to G30. A reset signal is supplied to every register, so that the initial value is set at "1" in each register having a set function and at "0" in each register having a reset function by the reset signal. Referring to FIG. 46, the shift direction control signal, the shift clock and the reset signal are shown only with reference to the register G30, in order to avoid complicatedness.

The fact that each of the registers G0 to G30 takes any one of set and reset functions corresponds to the relation between the readout address and the state change signal shown in Table 13. Namely, a register Gk has a set function if the state change signal in generation order "k" is "1", while the same has a set function if the state change signal is "0" (k=0 to 30). While the register Gex may be formed by any type of register, it is assumed here that the same is a register of the latter type. Table 14 shows state change signals generated by the shift register 18 in shift order.

TABLE 14

| SHIFT ORDER | 0 | 1 | 2 | 3 | 4 | 5 | 6 | 7 | 8 |
|---|---|---|---|---|---|---|---|---|---|
| DATA GENERATED BY SHIFT REGISTER 18 | 1 | 1 | 1 | 0 | 1 | 1 | 0 | 0 | 1 |
| SHIFT ORDER | 9 | 10 | 11 | 12 | 13 | 14 | 15 | 16 | |
| DATA GENERATED BY SHIFT REGISTER 18 | 1 | 0 | 0 | 0 | 1 | 1 | 0 | 0 | |
| SHIFT ORDER | 17 | 18 | 19 | 20 | 21 | 22 | 23 | 24 | |
| DATA GENERATED BY SHIFT REGISTER 18 | 0 | 0 | 1 | 1 | 0 | 0 | 0 | 0 | |
| SHIFT ORDER | 25 | 26 | 27 | 28 | 29 | 30 | | | |
| DATA GENERATED BY SHIFT REGISTER 18 | 0 | 1 | 1 | 0 | 0 | 0 | | | |

If the shift direction control signal is "0", each register outputs values supplied to the input I1 along shift clocks. First, a state signal obtained in resetting is "1" which has been stored in the register G0. Then a shift clock is inputted once, and a value ("1") which has been stored in the register G1 immediately after resetting is supplied to the input I1 of the register G0. Similarly, the content of the register Gk is supplied to G(k−1) (k=2 to 30). Every time a shift clock is inputted, therefore, the content of the register G0 defines a state change signal which is supplied to the ring pointer 14. However, the content of the register G0 is transferred to the register G30, and that of the register G1 is transferred also to the register Gex. The content of the register Gex is not transferred, and hence the same is regularly maintained identical to that of the register G0 after input of the shift clock. Thus, the register Gex may be formed by either a register having a set function or that having a reset function.

When 30 shift clocks are inputted, both of the contents of the registers G0 and Gex take the value of the register G30 immediately after resetting. On the other hand, the shift direction control signal becomes "1" since the zigzag address has been obtained as "21".

Thus, each register thereafter outputs a value being supplied in its input I2 along the shift clock. When a 31st shift clock is inputted, therefore, the content of the register Gex is transferred to the register G0. Thus, the register G0 experiences the content of the register G30 immediately after resetting twice (refer to Table 13).

Thereafter the registers G0 to G30 and Gex enter completely symmetrical connection relation, whereby the state change signals are generated in order which is reverse to the previous one (from resetting to the 30th shift clock after the 32nd shift clock).

FIGS. 47 to 51 show manners of generation of row and column differentials Δy and Δx in relation to clock signals (shift clocks). FIGS. 47, 48, 49, 50 and 51 show generation order "0" to "10", generation order "11" to "24", generation order "25" to "37", generation order "38" to "50", and generation order "51" to "63" respectively. It is shown that a shift direction control signal rises by the generation order "30" of FIG. 49. As understood from Table 13, the state change signals have no meaning as to after the generation order "62", since state changes correspond to differentials of state symbols corresponding to differentials of zigzag addresses.

A modification of the sixth embodiment is now described. In the generation order "28" to "33" shown in Table 13, the state change signals equally take values "0". Thus, the structure of the shift register 18 is not restricted to that shown in FIG. 46. The shift register 18 may not output the content of the register G30 immediately after resetting twice, but may temporarily output the content of the register G30 immediately after resetting to thereafter read out the content of the register G29 immediately after resetting twice.

Figure 52:
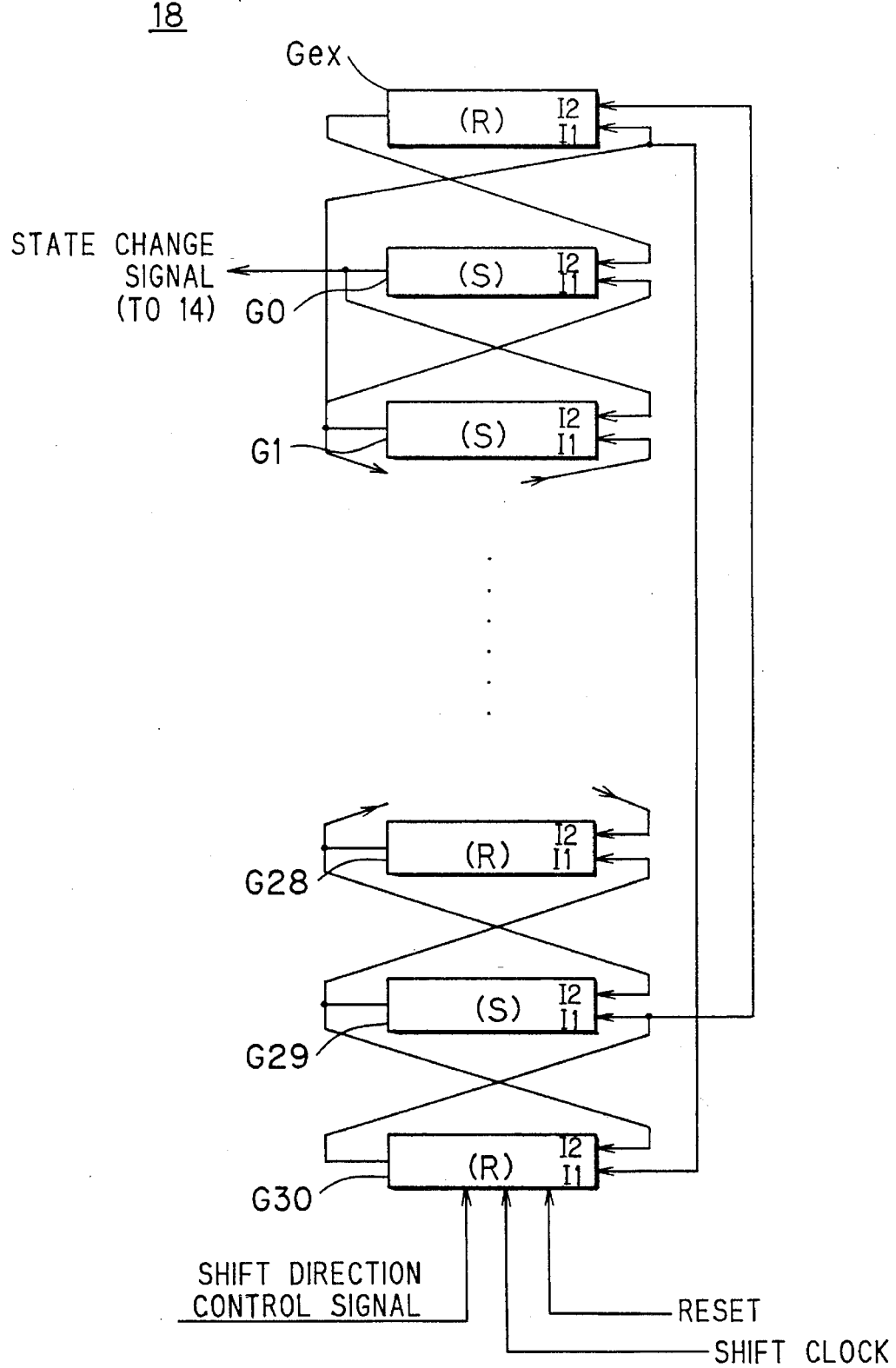
FIG. 52 is a block diagram of a shift register 18.

FIG. 52 shows the structure of a register 18 performing the above operation. In this case, the content of a register G29 immediately after resetting is supplied to both of registers G30 and Gex, after shift clocks are introduced 30 times. After a shift direction control signal becomes "1", the registers G0 to G30 and Gex enter completely symmetrical connection relation, and hence the content of the register G29 immediately after resetting is outputted as state change signals by inputs of 31st and 32nd shift clocks. Upon input of 33rd and subsequent shift clocks, the state change signals being heretofore generated are generated in reverse order.

When the state change signals are stored in a storage element such as ROM, a similar operation can be implemented by further adding one to the readout addresses. In other words, a state change signal stored in a readout address "31" is read out in generation order "31". This state change signal, which is identical to that stored in a readout address "30", takes a value "0" (Table 15). In next generation order "30", the process is not returned to the readout address "30", but to a readout address "29" skipping the readout address "30".

TABLE 15

| READOUT ADRESS | 0 | 1 | 2 | 3 | 4 | 5 | 6 | 7 |
|---|---|---|---|---|---|---|---|---|
| DIFFERENTIAL DATA | 1 | 1 | 0 | 1 | 1 | 0 | 0 | |
| READOUT ADDRESS | 8 | 9 | 10 | 11 | 12 | 13 | 14 | 15 |
| DIFFERENTIAL DATA | 1 | 1 | 0 | 0 | 0 | 1 | 1 | 0 |
| READOUT ADDRESS | 16 | 17 | 18 | 19 | 20 | 21 | 22 | 23 |
| DIFFERENTIAL DATA | 0 | 0 | 0 | 1 | 1 | 0 | 0 | 0 |
| READOUT ADDRESS | 24 | 25 | 26 | 27 | 28 | 29 | 30 | 31 |
| DIFFERENTIAL DATA | 0 | 0 | 1 | 1 | 0 | 0 | 0 | 0 |

Figure 53:
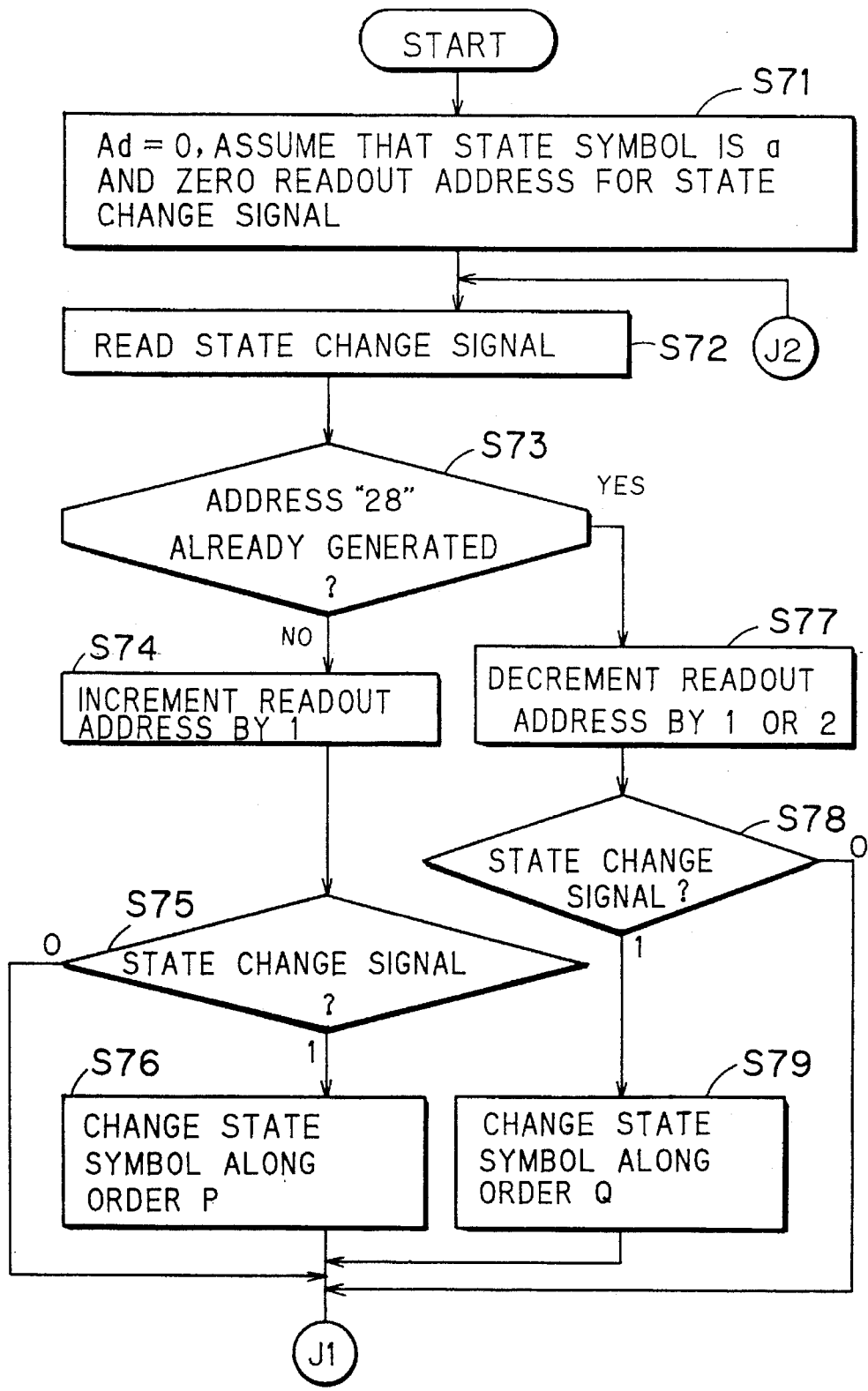
FIG. 53 is a flow chart showing the procedure of the sixth embodiment of the present invention.
Figure 54:
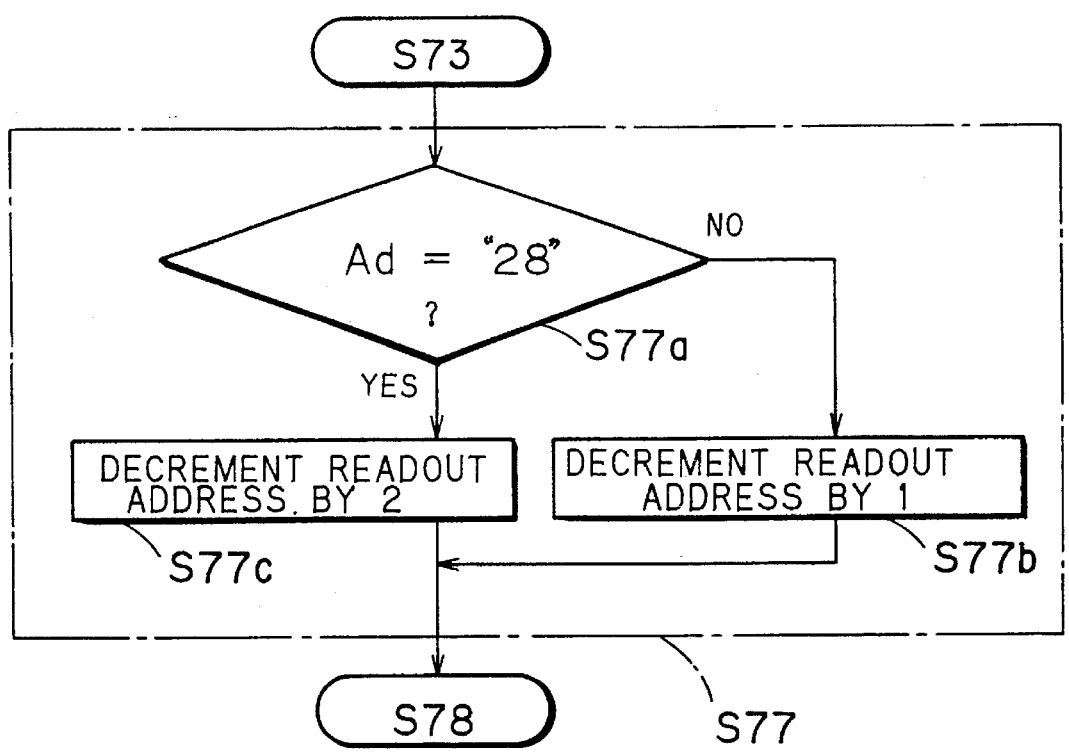
FIG. 54 is a flow chart showing the procedure of the sixth embodiment of the present invention.

FIGS. 53 to 54 show the algorithm of such an operation in the form of flow charts. Steps S71 to S72 are identical to the steps S61 to S62 shown in FIG. 42. At a step S73, however, a determination is made as to presence/absence of generation of a zigzag address "28" corresponding to the generation order "31", dissimilarly to the step S63. Until generation of the zigzag address "28", therefore, the readout addresses are set to "31" at the maximum by a step S74.

Thereafter operations similar to those of the steps S65 to S66 shown in FIG. 42 are carried out at steps S75 to S76, to carry out operations similar to those shown in FIG. 33 through connectors J1 and J2.

If the zigzag address "28" is already generated, the process is advanced to a step S77 through the step S73. FIG. 54 shows the step S77 in detail. A determination is made at a step S77a as to whether or not a current zigzag address is "28". If the current zigzag address is "28", an already set readout address is "31", and hence the readout address is decremented by 2 at a step S77c, in order to cause transition to a readout address "29".

If the current zigzag address is not "28", on the other hand, the generation order must be after "32" in consideration of the determination being already made at the step S73. Thus, the readout address is decremented by 1 at a step S77b, similarly to the step S67b shown in FIG. 43.

As hereinabove described, the sixth embodiment can be modified in various manners, in consideration of the fact that the state change signals are not changed in the vicinity of generation order which can be called a return point of the readout addresses.

C. Modifications

(C-1) Modifications of Fifth and Sixth Embodiments

While the ring pointers 14 and the logic circuits 16 are employed in the fifth and sixth embodiments described in (B-5) and (B-6) for generating the row and column differentials $\Delta y$ and $\Delta x$, the same may be replaced by a combination of an updown counter 19 and the logic circuit 13 shown in FIG. 19, to carry out a similar operation.

Figure 55:
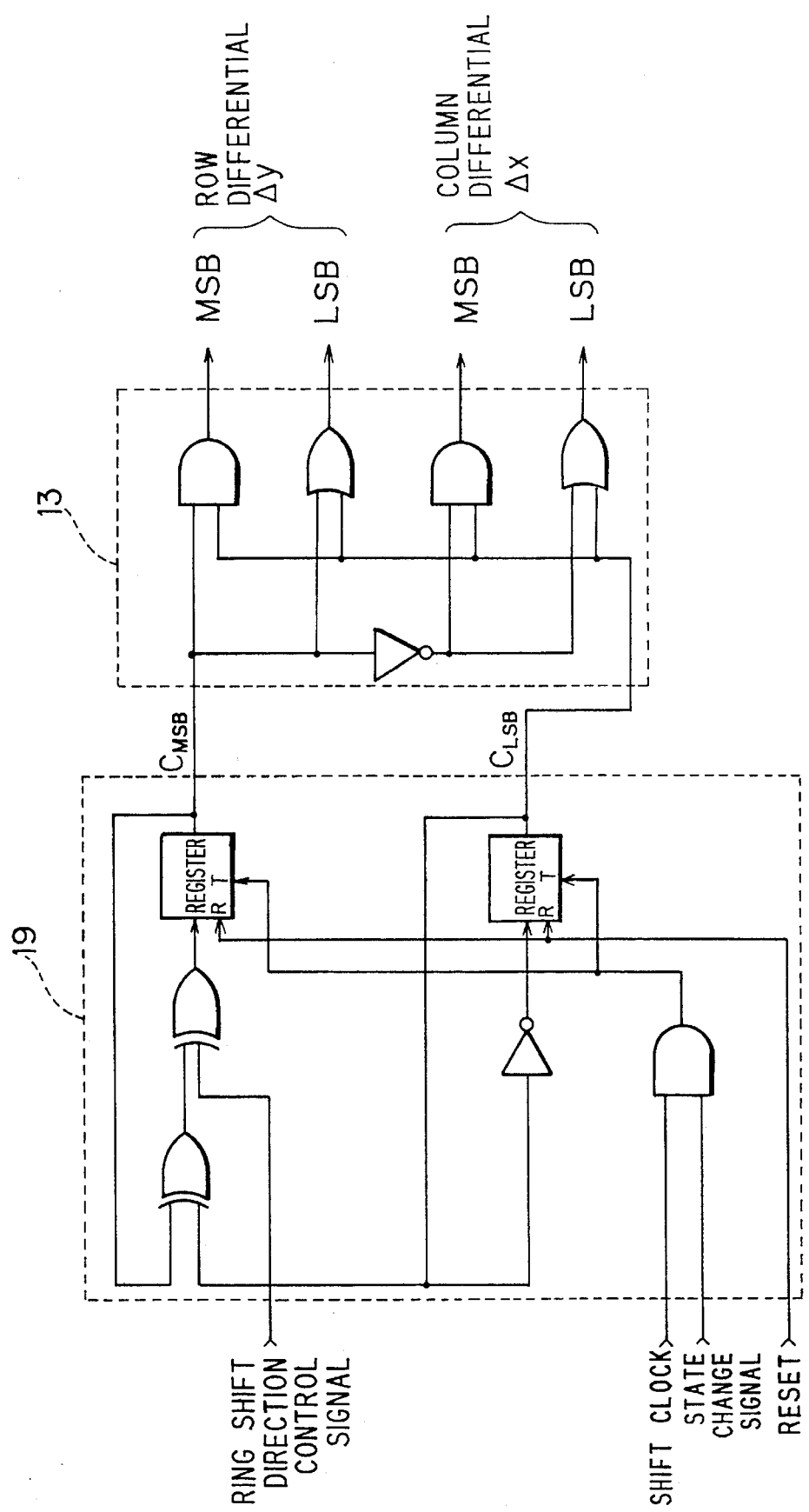
FIG. 55 is a block diagram for illustrating a first modification of the present invention.

FIG. 55 shows the structure of an updown counter 19, which is connected with a logic circuit 13. The updown counter 19, which is made of a two-bit counter, serves as an up counter when a ring shift direction control signal is "0", while the same serves as a down counter when the signal is "1". Both of outputs CMSB and CLSB take values "0" by a reset signal. These outputs are updated only when both of a shift clock and a state change signal are "1". The two bits CMSB and CLSB of the output correspond to a state signal. Therefore, row and column differentials $\Delta y$ and $\Delta x$ can be obtained by the logic circuit 13, similarly to the third embodiment shown in FIG. 18.

(C-2) Application to Partial Image of 16 by 16 Pixels

The above description has been made with reference to partial images of 8 by 8 pixels. However, image compression employing DCT is generally carried out in units of 16 by 16 pixels. When 16 by 16 pixels are divided into four portions of 8 by 8 pixels to scan the respective portions in a zigzag manner, the technique described with reference to the first to sixth embodiments can also be applied to 16 by 16 pixels.

Figure 56:
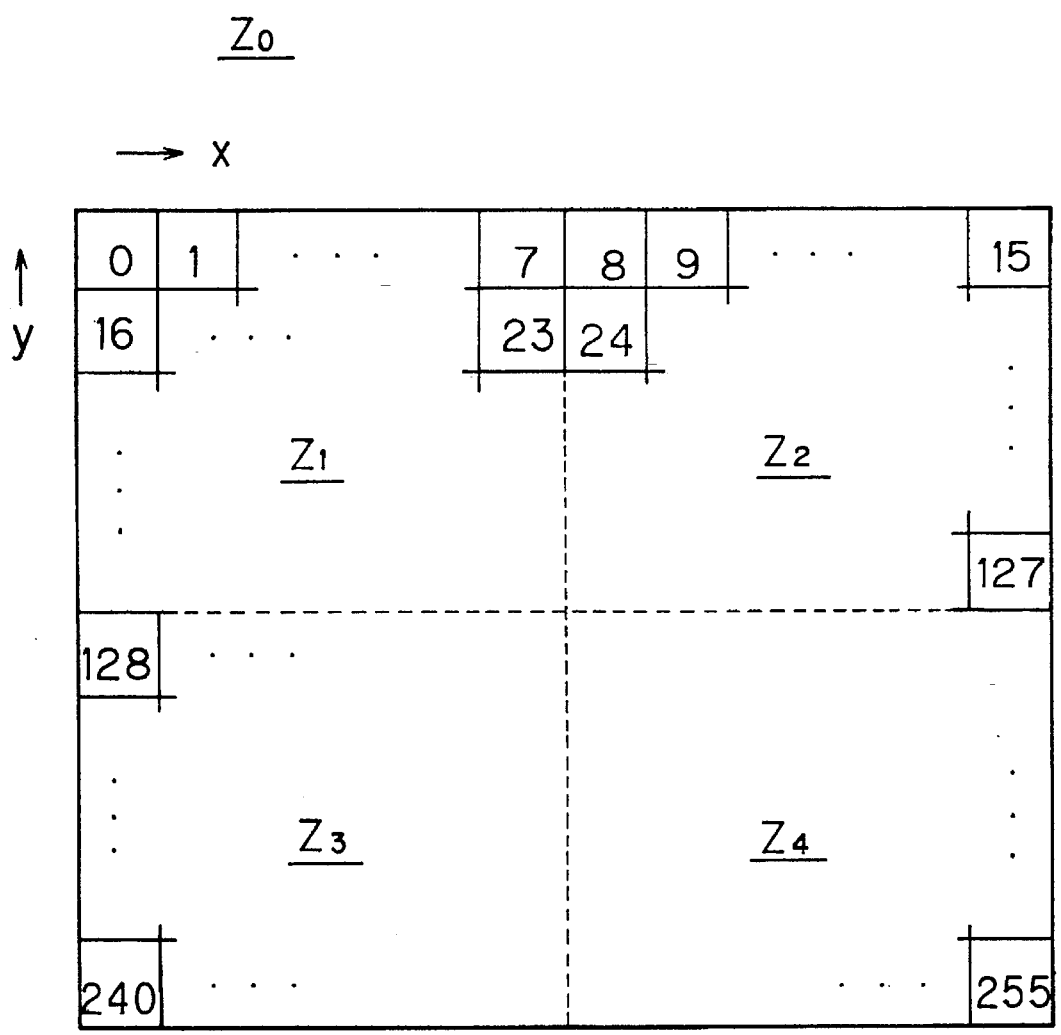
FIG. 56 is an explanatory diagram of a second modification of the present invention.

FIG. 56 shows a partial image Z0 of 16 by 16 pixels, which are divided into four portions Z1, Z2, Z3 and Z4 of 8 by 8 pixels. In each portion Zi (i=1 to 4), zigzag addresses are continous in a column direction (direction x), while the last column of an upper row is not continuous with the first column of a lower row in each pair of adjacent rows, dissimilarly to FIG. 64. For example, the zigzag address of the last column of the first row of the portion Zr is "15", and the zigzag address of the first column of the second row is "24". Namely, the portion Zi, which is provided with adjacent portions Z(i+1) or Z(i−1) is skipped by one row in a direction y as compared with the case of FIG. 64. In other words, the weight of row addresses y is doubled, and it is understood that the following assumption may be made in zigzag address generation:

$$\text{(zigzag address to be generated)} = (8 \times y) \times 2 + x \quad (11)$$

Further, zigzag addresses to be generated first in the portions Z1, Z2, Z3 and Z4 are respectively expressed in 8 bits as follows:

Z1: $00000000_{(2)} = 0_{(10)}$

Z2: $00001000_{(2)} = 8_{(10)}$

Z3: $10000000_{(2)} = 128_{(10)}$

Z4: $10001000_{(2)} = 136_{(10)}$ \quad (12)

Therefore, 5-bit signals M4M3M2M1M0 may be introduced in place of the row addresses y in the first to sixth embodiments to specify the portions Z1 to Z4 by the signals M4 and M0, while the row addresses y may be employed assuming that 3 bit signals are M3M2M1. Namely, pairs of signals (M4, M0)=(0, 0), (0, 1), (1, 0) and (1, 1) correspond to the portions Z1, Z2, Z3 and Z4 respectively, and the signals M3M2M1 have double weighting as compared with the row addresses y. Table 16 shows this.

TABLE 16

| MODE SWTICHING SIGNAL L | M4 | M3 | M2 | M1 | M0 |
|---|---|---|---|---|---|
| 0 | BI1 | MSB OF ROW ADDRESS y | ROW ADDRESS x | LSB OF ROW ADDRESS y | BI0 |
| 1 | 0 | 0 | MSB OF ROW ADDRESS y | ROW ADDRESS y | LSB OF ROW ADDRESS y |

The column in which a mode switching signal L is "0" corresponds to this modification, and the column of "1" corresponds to the first to sixth embodiments. When zigzag addresses of 16 by 16 pixels are generated every 8 by 8 pixels, mode switching is zeroed and block identifying signals BI1 and BI0 for specifying the portions Z1 to Z4 are supplied to signals M4 and M0 respectively, to scan the portions Z1 to Z4.

Figure 57:
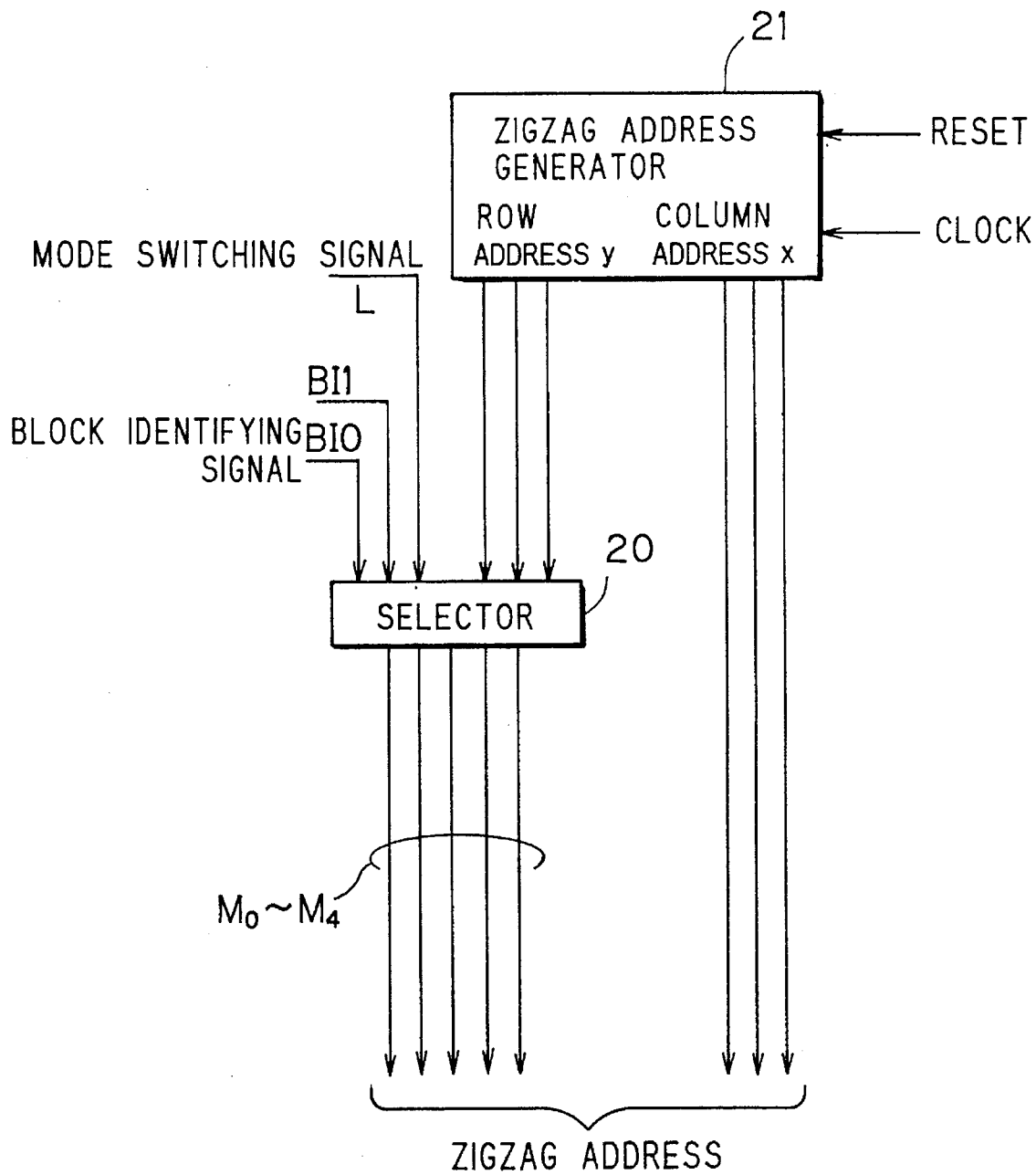
FIG. 57 is a block diagram for illustrating the second modification of the present invention.

FIG. 57 is a block diagram showing the structure of this modification. A zigzag address generator 21, which is adapted to generate row and column addresses y and x corresponding to 8 by 8 pixels by the method of the first to sixth embodiments, successively supplies the row addresses y shown in Table 2 to a selector 20 in accordance with reset and clock signals. The selector 20 also receives a mode switching signal L and block identifying signals BI0 and BI1, to output a 5-bit signal Mi (i=0 to 4). Each zigzag address corresponding to 16 by 16 pixels is obtained as an 8-bit signal having Mi as high-order 5 bits and a column address x as low-order 3 bits.

Figure 58:
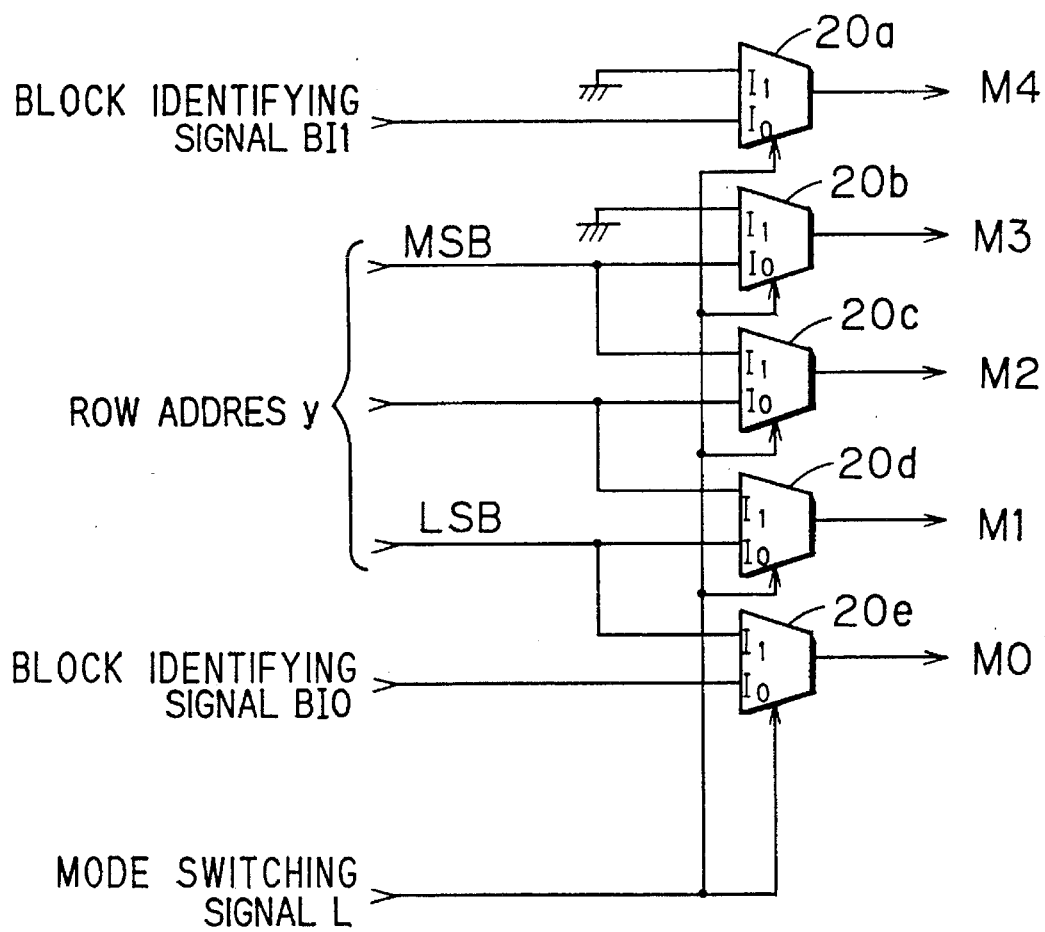
FIG. 58 is a block diagram of a selector 20.

FIG. 58 shows the internal structure of the selector 20. The selector 20 is formed by selectors 20a, 20b, 20c, 20d and 20e, which output values received in inputs I0 when the mode switching signal L is "0" while outputting values received in inputs I1 when the signal L is "1", to output signals M4, M3, M2, M1 and M0 shown in Table 16 respectively.

When zigzag addresses generated by the zigzag address generator 21 correspond to a group of pixels arranged in the form of a square matrix of n rows and n columns, it is possible to also generate zigzag addresses of a partial pixel arranged in the form of a square matrix of (m×n) rows and (m×n) columns in the unit of the pixel group.

While the invention has been shown and described in detail, the foregoing description is in all aspects illustrative and not restrictive. It is therefore understood that numerous modifications and variations can be devised without departing from the scope of the invention.

We claim:

1. A method of generating electrical signals representing zigzag addresses for scanning memory addresses being arranged in the form of a matrix n rows and n columns assuming that n represents a natural number of at least two to be continuous between the last columns of first rows and first columns of last rows in adjacent pairs of rows as well as between respective rows in a zigzag manner along the first column of the first rows, the second column of the first row, the second column of the second row, the first column of the third row, . . . , the n-th column of the n-th row thereby generating electrical signals representing addresses to be obtained, said method comprising the steps of:

(a) zeroing all electrical signals representing row addresses and column addresses for specifying rows and columns being provided with said addresses and prescribing initial values of said memory addresses thereby setting initial states;

(b) successively reading a plurality of electrical signals representing differential data having information as to row and column differentials from storage means storing said differential data;

(c) obtaining electrical signals representing said row and column differentials from said electrical signals representing said differential data;

(d) adding said electrical signals representing said row and column differentials to respective one of electrical signals representing a row address of said row addresses and electrical signals representing a column address of said column addresses in one stage thereby obtaining said electrical signals representing said row address and said column address in a next state following said one stage; and (e) successively obtaining electrical signals representing said memory addresses in said next stage from said electrical signals representing said row address and said column address in said next stage.

2. A method of generating electrical signals representing zigzag addresses in accordance with claim 1, wherein said electrical signals representing memory addresses are set at zero in step (a).

3. A method of generating electrical signals representing zigzag addresses in accordance with claim 2, wherein said information as to said row and column differentials is formed by pairs of said row and column differentials, and step (c) includes the step of:
(c-1) obtaining electrical signals representing said row and column differentials from said pairs of said row and column differentials.

4. A method of generating electrical signals representing zigzag addresses in accordance with claim 3, wherein step (b) includes the steps of:
(b-1) updating electrical signals representing addresses, being supplied to said differential data in said reading, up to a prescribed number of times in one order, and
(b-2) updating said electrical signals representing addresses, being supplied to said differential data in said reading, after said prescribed number of times in order being reverse to said one order.

5. A method of generating electrical signals representing zigzag addresses in accordance with claim 4, wherein n represents an even number, and said prescribed number of times is $((n \times n)/2-1)$.

6. A method of generating electrical signals representing zigzag addresses in accordance with claim 1, wherein each of said row and column differentials can take one state among a prescribed number of states, said electrical signals representing data define pairs indicating said prescribed number of states, and step (c) includes the step of:
(c-1) obtaining electrical signals representing said row and column differentials from said pairs defined by said differential data.

7. A method of generating electrical signals representing zigzag addresses in accordance with claim 6, wherein said pairs define four states being expresses as (0, 1), (1, −1), (1, 0) and (−1, 1), each of said differential data being formed by two-bit information.

8. A method of generating electrical signals representing zigzag addresses in accordance with claim 6, wherein step (b) includes the steps of:
(b-1) performing said reading in one order up to a prescribed number of times, and
(b-2) performing said reading in order being reverse to said one order after said prescribed number of times.

9. A method of generating electrical signals representing zigzag addresses in accordance with claim 8, wherein n represents an even number, and said prescribed number of times is $((n \times n)/2-1)$.

10. A method of generating electrical signals representing zigzag addresses in accordance with claim 1, wherein said electrical signals representing differential data represents whether or not pairs formed by said row and column differentials are changed between said one stage and said next state, and step (c) includes the steps of:
(c-1) obtaining said pairs formed by said row and column differentials from said definition on the basis of a prescribed rule, and
(c-2) obtaining electrical signals representing said row and column differentials from said pairs.

11. A method of generating electrical signals representing zigzag addresses in accordance with claim 10, wherein said pairs present differential four states, and said prescribed rule assumes that states to be taken by said pairs in said next stage are set by periodic selection from said four states when said electrical signals representing differential data allow change of said pairs, while assuming that states to be taken by said pairs in said next state are maintained at states taken by said pairs in said one state when said electrical signals representing differential data inhibit change of said pairs.

12. A method of generating electrical signals representing zigzag addresses in accordance with claim 11, wherein said four states are expresses as (0, 1), (1, −1), (1, 0) and (−1, 1), said periodic selection is made along this order, and each of said differential data is formed by one-bit information.

13. A method of generating electrical signals representing zigzag addresses in accordance with claim 10, wherein step (b) includes the steps of:
(b-1) performing said reading in one order up to a prescribed number of times, and
(b-2) performing said reading in order being reverse to said one order after said prescribed number of times.

14. A method of generating electrical signals representing zigzag addresses in accordance with claim 13, wherein n represents an even number, and said prescribed number of times is $((n \times n)/2-1)$.

15. A method of generating electrical signals representing zigzag addresses being arranged in the form of a matrix of (m×n) rows and (m×n) columns assuming that m represents a natural number of at least one and n represents a natural number of at least two to be continuous between last columns of first rows and first columns of last rows in adjacent pairs of rows as well as between respective rows in a zigzag manner in respective ones of m×m blocks formed by n rows and n columns thereby generating addresses to be obtained, said method comprising the steps of:

(a) supplying initial values to electrical signals representing row and column addresses respectively for obtaining electrical signals representing initial memory addresses from said row and column addresses thereby setting initial states;

(b) successively reading a plurality of electrical signals representing differential data having information as to row and column differentials from storage means storing said differential data;

(c) obtaining electrical signals representing said row and column differentials from said differential data;

(d) adding said electrical signals representing row and column differentials to respective ones of electrical signals representing a row address of said row addresses and electrical signals representing a column address of said column addresses in one state thereby obtaining electrical signals representing said row address and said column address in a next state following said one stage; and (e) successively obtaining electrical signals representing said memory addresses in said next stage from said electrical signals representing row address and said electrical signals representing column address in said next stage.

16. A circuit for generating zigzag addresses comprising:

storage means storing a plurality of differential data having information as to row and column differentials;

readout means for successively reading said differential data in synchronization with clocks along prescribed order;

first arithmetic means for obtaining row and column differential signals expressing said row and column differentials respectively from said differential data;

an address latch for temporarily storing one said row address and one said column address in one stage in synchronization with said clocks; and second arithmetic means for adding said row and column differentials to respective ones of said one row address and said one column address being stored in said address latch thereby supplying said row address and said column address in a next stage following said one stage to said address latch, said circuit scanning memory addresses being arranged in the form of a matrix of n rows and n columns assuming that n represents a natural number of at least two to be continuous between last columns of first rows and first columns of last rows in adjacent pairs of rows as well as between respective rows in a zigzag manner from the first column of the first row to the n-th column of the n-th row thereby generating addresses to be obtained.

17. A circuit for generating zigzag addresses in accordance with claim 16, wherein said information as to said row and column differentials is formed by pairs formed by said row differentials and said column differentials, said first arithmetic means calculating said differential data directly as said row and column differentials.

18. A circuit for generating zigzag addresses in accordance with claim 17, further comprising compare control means for reading out said row and column addresses for inverting the prescribed order of said readout means when said row and column addresses exceed prescribed values.

19. A circuit for generating zigzag addresses in accordance with claim 16, wherein said differential data are signals defining pairs formed by said row and column differentials, and said first arithmetic means has third arithmetic means for obtaining said row and column differential signals from said differential data.

20. A circuit for generating zigzag addresses in accordance with claim 19, wherein said pairs present four states expressed as (0, 1), (1, −1), (1, 0) and (−1, 1), respective ones of said differential data are formed by two-bit signals "00", "01", "10" and "11" expressing said pairs in this order, said row differential signals being "00", "01" and "11" indicate that said row differentials are "0", "1" and "−1" respectively, and said column differential signals being "00", "01" and "11" indicate that said column differentials are "0", "1" and "−1" respectively.

21. A circuit for generating zigzag addresses in accordance with claim 20, wherein said third arithmetic means includes:

a first AND gate having a first input end receiving high-order bits of said differential data, a second input end receiving low-order bits of said differential data and an output end outputting high-order bits of said row differential signals, a first OR gate having a first input end receiving high-order bits of said differential data, a second input end receiving low-order bits of said differential data and an output end outputting low-order bits of said row differential signals, a second AND gate having a first input end receiving logically inverted high-order bits of said differential data, a second input end receiving low-order bits of said differential data and an output end outputting high-order bits of said column differential signals, and a second OR gate having a first input end receiving logically inverted high-order bits of said differential data, a second input end receiving low-order bits of said differential data and an output end outputting low-order bits of said column differential signals.

22. A circuit for generating zigzag addresses in accordance with claim 19, further comprising compare control means for reading said row and column addresses and inverting said prescribed order of said readout means when said memory addresses supplied by said row and column addresses exceed prescribed values.

23. A circuit for generating zigzag addresses in accordance with claim 16, wherein said readout means includes:

third arithmetic means for obtaining state signals indicating pairs of said row and column differentials on the basis of said differential data and supplying said state signals to said first arithmetic means, and said first arithmetic means includes:

fourth arithmetic means for obtaining said row and column differential signals from said state signals.

24. A circuit for generating zigzag addresses in accordance with claim 23, further comprising compare control means for reading said row and column addresses for inverting said prescribed order of said readout means when said memory addresses supplied by said row and column addresses exceed prescribed values.

25. A circuit for generating zigzag addresses in accordance with claim 24, wherein said differential data are one-bit signals, said row differential signals being "00", "01" and "11" indicate that said row differentials are "0", "1" and "−1" respectively, said column differential signals being "00", "01" and "11" indicate that said column differentials are "0", "1" and "−1" respectively, said pairs are expressed in four states of (0, 1), (1, −1), (1, 0) and (−1, 1), and said state signals are four bit signals of first, second, third and fourth bits indicating said pairs in this order, only one of said bits being 1.

26. A circuit for generating zigzag addresses in accordance with claim 25, wherein said third arithmetic means is formed by a ring pointer for periodically selecting said four states along said prescribed order by said differential data.

27. A circuit for generating zigzag addresses in accordance with claim 26, wherein said fourth arithmetic means includes:

a first OR gate having a first input end receiving the first bit signal of said state signals, a second input end receiving the second bit signal of said state signals, a third input end receiving the fourth bit signal of said state signals and an output end outputting low-order bits of said column differential signals, a second OR gate having a first input end receiving the second bit signal of said state signals, a second input end receiving the third bit signal of said state signals, a third input end receiving the fourth bit signal of said state signals, and an output end outputting low-order bits of said row differential signals, a first wire for outputting the second bit signal of said state signals as high-order bits of said column differential signals, and a second wire for outputting the fourth bit signal of said state signals as high-order bits of said row differential signals.

28. A circuit for generating zigzag addresses in accordance with claim 27, wherein said storage means is formed by a bidirectionally shiftable shift register, and said compare control means inverts the shift direction of said shift register when said memory addresses supplied by said row and column addresses exceed said prescribed values.

29. A circuit for generating zigzag addresses in accordance with claim 24, wherein said differential data are one-bit signals, said row differential signals being "00", "01" and "11" indicate that said row differentials are "0", "1" and "−1" respectively, said column differential signals being "00", "01" and "11" indicate that said column differentials are "0", "1" and "−1" respectively, said pairs are expressed in four states of (0, 1), (1, −1), (1, 0) and (−1, 1), said state signals are two-bit signals taking values of "00", "01", "10" and "11" for respective ones of said four states, said third arithmetic means has an updown counter generating said state signals by said differential data, and said fourth arithmetic means includes:

a first AND gate having a first input end receiving high-order bits of said state signals, a second input end receiving low-order bits of said state signals and an output end outputting high-order bits of said row differential signals, a first OR gate having a first input end receiving high-order bits of said state signals, a second input end receiving low-order bits of said state signals and an output end outputting low-order bits of said row differential signals, a second AND gate having a first input end receiving logically inverted high-order bits of said state signals, a second input end receiving low-order bits of said state signals and an output end outputting high-order bits of said column differential signals, and a second OR gate having a first input end receiving logically inverted high-order bits of said state signals, a second input end receiving low-order bits of said state signals and an output end outputting low-order bits of said column differential signals.

\* \* \* \* \*